(12) United States Patent
Tani et al.

(10) Patent No.: US 10,570,320 B2
(45) Date of Patent: Feb. 25, 2020

(54) ADHESIVE MEMBER TO BE ADHESIVELY FIXED THROUGH PRESSURE

(71) Applicant: NITTO DENKO CORPORATION, Ibaraki-shi, Osaka (JP)

(72) Inventors: Kensuke Tani, Ibaraki (JP); Mizuho Nagata, Ibaraki (JP); Kaori Mizobata, Ibaraki (JP); Masatsugu Soga, Ibaraki (JP); Ryota Masuda, Ibaraki (JP); Masayuki Satake, Ibaraki (JP); Kenichi Okada, Ibaraki (JP); Naofumi Kosaka, Ibaraki (JP); Keisuke Shimokita, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 208 days.

(21) Appl. No.: 15/551,062

(22) PCT Filed: Mar. 7, 2016

(86) PCT No.: PCT/JP2016/056941
§ 371 (c)(1),
(2) Date: Aug. 15, 2017

(87) PCT Pub. No.: WO2016/143731
PCT Pub. Date: Sep. 15, 2016

(65) Prior Publication Data
US 2019/0016923 A1 Jan. 17, 2019

(30) Foreign Application Priority Data

Mar. 6, 2015 (JP) .................. 2015-045069

(51) Int. Cl.
*C09J 7/38* (2018.01)
*C09D 7/45* (2018.01)
*C09J 7/20* (2018.01)

(52) U.S. Cl.
CPC ............... *C09J 7/383* (2018.01); *C09D 7/45* (2018.01); *C09J 7/20* (2018.01); *C09J 7/385* (2018.01); *C09J 7/387* (2018.01)

(58) Field of Classification Search
CPC ...... C09J 7/0217; C09J 7/0214; C09J 7/0221; C09J 7/20; C09J 7/387; C09J 7/385; C09J 7/383; C09D 7/45
See application file for complete search history.

(56) References Cited

U.S. PATENT DOCUMENTS

| 4,091,162 A | * | 5/1978 | Henderson | ............... B01J 13/14 |
| | | | | 428/327 |
| 5,008,139 A | | 4/1991 | Ochi et al. | |

(Continued)

FOREIGN PATENT DOCUMENTS

| EP | 0 315 072 A2 | 5/1989 |
| EP | 1 386 941 A1 | 2/2004 |

(Continued)

OTHER PUBLICATIONS

Extended European Search Report dated Sep. 6, 2018 issued by the European Patent Office in corresponding application No. 16761699.4.

(Continued)

*Primary Examiner* — Patricia L. Nordmeyer
(74) *Attorney, Agent, or Firm* — Sughrue Mion, PLLC

(57) ABSTRACT

Provided is an adhesive member to be adhesively fixed through pressure which has both position adjustability and adhesiveness and is capable of producing a sufficient adhesive strength in addition to the position adjustability. The adhesive member comprises a support, a pressure-sensitive adhesive layer provided on one surface of the support, and a plurality of protrusion elements arranged, in spaced-apart relation to each other, on a principal surface of the pressure-sensitive adhesive layer on a side opposite to the support.

(Continued)

Each of the protrusion elements is composed of an aggregation of a plurality of cohesive particles, wherein the adhesive member has a frictional force of 0.4 N/cm$^2$ or less, with respect to a stainless steel plate serving as an adherend, as measured when the protrusion elements are in contact with a surface of the adherend, and a shear adhesive strength of 45 N/cm$^2$ or more.

43 Claims, 8 Drawing Sheets

(56) References Cited

U.S. PATENT DOCUMENTS

| | | | | |
|---|---|---|---|---|
| 5,141,790 | A | * | 8/1992 | Calhoun ............... B29C 59/046 428/40.4 |
| 5,296,277 | A | * | 3/1994 | Wilson ..................... C09J 7/38 428/40.2 |
| 5,607,763 | A | | 3/1997 | Matsuda |
| 5,795,636 | A | * | 8/1998 | Keller ...................... C09J 7/38 428/40.1 |
| 2001/0052384 | A1 | * | 12/2001 | Hannington ............. B32B 9/00 156/239 |
| 2007/0218258 | A1 | | 9/2007 | Nees et al. |
| 2009/0320998 | A1 | | 12/2009 | Nees et al. |

FOREIGN PATENT DOCUMENTS

| | | |
|---|---|---|
| JP | 47-17706 U | 10/1972 |
| JP | 6-172725 A | 6/1994 |
| JP | 6-287525 A | 10/1994 |
| JP | 8-325536 A | 12/1996 |
| JP | 2657965 B2 | 9/1997 |
| JP | 3660740 B2 | 6/2005 |
| TW | 200740599 A | 11/2007 |
| WO | 00/69985 A1 | 11/2000 |
| WO | 2010/053859 A2 | 5/2010 |

OTHER PUBLICATIONS

Notice of Opinion on Examination dated May 4, 2017 from the Taiwanese Intellectual Property Office in counterpart application No. 105106998.

International Search Report dated Jun. 7, 2016 issued by the International Searching Authority in corresponding application No. PCT/JP2016/056941.

M.S. Trizno et al., "Adhesive and adhesion", Leningrad, Chemistry, 1980, pp. 26-43 (total 31 pages).

Communication dated Jul. 25, 2019 from RU Patent Office in counterpart RU Application No. 2017133851/05.

* cited by examiner

FIG. 13

ADHESIVE MEMBER TO BE ADHESIVELY FIXED THROUGH PRESSURE

CROSS REFERENCE TO RELATED APPLICATIONS

This application is a National Stage of International Application No. PCT/JP2016/056941 filed Mar. 7, 2016, claiming priority based on Japanese Patent Application No. 2015-045069 filed Mar. 6, 2015, the contents of all of which are incorporated herein by reference in their entirety.

TECHNICAL FIELD

The present invention relates to an adhesive member to be adhesively fixed through pressure, and more particularly to an adhesive member to be adhesively fixed through pressure having both of position adjustability (position adjustment function) and adhesiveness (adherence property).

BACKGROUND ART

A curable adhesive and a pressure-sensitive adhesive have been increasingly widely used in various fields of building construction, manufacturing of various products, and others, along with improvement in their performance. For example, in the building construction field, a curable adhesive and a pressure-sensitive adhesive are used for adhesively attaching a building material, such as a wallpaper, a floor material, a wall material or a ceiling material, to another building material for wall, floor or the like. On the other hand, in the manufacturing field other than the building construction field and in various other fields, a curable adhesive and a pressure-sensitive adhesive are used, e.g., for: adhesively attaching a wrapping to a vehicle body; a decorative sheet to a piece of furniture; and an optical film to another optical film or a display panel.

Generally, a curable adhesive has an advantage of being capable of strong adherence, as compared to a pressure-sensitive adhesive. Typically, a curable adhesive is used in such a way that it is applied to one of a target member to be adhesively attached, such as a wallpaper, and an adherend such as a wall, and, after adhesively attaching the target material and the adherend together, left to wait for curing thereof. Due to the necessity of waiting for curing, a curable adhesive obviously has poor work efficiency. Moreover, a curable adhesive has a disadvantage that, after being cured once, it becomes significantly difficult to adjust an attachment position.

On the other hand, a pressure-sensitive adhesive is incapable of strong adherence as well as a curable adhesive. However, a pressure-sensitive adhesive has an advantage of allowing peel-off even after performing attachment once, and of being easy to correct the attachment position.

As used therein, the term "curable adhesive" primarily means a type of adhesive in which, before use, it is in a liquid phase, whereas, after being attached, it will be transformed into a solid phase. The term "pressure-sensitive adhesive" primarily means a type of adhesive having properties of both liquid and solid phases.

In recent years, a curable adhesive or pressure-sensitive adhesive sheet formed by preliminarily applying such a curable adhesive or pressure-sensitive adhesive to a sheet has also been widely prevalent. The following Patent Document 1 discloses one example of the adhesive sheet to be adhesively fixed through pressure. This adhesive sheet is configured to bring in both of the advantage of a curable adhesive, i.e., position adjustability, and the advantage of a pressure-sensitive adhesive, i.e., adhesiveness. In the Patent Document 1, a plurality of protrusion elements each made of a low-adhesive substance or a non-adhesive substance are formed on at least one surface of a pressure-sensitive adhesive layer comprised in an adhesive sheet. Thus, during attachment, the protrusions make it possible to easily perform fine position adjustment of the adhesive sheet by a function of the low-adhesive or non-adhesive substance. On the other hand, during adhesive fixing, the low-adhesive or non-adhesive substance is displaced inside the pressure-sensitive adhesive layer by a press-contact force, to thereby enable adhesive strength of the pressure-sensitive adhesive layer to be produced. In the Patent Document 1, in order to obtain this function, it is recommended to use, as a material for the protrusion elements, gauze, non-woven fabric, woven fabric, metal mesh, shaped net or the like.

The following Patent Document 2 discloses another example of the adhesive sheet to be adhesively fixed through pressure. In the Patent Document 2, a dispersion layer in which non-adhesive solid particles each having an average particle size of 10 to 40 μm are uniformly dispersed is provided on one surface of an adhesive layer, wherein approximately one half of the solid particles protrude from the one surface of the adhesive layer by a height of about ¼ of the average particle size, thereby forming a plurality of protrusions. In the Patent Document 2, it is recommended to use, as the non-adhesive solid particles: inorganic solid particles of calcium carbonate, barium carbonate, calcium sulfate, aluminum sulfate, molybdenum disulfide, titanium oxide, alumina, silica, magnesium oxide, calcium oxide, calcium hydroxide, ferrous oxide, ferric oxide, glass beads, or the like; organic solid particles of cured rubber, ebonite, lignin/phenolic resin, polystyrene, vinyl chloride resin, (meth)acrylic resin, polypropylene resin, polyethylene resin, melamine resin, urea resin, or the like; organic balloons such as urea resin balloons, melamine resin balloons, phenolic resin balloons, polyvinylidene chloride balloons, or epoxy resin balloons; inorganic balloons such as glass balloons, Silas Balloons, carbon balloons, alumina balloons, or silica sand balloons; or the like.

CITATION LIST

Patent Document

Patent Document 1: JP 3660740B
Patent Document 2: JP 2657965B

SUMMARY OF INVENTION

Technical Problem

As seen in the Patent Documents 1 and 2, there have heretofore been some adhesive members attempting to improve both position adjustability and adhesiveness by providing a plurality of protrusion elements. These conventional adhesive members have both of the position adjustability and the adhesiveness. However, in particular, they are not capable of producing sufficient adhesiveness, as well as the position adjustability.

For example, although it has heretofore been attempted to obtain the position adjustability, using, as a material for the protrusion elements, silicone, glass, a material as disclosed in the Patent Documents 1 and 2, such as gauze, non-woven fabric, woven fabric, metal mesh, shaped net or non-adhesive solid particles, or the like, it is difficult to obtain good adhesiveness by these materials. More specifically, in the adhesive sheets to be adhesively fixed through pressure described in the Patent Documents 1 and 2, in a state in which the pressure-sensitive adhesive layer is kept in contact with an adherend member by applying a pressure for adhesively fixing thereto, silicone or the like as a material of the protrusion elements remains in a state in which it is in contact with a surface of the adherend member, so that an area of the pressure-sensitive adhesive layer being in contact with the adherend member, i.e., a contact area of the pressure-sensitive adhesive layer with respect to the adherend member, is reduced. As a result, decrease in adhesive strength is observed.

Moreover, for example, in the case where a shear adhesive strength is used to evaluate the adhesiveness, and a frictional force is used to evaluate the position adjustability, even if currently commercially available adhesive sheets are modified such that, with a view to improving the shear adhesive strength which is an index of the adhesiveness, the frictional force is set to 1 $N/cm^2$ or more at the sacrifice of the position adjustability, the resulting adhesive sheets allows obtaining a shear adhesive strength of less than 45 $N/cm^2$ at best. Therefore, it is desired to solve the above problems. For reference, the above commercially available adhesive sheets comprise: a pressure-sensitive adhesive formed using an acrylic-based copolymer; protrusion elements using a polyolefin-based mesh; and a support (backing) comprising, as its component, polyethylene-based foam.

Solution to Technical Problem

In order to solve the above problems, according to a first aspect of the present invention, there is provided an adhesive member to be adhesively fixed through pressure comprising: a support; a pressure-sensitive adhesive layer provided on one surface of the support; and a plurality of protrusion elements arranged, in spaced-apart relation to each other, on a principal surface of the pressure-sensitive adhesive layer on a side opposite to the support, wherein each of the protrusion elements is composed of an aggregation of a plurality of cohesive particles.

As used herein, the term "cohesive particles" means particles having a given cohesive force. These particles can be figured out as an aggregation of particles, and a shape of the aggregation can be deformed by a relatively weak force. Further, there is not any particular restriction of a preparation method therefor. For example, they may be particles prepared by any polymerization process such as emulsion polymerization (emulsification polymerization), suspension polymerization, miniemulsion polymerization or microemulsion polymerization, or may be a group of particles composed, for example, of particles obtained by dispersing a polymer in a dispersion liquid such as water or alcohol, or may be a group of particles each having a core-shell structure.

In the adhesive member according to the first aspect of the present invention, the protrusion elements are provided on the pressure-sensitive adhesive layer, so that an position adjustment of the adhesive member with respect to an adherend can be made by moving the adhesive member on a surface of the adherend while keeping the protrusion elements in contact with the adherend surface, and the protrusion elements can be displaced inside the pressure-sensitive adhesive layer to enable the pressure-sensitive adhesive layer to come into contact with the adherend, by applying a given pressure from the side of the other surface of the support toward the adherend while sandwiching the protrusion elements between the adherend and the pressure-sensitive adhesive layer. This makes it possible to provide an adhesive member which has both position adjustability and adhesiveness, and is capable of producing a sufficient adhesive strength in addition to the position adjustability.

Preferably, in the adhesive member according to the first aspect of the present invention, each of the protrusion elements composed of the aggregation of the plurality of cohesive particles has an elastic modulus of 5 MPa or more. This elastic modulus serves as an index representing a cohesive force of the plurality of cohesive particles composing the protrusion elements. By setting the elastic modulus to 5 MPa or more, it becomes possible to facilitate the position adjustment. As used herein, the term "elastic modulus" means a composite elastic modulus obtained by a nanoindentation test. Preferably, in the adhesive member according to the first aspect of the present invention, each of the protrusion elements has a shear adhesive strength of 2 $N/cm^2$ or more, as measured under a load of 500 g. By setting the shear adhesive strength to 2 $N/cm^2$ or more, it becomes possible to temporarily fix and positionally adjust the adhesive member even to a wall surface having a gradient, before adhesively fixing.

In this embodiment, the shear adhesive strength is used as an index for evaluating temporary fixability of the adhesive member. Adequacy of the shear adhesive strength was evaluated as follows: After cutting the adhesive member into 1 cm square, and applying a curable adhesive to the other surface of the support, the resulting adhesive member was sandwiched between two stainless steel plates as an adherend, and, in this state, subjected to press-attaching using a 500-g roller being reciprocatingly moved. Then, the stainless steel plates were placed vertically in an environment having a temperature of 23° C. and a humidity of 50%, and a time period during which the adhesive member is held without falling down from the adherend was measured.

In the adhesive member according to the first aspect of the present invention, each of the plurality of cohesive particles may comprise, as its component, alkyl acrylate ester or alkyl methacrylate ester.

In the adhesive member according to the first aspect of the present invention, each of the plurality of cohesive particles may have a core-shell structure made of a resin-based core material, and a resin-based shell material having an elastic modulus greater than that of the core material and wrapping around the core material. In this case, the core-shell structure may be formed such that a ratio of a weight of the resin-based core material to a weight of the resin-based shell material is 80% or less.

Further, at least one of the core material and the shell material of the core-shell structure may comprise, as its component, alkyl acrylate ester or alkyl methacrylate ester. In these ways, the elastic modulus of the shell material can be set to be greater than the elastic modulus of the core material, so that it is possible to enable an outer portion of the core-shell structure to have a lower frictional force so as to enhance the position adjustability, while obtaining an adequate elastic modulus by relationship with the pressure-sensitive adhesive layer, and enable the cohesive particles to be easily crushed so as to increase the adhesive strength.

In the above adhesive member, the alkyl acrylate ester comprises at least one selected from the group consisting of ethyl acrylate, propyl acrylate, n-butyl acrylate, t-butyl acrylate, n-hexyl acrylate, cyclohexyl acrylate, 2-ethylhexyl acrylate, n-octyl acrylate, and lauryl acrylate; and the alkyl methacrylate ester comprises at least one selected from the group consisting of methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, and isobornyl methacrylate.

In the adhesive member according to the first aspect of the present invention, the protrusion elements are arranged on the principal surface in a dispersed manner. Preferably, at least part of the protrusion elements are arranged on the principal surface in the form of dots. In this case, a maximum diameter of the at least part of the protrusion elements is preferably in the range of 100 μm to 3 mm.

In the adhesive member according to the first aspect of the present invention, the protrusion elements may be arranged on the principal surface in a continuous state. In this case, at least part of the protrusion elements may be arranged on the principal surface in the form of a stripe. Preferably, each of the at least part of the protrusion elements has a line width of 100 μm or more.

Preferably, in the above adhesive member, an area ratio of the protrusion elements to the principal surface is 15% or more.

Preferably, the adhesive member according to the first aspect of the present invention has a frictional force of about 0.4 N/cm$^2$ or less, with respect to a stainless steel plate serving as an adherend, as measured when the protrusion elements are in contact with a surface of the adherend. Preferably, the adhesive member according to the first aspect of the present invention has a shear adhesive strength of about 45 N/cm$^2$ or more, with respect to a stainless steel plate serving as an adherend, as measured under a load of 2 kg. It should be noted that the values "0.4 N/cm$^2$" and "45 N/cm$^2$" are set as values which are realizable by an embodiment of the present invention and appropriate from a viewpoint of actual use, and therefore considered as approximate values.

According to a second aspect of the present invention, there is provided a adhesive member to be adhesively fixed through pressure which comprises: a support; a pressure-sensitive adhesive layer provided on one surface of the support; and a plurality of protrusion elements arranged, in spaced-apart relation to each other, on a principal surface of the pressure-sensitive adhesive layer on a side opposite to the support, wherein the adhesive member has: a frictional force of about 0.4 N/cm$^2$ or less, with respect to a stainless steel plate serving as an adherend, as measured when the protrusion elements are in contact with a surface of the adherend; and a shear adhesive strength of about 45 N/cm$^2$ or more, with respect to the stainless steel plate, as measured under a load of 2 kg.

In the second aspect of the present invention, the friction force is used as an index for evaluating position adjustability of the adhesive member, and is expressed by stress measured as follows: After cutting the adhesive member into 2 cm square, the resulting adhesive member was statically placed on a stainless steel plate, such that one surface thereof comes into contact with the stainless steel plate, and then a 50-g weight member was placed on the other surface of the adhesive member to apply a force approximately evenly to the entire adhesive member, and permanently fixed to the adhesive member. In this state, the adhesive member was pulled horizontally at a speed of 300 mm/min, and a stress applied to the adhesive member during the pulling was measured. In the adhesive member according to the second aspect of the present invention, a value of the stress is about 0.4 N/cm$^2$ or less.

Further, the shear adhesive strength is used as an index for evaluating adhesiveness of the adhesive member, and is expressed by stress measured as follows: After cutting the adhesive member into 1 cm square, and applying a curable adhesive to the other surface of the support, the resulting adhesive member was sandwiched between two stainless steel plates as an adherend, and, in this state, subjected to press-attaching using a 2-kg roller being reciprocatingly moved. Subsequently, the stainless steel plates were left untouched in an environment having a temperature of 23° C. and a humidity of 50% for 30 min. Then, the adhesive member was pulled vertically at a speed of 300 mm/min, and a stress applied to the adhesive member during the pulling was measured. In the adhesive member according to the second aspect of the present invention, a value of the stress is about 45 N/cm$^2$ or more.

In the adhesive member according to the second aspect of the present invention, the protrusion elements are provided on the pressure-sensitive adhesive layer, so that an adhesively fixing position of the adhesive member with respect to an adherend can be adjusted by moving the adhesive member on a surface of the adherend while keeping the protrusion elements in contact with the adherend surface, and the protrusion elements can be displaced inside the pressure-sensitive adhesive layer to enable the pressure-sensitive adhesive layer to come into contact with the adherend, by applying a given pressure from the side of the other surface of the support toward the adherend while sandwiching the protrusion elements between the adherend and the pressure-sensitive adhesive layer.

Preferably, in the adhesive member according to the second aspect of the present invention, each of the protrusion elements is composed of an aggregation of a plurality of cohesive particles.

More preferably, in the above adhesive member, each of the protrusion elements composed of the aggregation of the plurality of cohesive particles has an elastic modulus of 5 MPa or more.

Preferably, in the adhesive member according to the second aspect of the present invention, each of protrusion elements has a shear adhesive strength of about 2 N/cm$^2$ or more, as measured under a load of 500 g.

In the adhesive member according to the second aspect of the present invention, each of the plurality of cohesive particles may comprise, as its component, alkyl acrylate ester or alkyl methacrylate ester.

In the adhesive member according to the second aspect of the present invention, each of the plurality of cohesive particles may have a core-shell structure made of a resin-based core material, and a resin-based shell material having an elastic modulus greater than that of the core material and wrapping around the core material. In this case, the core-shell structure may be formed such that a ratio of a weight of the resin-based core material to a weight of the resin-based shell material is 80% or less.

Further, at least one of the core material and the shell material of the core-shell structure may comprise, as its component, alkyl acrylate ester or alkyl methacrylate ester.

In the above adhesive member, the alkyl acrylate ester comprises at least one selected from the group consisting of ethyl acrylate, propyl acrylate, n-butyl acrylate, t-butyl acrylate, n-hexyl acrylate, cyclohexyl acrylate, 2-ethylhexyl acrylate, n-octyl acrylate, and lauryl acrylate; and the alkyl methacrylate ester comprises at least one selected from the group consisting of methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, and isobornyl methacrylate.

Preferably, in the adhesive member according to each of the first and second aspects of the present invention, the pressure-sensitive adhesive layer has a plastic strain of 0.07 or more.

The adhesive member of the present invention is configured to cause the protrusion elements to be displaced inside the pressure-sensitive adhesive layer to thereby enable the pressure-sensitive adhesive layer to come into contact with the adherend. Therefore, a relationship between the plastic strain (elastic modulus) of the pressure-sensitive adhesive layer and the elastic modulus of the protrusion elements is important. By setting the plastic strain of the pressure-sensitive adhesive layer to fall within the above range, it becomes possible to maintain a balance between the plastic strain of the pressure-sensitive adhesive layer and the elastic modulus of the protrusion elements, and obtain good results with regard to both of the position adjustability and the adhesiveness.

Preferably, in the adhesive member according to each of the first and second aspects of the present invention, a ratio of a thickness of the pressure-sensitive adhesive layer to a height dimension of each of the protrusion elements is 60 or more: 100. Further, a height dimension of each of the protrusion elements on the principal surface is preferably in the range of 1 μm to 100 μm.

By adjusting displaceability of the protrusion elements according to the relationship between the thickness of the pressure-sensitive adhesive layer and the height dimension of each of the protrusion elements, it becomes possible to obtain good results with regard to both of the position adjustability and the adhesiveness.

Preferably, in the adhesive member according to each of the first and second aspects of the present invention, the cohesive particles have an average particle size of 100 nm to 300 nm.

In the adhesive member according to each of the first and second aspects of the present invention, the support may be one selected from the group consisting of a plasterboard, a lumber, a plywood, a steel plate, a tape, a sheet and a film.

In the adhesive member according to each of the first and second aspects of the present invention, the other surface of the support is provided with a second pressure-sensitive adhesive or a curable adhesive. In this case, the adhesive member may further comprise a plurality of protrusion elements on the principal surface of the layer of the second pressure-sensitive adhesive which is provided on the other surface of the support.

Effect of Invention

The present invention can provide an adhesive member to be adhesively fixed through pressure which has both of the position adjustability and the adhesiveness and is capable of producing a sufficient adhesive strength in addition to the position adjustability.

BRIEF DESCRIPTION OF DRAWINGS

FIG. 13 is Table 1 which presents properties of the dot-shaped protrusion elements depicted in in FIG. 1(a).

DESCRIPTION OF EMBODIMENTS

Figure 1A:
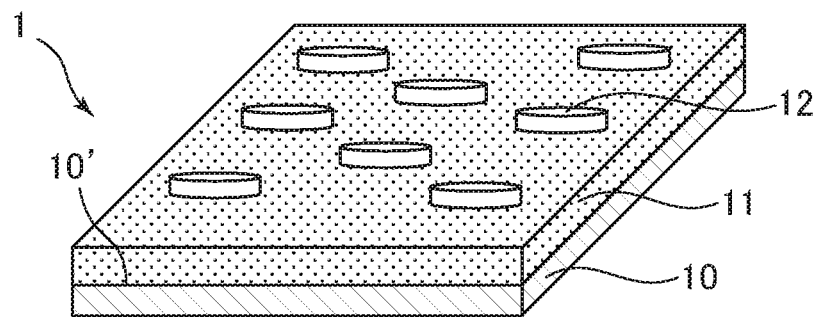
FIGS. 1(a) and 1(b) are schematic perspective views depicting an adhesive member to be adhesively fixed through pressure according to an exemplary embodiment of the present invention.

An adhesive member to be adhesively fixed through pressure according to one preferred embodiment of the present invention will now be described.

1. Basic Configuration

FIG. 1 is a schematic perspective view depicting an adhesive member to be adhesively fixed through pressure 1 according to an exemplary embodiment of the present invention. The adhesive member 1 comprises: a support 10; a pressure-sensitive adhesive layer 11 provided on one surface 10' of the support 10; and a plurality of protrusion elements 12 (12') provided on a principal surface of the pressure-sensitive adhesive layer 11 on a side opposite to the support 10, i.e., a surface of the pressure-sensitive adhesive layer 11 which is capable of substantially acting on an adherend surface during operation of positioning or adhesively fixing the adhesive member 1 with respect to the adherend surface.

Figure 1B:
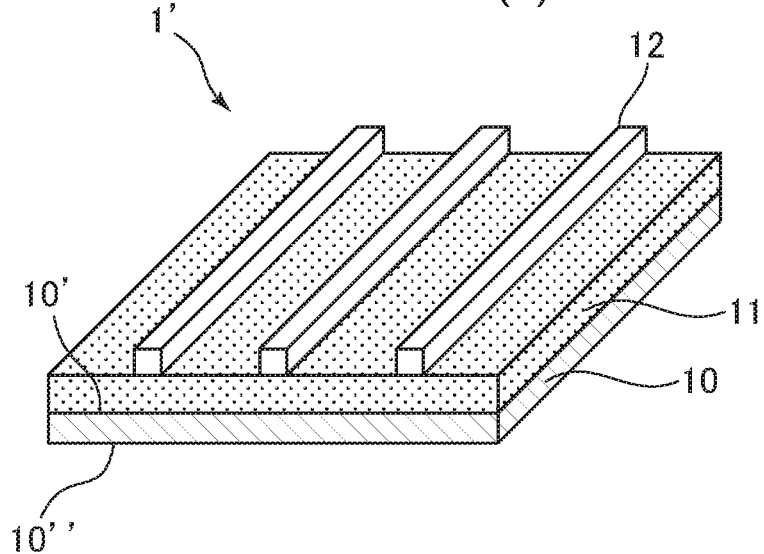

In FIG. 1(a), the plurality of protrusion elements 12 are arranged on the principal surface of the pressure-sensitive adhesive layer 11 in spaced-apart relation to each other, in a dispersed manner. As one example, they may be arranged in the form of dots. On the other hand, in FIG. 1(b), the plurality of protrusion elements 12' are arranged on the principal surface of the pressure-sensitive adhesive layer 11 in spaced-apart relation to each other, at least partly in a continuous state. As one example, they may be arranged in the form of a stripe. However, the arrangement configuration of the protrusion elements is not limited to the configurations depicted in these figures. For example, as another example of the continuous state, it is possible to employ an arrangement formed by preparing a plurality of sets of: grids having a polygonal shape such as triangle or rectangle; circular lines, wavy lines, or parallel-arranged stripes, and arranging these sets while mutually offsetting them in a stepwise manner. It is also possible to employ any other suitable arrangement as long as it can obtain an intended effect. Therefore, arrangement configuration of the protrusion elements in the present invention is not limited to a specific configuration.

Figure 2:
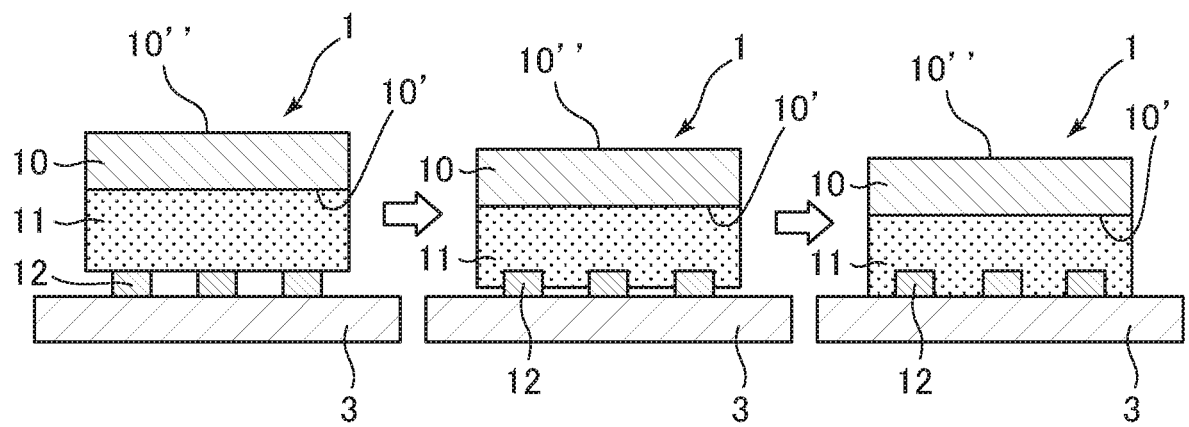
FIG. 2 is a schematic sectional view depicting the adhesive member in FIG. 1.

FIG. 2 is a schematic sectional view depicting the adhesive member 1 in FIG. 1. The protrusion elements 12 are provided on the pressure-sensitive adhesive layer 11. Thus, in this state, each of the protrusion elements 12 protrudes from the pressure-sensitive adhesive layer 11 with respect to the surface of the pressure-sensitive adhesive layer 11. When the adhesive member 1 is placed such that a protruded surface 10' of each of the protrusion elements 12 is brought into contact with an adherend 3, a contact with the adherend 3 is substantially performed mainly by top regions of the protrusion elements 12, substantially without a contact between the pressure-sensitive adhesive layer 11 and the adherent 3. The term "substantially without a contact" means that the pressure-sensitive adhesive layer 11 may be brought into contact with the adherent 3 as long as such a contact does not hinder position adjustability. Therefore, a user can adjust a position of the adhesive member 1 with respect to the adherend 3 by moving the adhesive member 1 on a surface of the adherend 3, in the state in which the protrusion elements 12 are kept in contact with the surface of the adherend 3, or by, after adhesively fixing the adhesive member 1 to the surface of the adherend 3 once, peeling and re-fixing the adhesive member 1 with respect the adherend 3, and, optionally, moving the re-fixed adhesive member 1 on the surface of the adherend 3.

After completion of the position adjustment, in the state in which the protrusion elements 12 are interposed between the adherend 3 and the pressure-sensitive adhesive layer 11, the user can press the other surface 10" of the support 10 with hand or fingers toward the adherend 3 to apply a given pressure to the adhesive member 1, to thereby cause the protrusion elements 12 to be displaced inside the pressure-sensitive adhesive layer 11 so as to enable the pressure-sensitive adhesive layer 11 to be moved close to and brought into contact with the surface of the adherend 3. Therefore, according to the pressure, in addition to the protrusion elements 12, a region of the surface of the pressure-sensitive adhesive layer 11 other than that having the protrusion elements 12 is also brought into contact with and press-bonded to the surface of the adherend 3, so that the adhesive member 1 can obtain a sufficient adhesive strength by functions of the protrusion elements 12 and the pressure-sensitive adhesive layer 11. Although not clear from the drawings, when the protrusion elements 12 are displaced inside the pressure-sensitive adhesive layer 11, a slight gap can be formed between each of the protrusion elements 12 and the pressure-sensitive adhesive layer 11, and such a gap can become a factor causing a reduction in adhesive strength. However, an influence thereof is not so large.

As above, the adhesive member 1 according to the present invention can be easily positionally adjusted before finally setting an adhesively fixing position thereof, and, after completion of the position adjustment, can be adhesively fixed to a desired position with sufficient adhesive strength.

2. Support

As a material for the support 10, it is possible to use a member having a relatively high rigidity, such as a plasterboard, a lumber, a plywood or a steel plate, or to use a relatively low rigidity, such as a tape, a sheet and a film. For example, when a tape is used as the support, the adhesive member to be adhesively fixed through pressure may be formed as an adhesive tape. When a sheet is used as the support, the adhesive member to be adhesively fixed through pressure may be formed as an adhesive sheet. When a film is used as the support, the adhesive member to be adhesively fixed through pressure may be formed as an adhesive film. Although not particularly depicted, an adhesive (layer) or a curable adhesive (layer) may be additionally provided on the other surface 10" of the support 10 to form a double-sided configuration. The adhesive member 1 formed in such a double-sided configuration can be also used as a member other than an adhesive tape, an adhesive sheet and an adhesive film, such as a wallpaper, a floor material, a wall material or a ceiling material. In this case, the adhesive member 1 is used such that the other surface 10" provided with a pressure-sensitive adhesive or a curable adhesive is preliminarily attached to one surface of a wall paper or the like, and the one surface 10' provided with the protrusion elements 12 is attached to a wall, a building material or the like serving as an adherend. The same protrusion elements as those 12 provided on the side of the one surface 10 of the support 10 may be provided on a principal surface of a pressure-sensitive adhesive layer provided on the other surface 10" of the support 10. Further, the pressure-sensitive adhesive layer 11 is not necessarily provided directly on the surface of the support 10, but an additional layer may be provided between the pressure-sensitive adhesive layer 11 and the support 10.

The following description will be made by taking an adhesive sheet having a support 10 made of polyethylene terephthalate (PET), as an example. However, it should be understood that an adhesive sheet is shown and described merely as one example of the adhesive member to be adhesively fixed through pressure of the present invention, but it is not meant to limit the present invention to an adhesive sheet.

3. Protrusion Elements 3-1. Structure of Protrusion Element

Figure 3A:
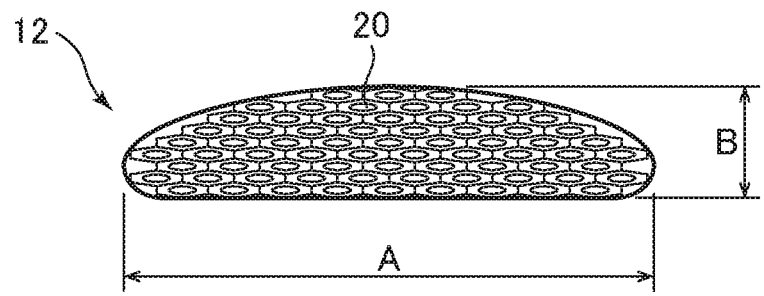
FIGS. 3(a) and 3(b) are schematic side views depicting a protrusion element.
Figure 3B:
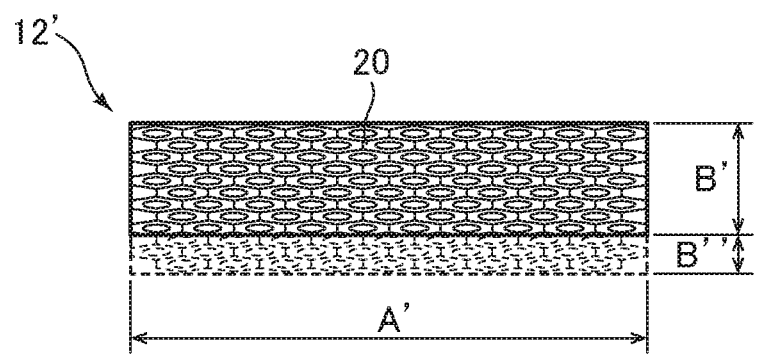

FIGS. 3(a) and 3(b) are schematic side views depicting the protrusion element 12 and the protrusion element 12' depicted in FIG. 1, respectively. FIG. 3(b) is a side view as viewed from a direction orthogonal to a longitudinal direction of the stripe. Each of the protrusion element 12 and the protrusion element 12' is composed of an aggregation of a plurality of cohesive particles 20. The cohesive particles 20 have a given cohesive force. Due to this cohesive force, the cohesive particles 20 have a given elastic modulus. In the present invention, the protrusion element is formed using the cohesive particles 20, so that it has not only a desired frictional force but also a desired shear adhesive strength and temporary fixability. The use of an additive is not indispensable because the cohesive particles 20 have a cohesive force themselves. However, in order to enhance the cohesive force, an additive such as an epoxy-based cross-linking agent or a silane coupling agent may be added thereto within a range causing no influence on performance of the protrusion elements 12.

For example, as depicted in FIG. 3(a), the dot-shaped protrusion element 12 may have a generally-flat spherical shape. In FIG. 3(a), A and B denote, respectively, a diameter and a height dimension of the protrusion element 12 in the adhesive member to be adhesively fixed through pressure. On the other hand, for example, as depicted in FIG. 3(b), the stripe-shaped protrusion element 12' may have a cross-sectionally approximately rectangular shape. In FIG. 3(b), A' and B' denote, respectively, a line width and a height dimension of the protrusion element 12 in the adhesive member to be adhesively fixed through pressure. As to the protrusion element 12', for example, in the case where the protrusion element 12' is provided by transfer, a height dimension of an initial protrusion element to be prepared before the transfer is set to (B'+B"), considering a length B" by which the piece is implanted in the pressure-sensitive adhesive layer during the transfer. A maximum diameter (the diameter is defined by the diameter maximum diameter because the protrusion elements 12 do not always have a true circle. When there is an error in diameter among the protrusion elements 12, a maximum one of the diameters is defined as the diameter thereof), the line width and the height dimension are influenced by a particle size or the like of the cohesive particles 20. Thus, it should be understood that each of these dimensions is not limited to a specific value.

<Cohesive Particles>

Figure 4:
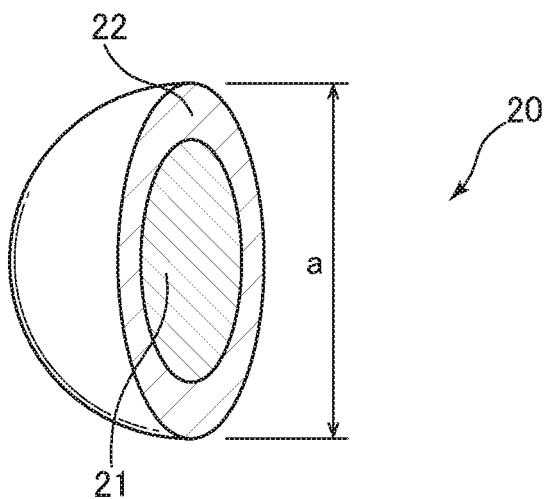
FIG. 4 is a perspective sectional view depicting a cohesive particle.

FIG. 4 is a perspective sectional view depicting the cohesive particle 20. Each of the cohesive particles 20 has an approximately spherical shape, and an average particle size a thereof is about 160 nm. However, the average particle size a may be approximately modified, while taking into account the maximum diameter, the line width and the height dimension of the protrusion elements 12. For example, the average particle size of the cohesive particles 20 set while taking into account the maximum diameter, etc., of the protrusion elements 12, is preferably 100 nm or more, more preferably, 120 nm or more, from a viewpoint of a viscosity of a water dispersion, or is preferably 300 nm or less, more preferably, 200 nm or less, from a viewpoint of cohesion of the particles after drying. In this case, the maximum diameter A of the protrusion elements 12 or the line width A' of the protrusion elements 12' is preferably 100 μm or more, more preferably, 250 nm or more, from a viewpoint of stability in shape forming of the protrusion elements, or is preferably 3 mm or less, more preferably, 2 mm or less, from a viewpoint of an attachable location. Further, the height dimension B of the protrusion elements 12 or the height dimension B' of the protrusion elements 12' is preferably 1 μm or more, more preferably, 10 μm or more, from a viewpoint of stability in position adjustability, or is preferably 100 μm or less, more preferably, 80 μm or less, from a viewpoint of appearing as irregularities on a back surface of a tape. It should be noted that all of the above values are preferable values, and the particle size, the maximum diameter and the like of the protrusion elements 12, or the line width and the like of the protrusion elements 12', is not limited to the above values.

<Measurement of Average Particle Size>

The average particle size of the cohesive particles was measured in the following manner. A cycle of processing of: randomly extracting fifty cohesive particles 12 from a large number of cohesive particles forming a certain one of the protrusion elements 12; measuring respective diameters of the fifty cohesive particles 12 by a laser diffractive scattering method; and employing a center value of the measured diameters of the fifty cohesive particles 12 (i.e., calculating a median diameter) was repeated several times to obtain several median diameters, and an average value of the several median diameters was defined as the average particle diameter.

Each of the cohesive particles 20 may have a core-shell structure, i.e., may be formed of a combination of a resin-based core material 21, and a resin-based shell material 22 wrapping around an outer periphery of the core material 21. However, each of the cohesive particles 20 does not necessarily have a core-shell structure. For example, it may be composed of only a shell layer without any core layer. The core material 21 is formed of a polymer of a monomer emulsion (A) primarily comprising butyl acrylate (BA), i.e., a water-dispersible (meth)acrylic-based copolymer (A). On the other hand, the shell material 22 may be formed of a polymer of a monomer emulsion (B) primarily comprising butyl acrylate (BA) and methyl methacrylate (MMA), i.e., a water-dispersible (meth)acrylic-based copolymer (B). Details of the core-shell structure can be analyzed, for example, by a differential scanning calorimetry (DSC), or transmission electron microscopy (TEM) or three-dimensional transmission electron microscopy (3D-TEM). In the case where each of the cohesive particles 20 does not have a core-shell structure, it may be formed of any composition.

A weight ratio between the shell material 22 and the core material 21, and a weight ratio between butyl acrylate (BA) and methyl methacrylate (MMA) in the shell material 22, can be freely changed depending on an intended purpose or required performance of the adhesive member to be adhesively fixed through pressure. In the following description, only for the sake of explanation, a ratio (L/(K+L)) of a weight (L) of the core material 21 to a total weight of the weight (L) of the core material 21 and a weight (K) of a shell material 22 will be referred to as "core-shell ratio (%)". Further, a ratio (N/(M+N)) of a weight (N) of methyl methacrylate (MMA) to a total weight of the weight (N) of methyl methacrylate (MMA) and a weight (M) of butyl acrylate (BA) will be referred to as "MMA ratio (%)".

<Core Material>

For example, as the (meth)acrylic-based copolymer (A), it is possible to use alkyl acrylate ester. Preferably, from a viewpoint of reactivity in emulsion polymerization, this alkyl acrylate ester has a certain range of solubility with respect to water. Specific examples of the alkyl acrylate ester include ethyl acrylate, propyl acrylate, n-butyl acrylate, t-butyl acrylate, n-hexyl acrylate, cyclohexyl acrylate, 2-ethylhexyl acrylate, n-octyl acrylate, and lauryl acrylate. These may be used independently or in the form of a combination of two or more thereof. Among them, it is preferable to use an alkyl acrylate ester having an alkyl group containing 3 to 9 carbon atoms, such as propyl acrylate, n-butyl acrylate, 2-ethylhexyl acrylate, or n-octyl acrylate. The alkyl acrylate ester is contained preferably in the range of 60 to 100 weight %, more preferably in the range of 70 to 99.9 weight %, furthermore preferably in the range of 80 to 99 weight %, particularly preferably in the range of 80 to 98 weight %, with respect to all monomers constituting the (meth)acrylic-based copolymer (A).

As the (meth)acrylic-based copolymer (A), it is possible to use an alkyl methacrylate ester having an alkyl group containing 1 to 18 carbon atoms, in order to control elastic modulus. Examples of the alkyl methacrylate ester include methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, and isobornyl methacrylate. These may be used independently or in the form of a combination of two or more thereof. Among them, it is preferable to use methyl methacrylate, ethyl methacrylate, or cyclohexyl methacrylate.

<Shell Material>

For example, as the (meth)acrylic-based copolymer (B), it is possible to use alkyl methacrylate ester. Preferably, from a viewpoint of reactivity in emulsion polymerization, the alkyl methacrylate ester has a certain range of solubility with respect to water. Further, from a viewpoint of being easy to control elastic modulus, the alkyl methacrylate ester preferably comprises a primary component consisting of the aforementioned alkyl methacrylate ester having an alkyl group containing 1 to 18 carbon atoms. As the alkyl methacrylate ester, various types of alkyl methacrylate esters may be used independently or in the form of a combination of two or more thereof. Specific examples of the alkyl methacrylate ester may include the same esters mentioned in connection with the (meth)acrylic-based copolymer (A).

Among them, it is preferable to use methyl methacrylate, ethyl methacrylate, t-butyl methacrylate, or isobornyl methacrylate.

The alkyl methacrylate ester is contained preferably in the range of 30 to 95 weight %, more preferably in the range of 35 to 90 weight %, furthermore preferably in the range of 40 to 80 weight %, particularly preferably in the range of 45 to 70 weight %, with respect to all monomers constituting the (meth)acrylic-based copolymer (B).

As the (meth)acrylic-based copolymer (B), it is possible to use an alkyl acrylate ester having an alkyl group containing 1 to 18 carbon atoms, in order to control elastic modulus. As the alkyl acrylate ester, various types of alkyl acrylate esters may be used independently or in the form of a combination of two or more thereof. Specific examples of the alkyl acrylate ester may include the same esters mentioned in connection with the (meth)acrylic-based copolymer (A). Among them, it is preferable to use an alkyl acrylate ester having an alkyl group containing 3 to 9 carbon atoms, such as propyl acrylate, n-butyl acrylate, 2-ethylhexyl acrylate, or n-octyl acrylate.

<Acid>

In order to improve adhesiveness of the pressure-sensitive adhesive and provide stability to the emulsion, a carboxyl group-containing monomer may be used for each of the (meth)acrylic-based copolymer (A) and the (meth)acrylic-based copolymer (B). For example, the carboxyl group-containing monomer may be a monomer having a carboxyl group, and a group with a radically-polymerizable unsaturated double bond, such as a (meth)acryloyl group or a vinyl group. Specifically, examples of such a carboxyl group-containing monomer include (meth)acrylic acid, itaconic acid, maleic acid, fumaric acid, crotonic acid, carboxyethyl acrylate, and carboxypentyl acrylate. The carboxyl group-containing monomer is contained preferably in the range of 0.1 to 8 weight %, more preferably in the range of 1 to 7 weight %, furthermore preferably in the range of 2 to 5 weight %, with respect to all monomers constituting each of the (meth)acrylic-based copolymer (A) and the (meth)acrylic-based copolymer (B).

<Emulsifying Agent>

A surfactant (emulsifying agent) for use in emulsion polymerization is not particularly limited, and it is possible to use any of various non-reactive surfactants commonly used in emulsion polymerization. For example, as the non-reactive surfactant, it is possible to use an anionic non-reactive surfactant or a nonionic non-reactive surfactant. Specific examples of the anionic non-reactive surfactant include: higher fatty acid salts such as sodium oleate; alkylarylsulfonate salts such as sodium dodecylbenzenesulfonate; alkylsulfate ester salts such as sodium laurylsulfate and ammonium laurylsulfate; polyoxyethylene alkyl ether sulfate ester salts such as sodium polyoxyethylene lauryl ether sulfate; polyoxyethylene alkyl aryl ether sulfate ester salts such as sodium polyoxyethylene nonyl phenyl ether sulfate; alkyl sulfosuccinic acid ester salts such as sodium monooctyl sulfosuccinate, sodium dioctyl sulfosuccinate, and sodium polyoxyethylene lauryl sulfosuccinate, and derivatives thereof; and polyoxyethylene distyrenated phenyl ether sulfate ester salts. Specific examples of the non-ionic surfactant include: polyoxyethylene alkyl ethers such as polyoxyethylene lauryl ether and polyoxyethylene stearyl ether; polyoxyethylene alkyl phenyl ethers such as polyoxyethylene octyl phenyl ether and polyoxyethylene nonyl phenyl ether; sorbitan higher fatty acid esters such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monostearate; glycerin higher fatty acid esters such as oleic acid monoglyceride and stearic acid monoglyceride; and polyoxyethylene-polyoxypropylene block copolymers; and polyoxyethylene distyrenated phenyl ether.

In addition to the non-reactive surfactants, it is possible to use, as the surfactant, a reactive surfactant having a radical-polymerizable functional group pertaining to an ethylenic unsaturated double bond. Examples of the reactive surfactant include a radical-polymerizable surfactant obtained by introducing a radical-polymerizable functional group (radically reactive group) such as a propenyl group or an allyl ether group, into the anionic surfactant or the nonionic surfactant. These surfactants may be appropriately used independently or in the form of a combination of two or more thereof. Among these surfactants, from a viewpoint of stability of a water dispersion, and durability of the pressure-sensitive adhesive layer, it is preferable to use the radical-polymerizable surfactant having a radical-polymerizable functional group.

Specific examples of the anionic reactive surfactant include alkyl ether-based surfactants (examples of commercially-available products include AQUALON KH-05, KH-10 and KH-20 manufactured by Dai-ichi Kogyo Seiyaku Co., Ltd., ADEKA REASOAP SR-10N and SR-20N manufactured by ADEKA CORPORATION, and LATEMUL PD-104 manufactured by Kao Corporation); sulfosuccinic acid ester-based surfactants (examples of commercially-available products include LATEMUL S-120, S-120A, S-180P, and S-180A manufactured by Kao Corporation, and ELEMINOL JS-2 manufactured by Sanyo Chemical Industries, Ltd.); alkyl phenyl ether-based or alkyl phenyl ester-based surfactants (examples of commercially-available products include AQUALON H-2855A, H-3855B, H-3855C, H-3856, HS-05, HS-10, HS-20, HS-30, BC-05, BC-10 and BC-20 manufactured by Dai-ichi Kogyo Seiyaku Co., Ltd., and ADEKA REASOAP SDX-222, SDX-223, SDX-232, SDX-233, SDX-259, SE-O1N and SE-20N manufactured by ADEKA CORPORATION); (meth)acrylate sulfate ester-based surfactants (examples of commercially-available products include ANTOX MS-60 and MS-2N manufactured by Nippon Nyukazai Co., Ltd., and ELEMINOL RS-30 manufactured by Sanyo Chemical Industries Co., Ltd.); and phosphoric acid ester-based surfactants (examples of commercially-available products include H-3330PL manufactured by Dai-ichi Kogyo Seiyaku Co., Ltd., and ADEKA REASOAP PP-70 manufactured by ADEKA CORPORATION). Examples of the nonionic reactive surfactants include alkyl ether-based surfactants (examples of commercially-available products include ADEKA REASOAP ER-10, ER-20, ER-30 and ER-40 manufactured by ADEKA CORPORATION, and LATEMUL PD-420, PD-430 and PD-450 manufactured by Kao Corporation); alkyl phenyl ether-based or alkyl phenyl ester-based surfactants (examples of commercially-available products include AQUALON RN-10, RN-20, RN-30 and RN-50 manufactured by Dai-ichi Kogyo Seiyaku Co., Ltd., and ADEKA REASOAP NE-10, NE-20, NE-30 and NE-40 manufactured by ADEKA CORPORATION); and (meth) acrylate sulfate ester-based surfactants (examples of commercially-available products include RMA-564, RMA-568 and RMA-1114 manufactured by Nippon Nyukazai Co., Ltd).

<Polymerization Initiator>

A radical polymerization initiator is not particularly limited, and it is possible to use any of various heretofore-known radical polymerization initiators commonly used in emulsion polymerization. Examples thereof include azo-based initiators such as 2,2'-azobisisobutylonitrile, 2,2'-azobis(2-methylpropionamidine)disulfate, 2,2'-azobis(2-methylpropionamidine)dihydrochloride, 2,2'-azobis(2-amidinopropane)dihydrochloride, and 2,2'-azobis[2-(2-imidazoline-2-yl)propane]dihydrochloride; persulfate-based initiators such as potassium persulfate and ammonium persulfate; peroxide-based initiators such as benzoyl peroxide, t-butyl hydroperoxide, and hydrogen peroxide; substituted ethane-based initiators such as phenyl-substituted ethane; and carbonyl-based initiators such as aromatic carbonyl compounds. These polymerization initiators may be appropriately used independently or in the form of a combination of two or more thereof. In the emulsion polymerization, a redox system initiator using a reducing agent in combination with the polymerization initiator may be employed, if desired. This makes it easy to accelerate an emulsion polymerization rate, and perform the emulsion polymerization at low temperatures. Examples of such a reducing agent include reducing organic compounds such as ascorbic acid, erythorbic acid, tartaric acid, citric acid, glucose, and metal salts of formaldehyde sulfoxylate or the like; reducing inorganic compounds such as sodium thiosulfate, sodium sulfite, sodium bisulfite, and sodium metabisulfite; and ferrous chloride; Rongalite; and thiourea dioxide.

3-2. Production of Protrusion Elements

One example of a production method for the protrusion elements will be described.

<Production of Cohesive Particles>

Each of the protrusion elements is composed of a plurality of cohesive particles. Each cohesive particle 20 itself has a cohesive force. Thus, an aggregation of cohesive particles 20 can form the protrusion element by itself.

As mentioned above, a cohesive particle 20 includes one type with a core-shell structure, and another type without a core-shell structure. The former cohesive particle 20 with a core-shell structure can be obtained by multistage emulsion polymerization comprising forming a copolymer serving as a core layer by emulsion polymerization and then forming a copolymer serving as a shell layer by emulsion polymerization in the presence of the copolymer serving as the core layer. More specifically, the copolymer serving as the core layer or the shell layer can be formed in each of the emulsion polymerizations by polymerizing, in water, a monomer component for forming the copolymer serving as the core layer or the shell layer, in the presence of an emulsifying agent (surfactant) and a radical polymerization initiator. On the other hand, the latter cohesive particle 20 without a core-shell structure can be produced by forming only a shell layer through polymerization, without forming any core layer.

The above emulsion polymerization of the monomer component may be performed by a conventional process. In the emulsion polymerization, for example, an emulsifying agent (surfactant), a radical polymerization initiator, and, as needed, a chain transfer agent or the like, may be appropriately added and mixed together with the monomer component. More specifically, in the emulsion polymerization, a heretofore-known emulsion polymerization process such as a batch mixing process (batch polymerization process), a monomer dropping process or a monomer emulsion dropping process, may be employed. In the monomer dropping process, continuous dropping or divided dropping is appropriately selected. These processes may be appropriately combined. Reaction conditions or the like may be appropriately selected. For example, a polymerization temperature is preferably in the range of about 40 to 95° C., and a polymerization time is preferably in the range of about 30 minutes to 24 hours.

As one example, a polymerization process for cohesive particles 20 having a core-shell ratio of 50% and an MMA ratio of 50%, will be explained below. As to cohesive particles 20 having an MMA ratio and/or a core-shell ratio other than the above, they are also produced by a process based on the following polymerization process.

First of all, in order to produce a core material for the cohesive particles 20, 3 weight parts of LATEMUL E-118B (manufactured by Kao Corporation) as a surfactant and 205 weight parts of ion-exchanged water were added to 100 weight parts of butyl acrylate (BA) to produce a mixture as a raw material in a container, and the mixture was steered using a homomixer (manufactured by PRIMIX Corporation) at 6000 rpm, in a nitrogen atmosphere for 5 minutes, to prepare a monomer emulsion (A).

Then, in order to produce a shell material for the cohesive particles 20, 50 weight parts of methyl methacrylate (MMA), 1 weight parts of LATEMUL E-118B and 87.5 weight parts of ion-exchanged water were added to 50 weight parts of butyl acrylate (BA) to produce a mixture as a raw material in another container, and the mixture was stirred using the homomixer at 6000 rpm, in a nitrogen atmosphere for 5 minutes, to prepare a monomer emulsion (B).

Subsequently, all of the prepared monomer emulsion (A) was charged into a reaction vessel provided with a cooling tube, a nitrogen-introducing tube, a temperature gauge, a dropping device and a stirring blade. Then, after replacing an internal atmosphere of the vessel with nitrogen while stirring the monomer emulsion (A), the reaction solution was heated to a temperature of 60° C., and 0.1 weight parts of V-50 (manufactured by Wako Pure Chemical Industries, Ltd.) as a water-soluble azo polymerization initiator was added to 50 weight parts of butyl acrylate (BA) to induce polymerization for 2 hours while maintaining the reaction solution at 60° C. to obtain a copolymer serving as a core layer. Subsequently, 0.5 weight parts of V-50 was further added to 50 weight parts of butyl acrylate (BA), and the monomer emulsion (B) was dropped while the reaction solution was maintained at 60° C., by taking 2.5 hours, to form a shell layer and obtain a water dispersion containing core-shell structured polymer emulsion particles having a solid content concentration of 40%. An average particle size of the obtained polymer emulsion particles was 160 nm. It should be understood that the average particle size can be freely changed. The prepared water-dispersible pressure-sensitive adhesive composition was diluted by distilled water to allow the solid content concentration to become 0.5 weight % or less, and then a number average molecular weight of the polymer emulsion particles was measured using the following device:

Device: laser diffractive scattering particle size distribution analyzer (LS13 320, manufactured by Beckman Coulter, Inc.; PIDS mode);

Refractive index of dispersed material: 1.48 (Poly n-BA (poly-n-butyl acrylate was used); and Refractive index of dispersion medium: 1.333.

As to cohesive particles 20 having a core-shell ratio and/or an MMA ratio other than the above, they are also produced by a process based on the above polymerization process.

<Arrangement of Protrusion Elements>
(Dot-shaped Protrusion Elements)

As a method for providing the dot-shaped protrusion elements 12 depicted in FIG. 1(*a*) on the pressure-sensitive adhesive layer 11, it is possible to suitably use, for example, a method comprising dropping the obtained emulsion using a dispenser, a method comprising transferring the emulsion using a gravure roll on which a pattern to be formed is incised, or any of various commonly-used printing techniques such as screen printing, offset printing and flexographic printing.

FIG. 1(*a*) depicts a hexagonal close-packed structure-like arrangement in which the dot-shaped protrusion elements 12 are approximately evenly arranged in a checked pattern. It is to be understood that the arrangement is not limited thereto, but may be any other arrangement such as a square arrangement. Depending on an area ratio of the protrusion elements to the principal surface of the pressure-sensitive adhesive layer (hereinafter referred to as "protrusion element area ratio"), a distance between adjacent ones of the protrusion elements 12 is preferable about 1.1 to 10 times, more preferably about 1.5 to 5 times, a maximum diameter of the protrusion elements 12 in top plan view (the maximum diameter corresponds to A in FIG. 3(*a*)).

(Stripe-shaped Protrusion Elements)

As a method for providing the stripe-shaped protrusion elements 12' depicted in FIG. 1(*b*) on the pressure-sensitive adhesive layer 11, it is possible to suitably use, for example, screen printing, slot die coating or any of various commonly-used printing techniques such as screen printing, offset printing and flexographic printing.

As one example, in the case of providing the stripe-shaped protrusion elements 12' using as screen printing, first of all, a screen printer is used to apply the emulsion onto a PET film applied with a silicone-based release agent, to form a plurality of protrusion elements arranged on the film in the form of a stripe, and the protrusion elements are dried. Subsequently, the obtained stripe-shaped protrusion elements are put on an adhesive sheet by a given pressure, and transferred onto a surface of the adhesive sheet. In this process, a portion of each of the protrusion elements 12' will sink into the adhesive sheet (the portion corresponds to B" in FIG. 3(*b*)). Depending on an area ratio of the protrusion elements to the principal surface of the pressure-sensitive adhesive layer (hereinafter referred to as "protrusion element area ratio"), a distance between adjacent ones of the protrusion elements 12' is preferable about 1.1 to 10 times, more preferably about 1.5 to 5 times, a line width of the protrusion elements 12' (the line width corresponds to A' in FIG. 3(*a*)). Differently from the screen printing, in the slot die coating, the protrusion element is directly pushed out onto the adhesive sheet, so that this protrusion element is free of the phenomenon that a portion thereof sinks into the adhesive sheet. Thus, the portion corresponding to B" in FIG. 3(*b*) is not necessary.

3-3. Properties of Protrusion Elements

Figure 13:
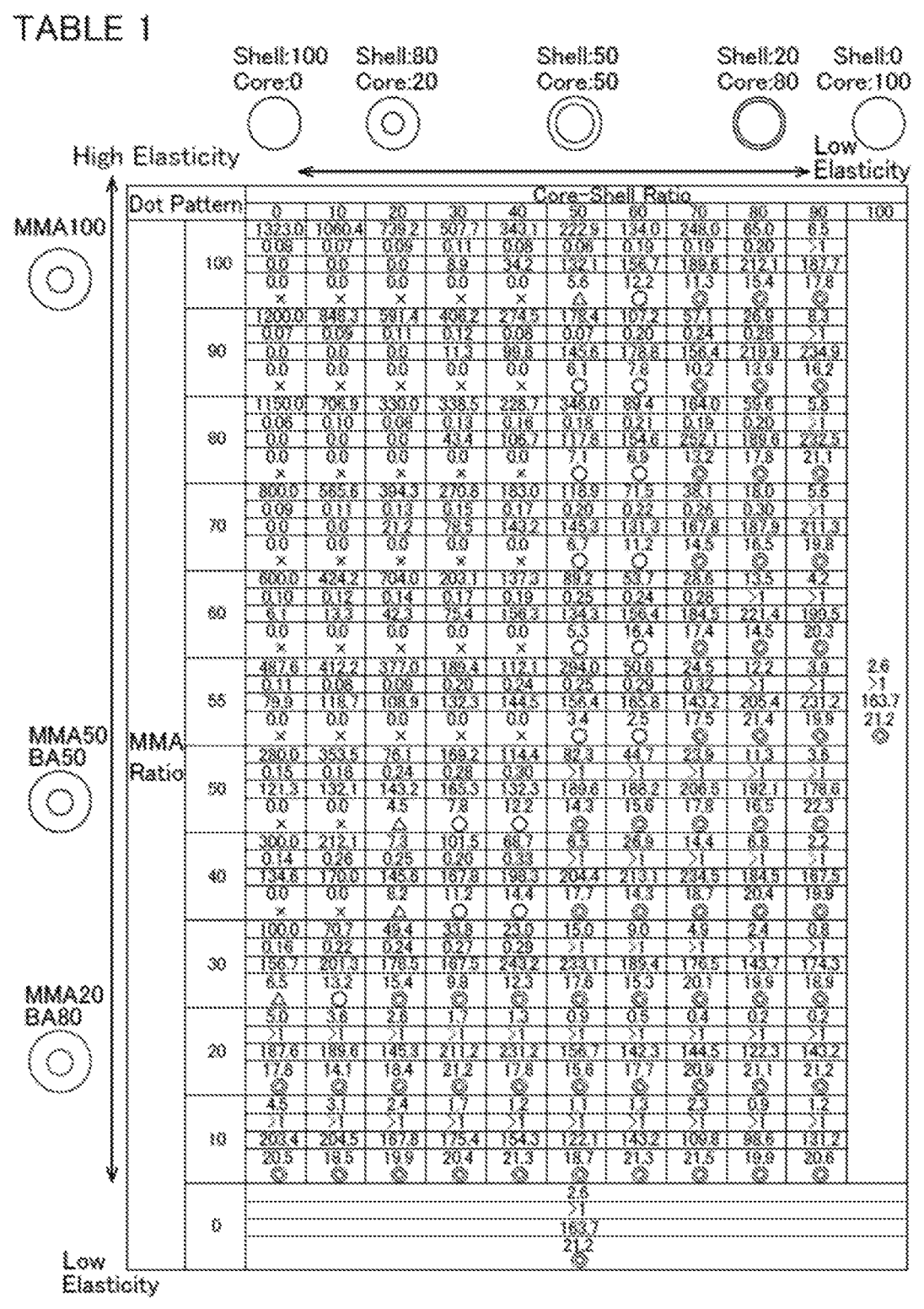

Tables 1 to 3 present properties of the protrusion elements produced in the "3-2. Production of Protrusion Elements". Table 1 (FIG. 13) presents properties of the dot-shaped protrusion elements depicted in FIG. 1(*a*). Although both of Tables 2 and 3 relate to the stripe-shaped protrusion elements depicted in FIG. 1(*b*), Table 2 presents properties thereof measured when a force is applied along a direction of the stripe line (longitudinal direction), and Table 3 presents properties thereof measured when a force is applied along a direction orthogonal to the direction of the stripe line (lateral direction). In other words, Tables 2 and 3 present, respectively, two sets of measurement values measured using the same sample, but measured while changing a direction along which a force is applied to the sample.

TABLE 2

| Longitudinal Stripe | | Core-Shell Ratio | | | | | | | | | |
|---|---|---|---|---|---|---|---|---|---|---|---|
| | | 0 | 10 | 20 | 30 | 40 | 50 | 60 | 70 | 80 | 90 | 100 |
| MMA Ratio | 100 | 1323.0 | 1060.4 | 739.2 | 507.7 | 343.1 | 222.9 | 134.0 | 248.0 | 65.0 | 6.5 | 2.6 |
| | | 0.08 | 0.08 | 0.06 | 0.11 | 0.09 | 0.13 | 0.18 | 0.20 | 0.22 | >1 | >1 |
| | | 0.0 | 0.0 | 0.0 | 0.0 | 34.3 | 131.2 | 161.2 | 194.2 | 211.6 | 211.7 | 165.8 |
| | | 0.0 | 0.0 | 0.0 | 0.0 | 0.0 | 6.7 | 12.0 | 12.1 | 18.1 | 19.6 | 23.3 |
| | | X | X | X | X | X | Δ | ○ | ◎ | ◎ | ◎ | ◎ |
| | 90 | 1200.0 | 848.3 | 591.4 | 406.2 | 274.5 | 178.4 | 107.2 | 57.1 | 26.9 | 8.3 | |
| | | 0.08 | 0.09 | 0.11 | 0.13 | 0.13 | 0.15 | 0.21 | 0.23 | 0.29 | >1 | |
| | | 0.0 | 0.0 | 0.0 | 11.1 | 65.3 | 131.1 | 167.7 | 169.1 | 222.1 | 224.1 | |
| | | 0.0 | 0.0 | 0.0 | 0.0 | 0.0 | 6.1 | 8.4 | 11.2 | 13.1 | 15.5 | |
| | | X | X | X | X | X | ○ | ○ | ◎ | ◎ | ◎ | |
| | 80 | 1150.0 | 706.9 | 330.0 | 338.5 | 228.7 | 346.0 | 89.4 | 164.0 | 59.6 | 5.8 | |
| | | 0.07 | 0.09 | 0.08 | 0.14 | 0.17 | 0.19 | 0.22 | 0.23 | 0.25 | >1 | |
| | | 0.0 | 0.0 | 0.0 | 41.1 | 104.1 | 119.1 | 162.2 | 170.5 | 192.1 | 221.5 | |
| | | 0.0 | 0.0 | 0.0 | 0.0 | 0.0 | 7.5 | 7.6 | 11.8 | 14.5 | 18.9 | |
| | | X | X | X | X | X | ○ | ○ | ◎ | ◎ | ◎ | |
| | 70 | 800.0 | 565.6 | 394.3 | 270.8 | 183.0 | 118.9 | 71.5 | 38.1 | 18.0 | 5.6 | |
| | | 0.09 | 0.11 | 0.13 | 0.15 | 0.18 | 0.21 | 0.22 | 0.28 | 0.32 | >1 | |
| | | 0.0 | 0.0 | 21.5 | 79.5 | 123.1 | 131.2 | 133.0 | 170.0 | 190.3 | 219.8 | |
| | | 0.0 | 0.0 | 0.0 | 0.0 | 0.0 | 7.4 | 12.1 | 15.7 | 17.8 | 20.9 | |
| | | X | X | X | X | X | ○ | ○ | ◎ | ◎ | ◎ | |
| | 60 | 600.0 | 424.2 | 704.0 | 203.1 | 137.3 | 89.2 | 53.7 | 28.6 | 13.5 | 4.2 | |
| | | 0.08 | 0.09 | 0.15 | 0.18 | 0.20 | 0.26 | 0.26 | 0.31 | >1 | >1 | |
| | | 6.2 | 13.4 | 41.8 | 76.1 | 157.3 | 158.9 | 158.4 | 186.9 | 224.2 | 221.7 | |
| | | 0.0 | 0.0 | 0.0 | 0.0 | 0.0 | 5.7 | 17.8 | 18.3 | 18.2 | 22.1 | |
| | | X | X | X | X | X | ○ | ○ | ◎ | ◎ | ◎ | |
| | 55 | 487.6 | 412.2 | 377.0 | 189.4 | 112.1 | 294.0 | 50.6 | 24.5 | 12.2 | 3.9 | |
| | | 0.09 | 0.09 | 0.10 | 0.21 | 0.26 | 0.27 | 0.31 | 0.35 | >1 | >1 | |
| | | 57.9 | 120.1 | 121.4 | 134.0 | 146.3 | 153.4 | 165.0 | 169.8 | 208.1 | 234.1 | |
| | | 0.0 | 0.0 | 0.0 | 0.0 | 0.0 | 3.7 | 10.5 | 19.1 | 23.4 | 22.9 | |
| | | X | X | X | X | X | ○ | ○ | ◎ | ◎ | ◎ | |

TABLE 2-continued

| Longitudinal | | Core-Shell Ratio | | | | | | | | | | |
|---|---|---|---|---|---|---|---|---|---|---|---|---|
| Stripe | | 0 | 10 | 20 | 30 | 40 | 50 | 60 | 70 | 80 | 90 | 100 |
| | 50 | 280.0 | 353.5 | 76.1 | 169.2 | 114.4 | 82.3 | 44.7 | 23.9 | 11.3 | 3.6 | |
| | | 0.14 | 0.19 | 0.24 | 0.31 | 0.32 | >1 | >1 | >1 | >1 | >1 | |
| | | 122.9 | 133.8 | 144.5 | 147.8 | 156.2 | 192.1 | 193.5 | 209.3 | 194.5 | 189.5 | |
| | | 00 | 0.0 | 4.7 | 8.6 | 12.6 | 15.4 | 16.5 | 18.6 | 18.9 | 21.5 | |
| | | X | X | Δ | ○ | ○ | ◎ | ◎ | ◎ | ◎ | ◎ | |
| | 40 | 300.0 | 212.1 | 7.3 | 101.5 | 68.7 | 6.5 | 26.9 | 14.4 | 6.8 | 2.2 | |
| | | 0.15 | 0.27 | 0.27 | 0.28 | 0.35 | >1 | >1 | >1 | >1 | >1 | |
| | | 136.3 | 147.8 | 153.4 | 170.0 | 201.4 | 207.1 | 212.1 | 223.1 | 198.6 | 189.7 | |
| | | 0.0 | 0.0 | 9.0 | 12.3 | 15.6 | 18.9 | 19.9 | 20.4 | 21.2 | 21.9 | |
| | | X | X | Δ | ○ | ○ | ◎ | ◎ | ◎ | ◎ | ◎ | |
| | 30 | 100.0 | 70.7 | 49.4 | 33.8 | 23.0 | 15.0 | 9.0 | 4.9 | 2.4 | 0.8 | |
| | | 0.17 | 0.23 | 0.26 | 0.29 | 0.35 | >1 | >1 | >1 | >1 | >1 | |
| | | 158.7 | 173.3 | 180.9 | 187.7 | 215.6 | 225.6 | 199.8 | 176.7 | 165.5 | 176.4 | |
| | | 7.3 | 14.3 | 16.5 | 15.9 | 16.7 | 19.2 | 19.8 | 22.1 | 21.8 | 20.9 | |
| | | Δ | ○ | ◎ | ◎ | ◎ | ◎ | ◎ | ◎ | ◎ | ◎ | |
| | 20 | 5.0 | 3.6 | 2.6 | 1.7 | 1.3 | 0.9 | 0.5 | 0.4 | 0.2 | 0.2 | |
| | | >1 | >1 | >1 | >1 | >1 | >1 | >1 | >1 | >1 | >1 | |
| | | 190.0 | 192.1 | 198.3 | 200.9 | 210.1 | 176.4 | 167.4 | 154.3 | 147.8 | 145.3 | |
| | | 10.6 | 14.5 | 17.3 | 19.1 | 19.6 | 18.9 | 19.5 | 21.3 | 22.8 | 23.1 | |
| | | ◎ | ◎ | ◎ | ◎ | ◎ | ◎ | ◎ | ◎ | ◎ | ◎ | |
| | 10 | 4.5 | 3.1 | 2.4 | 1.7 | 1.2 | 1.1 | 1.3 | 2.3 | 0.9 | 1.2 | |
| | | >1 | >1 | >1 | >1 | >1 | >1 | >1 | >1 | >1 | >1 | |
| | | 201.2 | 188.9 | 170.4 | 167.8 | 156.9 | 146.9 | 145.1 | 142.1 | 142.1 | 137.8 | |
| | | 22.6 | 20.4 | 20.8 | 22.4 | 23.4 | 21.5 | 23.4 | 23.7 | 21.9 | 22.7 | |
| | | ◎ | ◎ | ◎ | ◎ | ◎ | ◎ | ◎ | ◎ | ◎ | ◎ | |
| | 0 | | | | | | 2.6 | | | | | |
| | | | | | | | >1 | | | | | |
| | | | | | | | 165.8 | | | | | |
| | | | | | | | 23.3 | | | | | |
| | | | | | | | ◎ | | | | | |

TABLE 3

| Lateral | | Core-Shell Ratio | | | | | | | | | | |
|---|---|---|---|---|---|---|---|---|---|---|---|---|
| Stripe | | 0 | 10 | 20 | 30 | 40 | 50 | 60 | 70 | 80 | 90 | 100 |
| MMA Ratio | 100 | 1323.0 | 1060.4 | 739.2 | 507.7 | 343.1 | 222.9 | 134.0 | 248.0 | 65.0 | 6.5 | 2.6 |
| | | 0.08 | 0.08 | 0.09 | 0.11 | 0.09 | 0.13 | 0.20 | 0.21 | 0.22 | >1 | >1 |
| | | 0.0 | 0.0 | 0.0 | 8.9 | 31.3 | 130.2 | 150.8 | 190.3 | 210.0 | 188.7 | 165.0 |
| | | 0.0 | 0.0 | 0.0 | 0.0 | 0.0 | 6.3 | 13.3 | 14.4 | 17.8 | 20.1 | 24.0 |
| | | X | X | X | X | X | Δ | ○ | ◎ | ◎ | ◎ | ◎ |
| | 90 | 1200.0 | 848.3 | 591.4 | 406.2 | 274.5 | 178.4 | 107.2 | 57.1 | 26.9 | 8.3 | |
| | | 0.07 | 0.08 | 0.08 | 0.11 | 0.13 | 0.14 | 0.20 | 0.23 | 0.25 | >1 | |
| | | 0.0 | 0.0 | 0.0 | 11.6 | 67.3 | 132.1 | 155.4 | 189.9 | 221.1 | 232.0 | |
| | | 0.0 | 0.0 | 0.0 | 0.0 | 0.0 | 6.9 | 8.6 | 10.9 | 17.5 | 18.4 | |
| | | X | X | X | X | X | Δ | ○ | ◎ | ◎ | ◎ | |
| | 80 | 1150.0 | 706.9 | 330.0 | 338.5 | 228.7 | 346.0 | 89.4 | 164.0 | 59.6 | 5.8 | |
| | | 0.06 | 0.09 | 0.09 | 0.13 | 0.17 | 0.18 | 0.22 | 0.23 | 0.26 | >1 | |
| | | 0.0 | 0.0 | 0.0 | 43.8 | 97.5 | 106.7 | 157.8 | 199.4 | 198.2 | 211.9 | |
| | | 0.0 | 0.0 | 0.0 | 0.0 | 0.0 | 7.6 | 10.7 | 13.1 | 19.5 | 23.2 | |
| | | X | X | X | X | X | ○ | ○ | ◎ | ◎ | ◎ | |
| | 70 | 800.0 | 565.6 | 394.3 | 270.8 | 183.0 | 118.9 | 71.5 | 38.1 | 18.0 | 5.6 | |
| | | 0.09 | 0.11 | 0.14 | 0.15 | 0.16 | 0.22 | 0.23 | 0.27 | 0.31 | >1 | |
| | | 0.0 | 0.0 | 21.3 | 65.3 | 141.2 | 145.6 | 154.3 | 169.3 | 189.5 | 213.1 | |
| | | 0.0 | 0.0 | 0.0 | 0.0 | 0.0 | 9.1 | 12.6 | 15.6 | 18.1 | 21.3 | |
| | | X | X | X | X | X | ○ | ○ | ◎ | ◎ | ◎ | |
| | 60 | 600.0 | 424.2 | 704.0 | 203.1 | 137.3 | 89.2 | 53.7 | 28.6 | 13.5 | 4.2 | |
| | | 0.10 | 0.12 | 0.13 | 0.17 | 0.19 | 0.23 | 0.25 | 0.29 | >1 | >1 | |
| | | 6.1 | 13.2 | 43.7 | 76.1 | 145.0 | 146.5 | 157.6 | 186.2 | 199.7 | 201.3 | |
| | | 0.0 | 0.0 | 0.0 | 0.0 | 0.0 | 6.0 | 13.2 | 17.8 | 17.9 | 22.7 | |
| | | X | X | X | X | X | ○ | ○ | ◎ | ◎ | ◎ | |
| | 55 | 487.6 | 412.2 | 377.0 | 189.4 | 112.1 | 294.0 | 50.6 | 24.5 | 12.2 | 3.9 | |
| | | 0.12 | 0.13 | 0.15 | 0.21 | 0.25 | 0.26 | 0.30 | 0.33 | >1 | >1 | |
| | | 80.4 | 119.1 | 113.3 | 120.9 | 143.2 | 157.8 | 167.3 | 174.3 | 199.3 | 209.3 | |
| | | 0.0 | 0.0 | 0.0 | 0.0 | 0.0 | 8.4 | 15.2 | 19.8 | 21.6 | 23.0 | |
| | | X | X | X | X | X | ○ | ○ | ◎ | ◎ | ◎ | |
| | 50 | 280.0 | 353.5 | 76.1 | 169.2 | 114.4 | 82.3 | 44.7 | 23.9 | 11.3 | 3.6 | |
| | | 0.16 | 0.19 | 0.25 | 0.28 | 0.31 | >1 | >1 | >1 | >1 | >1 | |
| | | 122.2 | 131.6 | 141.6 | 156.4 | 164.6 | 185.4 | 189.6 | 203.1 | 193.4 | 189.1 | |
| | | 00 | 0.0 | 5.1 | 8.8 | 13.8 | 16.2 | 16.7 | 20.1 | 18.6 | 25.1 | |
| | | X | X | Δ | ○ | ○ | ◎ | ◎ | ◎ | ◎ | ◎ | |

TABLE 3-continued

| Lateral Stripe | | Core-Shell Ratio | | | | | | | | | | |
|---|---|---|---|---|---|---|---|---|---|---|---|---|
| | | 0 | 10 | 20 | 30 | 40 | 50 | 60 | 70 | 80 | 90 | 100 |
| | 40 | 300.0 | 212.1 | 7.3 | 101.5 | 68.7 | 6.5 | 26.9 | 14.4 | 6.8 | 2.2 | |
| | | 0.14 | 0.25 | 0.26 | 0.29 | 0.34 | >1 | >1 | >1 | >1 | >1 | |
| | | 142.1 | 156.4 | 162.3 | 169.1 | 195.3 | 201.4 | 214.0 | 204.2 | 184.3 | 156.3 | |
| | | 0.0 | 0.0 | 9.1 | 11.5 | 15.6 | 20.0 | 21.4 | 21.2 | 22.3 | 22.0 | |
| | | X | X | Δ | ○ | ○ | ◎ | ◎ | ◎ | ◎ | ◎ | |
| | 30 | 100.0 | 70.7 | 49.4 | 33.8 | 23.0 | 15.0 | 9.0 | 4.9 | 2.4 | 0.8 | |
| | | 0.17 | 0.22 | 0.25 | 0.28 | 0.30 | >1 | >1 | >1 | >1 | >1 | |
| | | 158.0 | 202.9 | 179.9 | 168.8 | 173.2 | 167.4 | 178.4 | 177.9 | 144.8 | 175.7 | |
| | | 7.3 | 14.9 | 17.4 | 11.1 | 13.9 | 19.9 | 17.3 | 22.7 | 22.5 | 21.4 | |
| | | Δ | ○ | ◎ | ◎ | ◎ | ◎ | ◎ | ◎ | ◎ | ◎ | |
| | 20 | 5.0 | 3.6 | 2.6 | 1.7 | 1.3 | 0.9 | 0.5 | 0.4 | 0.2 | 0.2 | |
| | | >1 | >1 | >1 | >1 | >1 | >1 | >1 | >1 | >1 | >1 | |
| | | 177.7 | 178.5 | 181.2 | 167.4 | 164.5 | 158.0 | 143.4 | 145.7 | 144.1 | 144.3 | |
| | | 20.1 | 15.9 | 20.8 | 24.0 | 20.1 | 17.6 | 20.0 | 23.6 | 23.8 | 24.0 | |
| | | ◎ | ◎ | ◎ | ◎ | ◎ | ◎ | ◎ | ◎ | ◎ | ◎ | |
| | 10 | 4.5 | 3.1 | 2.4 | 1.7 | 1.2 | 1.1 | 1.3 | 2.3 | 0.9 | 1.2 | |
| | | >1 | >1 | >1 | >1 | >1 | >1 | >1 | >1 | >1 | >1 | |
| | | 167.8 | 177.6 | 169.6 | 178.3 | 161.0 | 156.7 | 141.1 | 113.1 | 109.9 | 121.6 | |
| | | 23.2 | 20.9 | 22.5 | 23.1 | 24.1 | 21.1 | 24.1 | 24.3 | 22.5 | 23.3 | |
| | | ◎ | ◎ | ◎ | ◎ | ◎ | ◎ | ◎ | ◎ | ◎ | ◎ | |
| | 0 | | | | | | 2.6 | | | | | |
| | | | | | | | >1 | | | | | |
| | | | | | | | 165.0 | | | | | |
| | | | | | | | 24.0 | | | | | |
| | | | | | | | ◎ | | | | | |

In each of the table, a vertical axis represents the MMA ratio, and a horizontal axis represents the core-shell ratio. Evaluation items included in each field corresponding to respective ratios are elastic modulus (MPa), frictional force (N/cm²), shear adhesive strength (N/cm²), and temporary fixability (N/cm²), which are described in order from the top. The elastic modulus (MPa) is an index for evaluating the cohesive force of the cohesive particles 20 composing the protrusion element 12, and the frictional force (N/cm²) is an index for evaluating the position adjustability of the adhesive sheet 1. The shear adhesive strength (N/cm²) is an index for evaluating the adhesiveness of the adhesive sheet 1, and the temporary fixability (N/cm²) is an index for evaluating whether or not the adhesive sheet 1 can be temporarily fixed to a wall surface before, for example, adhesively fixing. As is evident from these tables, properties of the dot-shaped protrusion elements, properties of the longitudinal stripe-shaped protrusion elements and properties of the lateral stripe-shape protrusion elements were almost the same, although there was a slight difference among them. Details of measurement and evaluation methods for the elastic modulus (MPa), the frictional force (N/cm²), the shear adhesive strength (N/cm²) and the temporary fixability (N/cm²) are as follows.

<Measurement of Elastic Modulus>

Figure 5A:
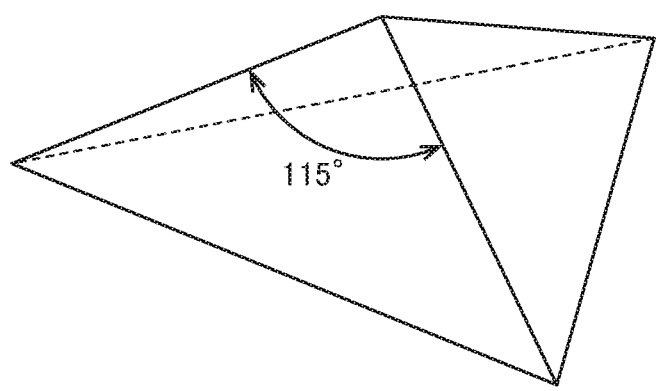
FIGS. 5(a) and 5(b) are explanatory diagrams of a measurement method for an elastic modulus of the protrusion element.
Figure 5B:
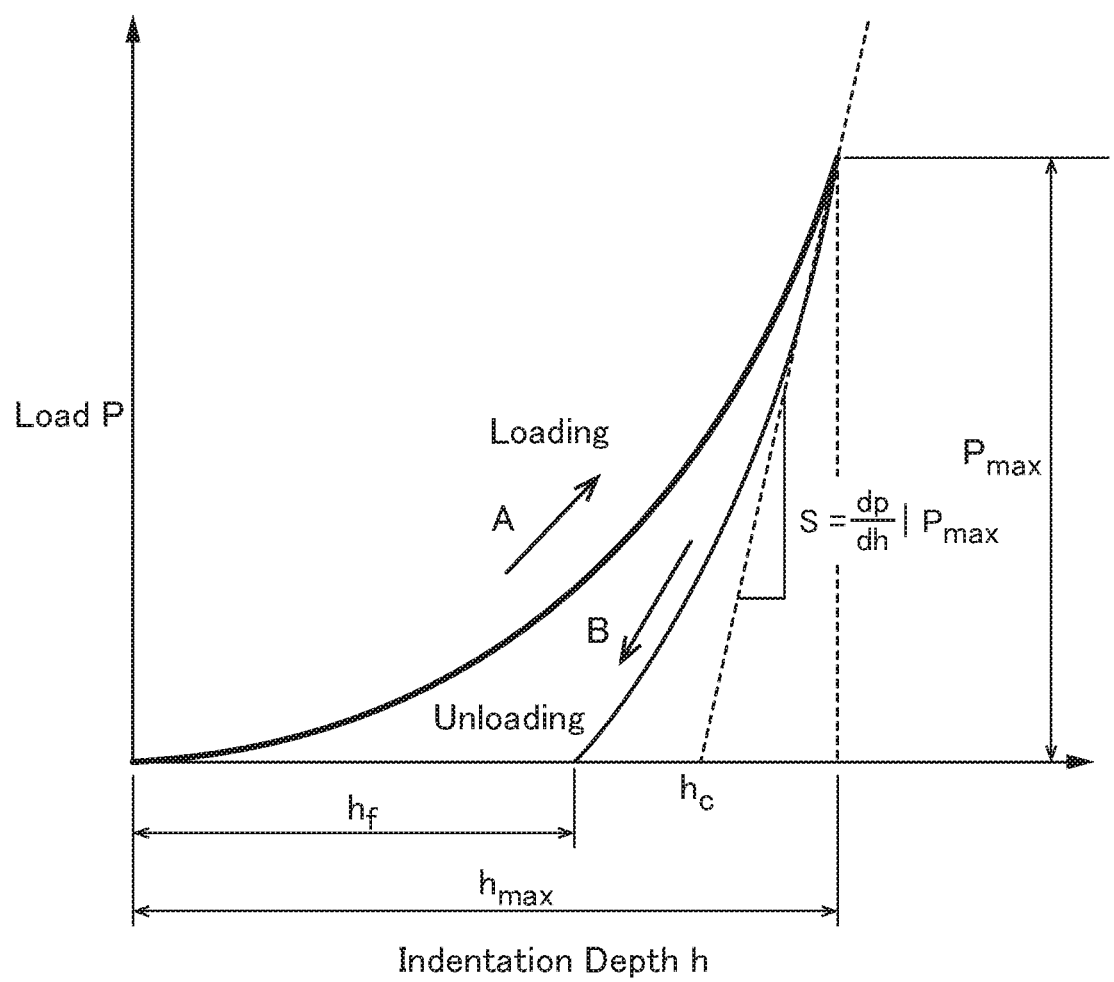

With reference to FIG. 5, a measurement method for the elastic modulus of the protrusion element 12 will be described. As used herein, the term "elastic modulus" means a composite elastic modulus to be obtained by a nanoindentation test using a nanoindenter "TriboScope" manufactured by HYSITRON Inc. The nanoindentation test comprises: a step of gradually applying a load P to a Berkovich indenter (triangular pyramid-shaped indenter made of diamond) to push the indenter into a target member to be tested until the load P becomes a maximum load Pmax (hereinafter referred to as "loading step"); a step of holding the load P at the maximum load Pmax for a given time (hereinafter referred to as "holding step"); and a step of, after the holding, gradually unloading to pull out the indenter until the load P becomes 0 (hereinafter referred to as "unloading step"), wherein the nanoindentation test is designed to measure an elastic property of the target member based on a relationships between the load P on the indenter and an indentation depth h, obtained by the above steps. The indentation depth h means a distance between a tip of the indenter, and a surface of the target member in an initial state (a surface of the target member before pushing the indenter thereinto), and corresponds to an amount of displacement of the indenter on the basis of a position where the indenter is initially brought into contact with the surface of the target member.

Based on the relationship between the load P on the indenter and the indentation depth h obtained by the above indentation test, the elastic modulus of the protrusion element 12 is calculated by the following formula (1):

$$Er = 1/\beta \cdot S/2 \cdot (\pi/A)^{1/2} \tag{1}$$

In this formula (1), Er denotes the elastic modulus, and β denotes a constant determined by a shape of the indenter. In case of using the Berkovich indenter, β was set to 1.034. Further, S, π and A denote, respectively, a contact rigidity modulus, the circumference ratio and a contact projection area between the indenter and the surface of the target member.

(Contact Rigidity Modulus)

The contact rigidity modulus S is calculated based on the relationship between the load P on the indenter and the indentation depth h obtained in the unloading step during the indentation test. More specifically, the contact rigidity modulus S is defined by a slope of an unloading curve just after transition to the unloading step after an elapse of the holding time since a position of the indenter reaches a maximum indentation depth hmax (indentation depth to be obtained when the maximum load Pmax is applied). In other words, the contact rigidity modulus S means a gradient (dP/dh) of a tangential line L to the unloading curve at the point (hmax, Pmax).

(Contact Projection Area)

The contact projection area A means an area obtained by projecting, in an indentation direction of the indenter, an area of a contact region between the indenter and the target member when the position of the indenter reaches to the maximum indentation depth hmax. Supposing that a depth of this contact region (contact depth) is hc, the contact projection area A in case of using the Berkovich indenter can be approximated by the following formula (2):

$$A=24.56 \cdot hc^2$$

The contact depth hc is expressed as the following formula (3), using the maximum indentation depth hmax, the maximum load Pmax and the contact rigidity modulus S.

The measurement in the nanoindentation test and analysis of the elastic modulus were performed using measurement and analysis software TriboScan Ver. 8.0.0.4 manufactured by Hystron Inc.

(Measurement Conditions)

The measurement was performed under the following conditions:

Indentation speed in loading and unloading steps: 200 μN/sec;

Holding time: 15 seconds; and

Maximum indentation depth (indentation depth at time of transition to unloading step): 0.9 to 1.1 μm.

(Test Sample)

1 mL of solution of emulsion for the protrusion elements was directly applied to a SUS holder (thickness: 1.2 mm, diameter: 15 mm) in the form of a dot using a dispenser, and air-dried in an environment having a temperature of 23° C. and a humidity of 50%, for 1 hour or more. In this process, the solution was adjusted to allow a height dimension of each sample after the air drying to become 20 μm. As to any sample which has not been bonded to the SUS holder, a sample piece after the air drying was bonded to the SUS holder using correction liquid "EZL1-W" manufactured by Pentel CO. Ltd.

The elastic modulus of the protrusion element 12 is an index for primarily evaluating the cohesive force of the cohesive particles 20 composing the protrusion element 12. However, as described with reference to FIG. 2, considering that the protrusion element 12 is displaced inside the pressure-sensitive adhesive layer 11 to enable the pressure-sensitive adhesive layer 11 to come into contact with a surface of a adherend 3, the elastic modulus of the protrusion element 12 is closely related to the elastic modulus of the pressure-sensitive adhesive layer 11, and also has an influence on displaceability into the pressure-sensitive adhesive layer 11. As a result, it also has an influence on the position adjustability and the adhesiveness.

<Measurement of Frictional Force>

Figure 6:
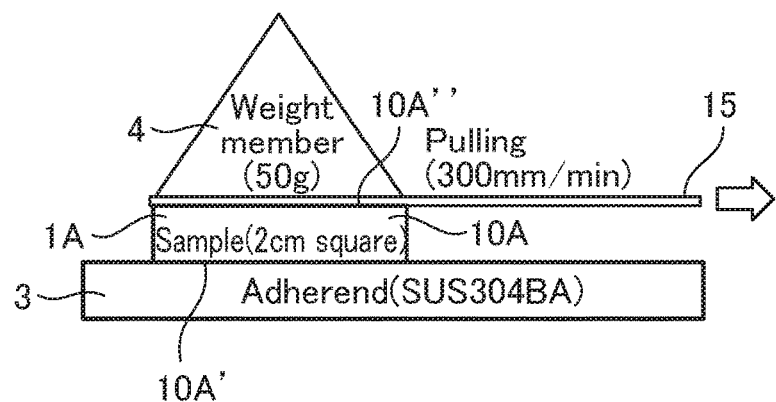
FIG. 6 is an explanatory diagram of a measurement method for a frictional force of the protrusion element.

With reference to FIG. 6, a measurement method for the frictional force of the protrusion elements 12 will be described. A sample 1A as a measurement target was produced by arranging the dot-shaped protrusion elements (12) or the stripe-shaped protrusion elements (12') directly on one surface 10A' of a PET substrate 10A without providing any pressure-sensitive adhesive (11). An arrangement method for the protrusion elements is in accordance with an aftermentioned method in Inventive Example 1 (see FIG. 9) for the dot-shaped protrusion elements (12), and in accordance with an aftermentioned method in Inventive Example 15 (see FIG. 10) for the stripe-shaped protrusion elements (12'). The sample 1A was cut into 2 cm square and stationarily placed on a stainless steel plate (SUS 304BA, thickness: 400 μm, length: 100 mm, width: 30 mm, mass: 9.5 g) 3 as a adherend, in such a manner as to allow the one surface 10A' of the PET substrate 10A provided with the protrusion elements (12) to come into contact with the stainless steel plate 3. Subsequently, a PET substrate 15 having a size of 2 cm×10 cm was permanently fixed onto the sample 1A using an adhesive tape. A 50 g weight member 4 was placed on the other surface 10A" of the PET substrate 10A in such a manner as to approximately evenly apply a force to the entire sample 1A, and permanently fixed to the sample 1A. In this state, a stress (N/cm²) imposed on the sample 1A when pulling the sample 1A in a horizontal direction at a speed of 300 mm/min was measured and defined as the frictional force. In this process, as to the longitudinal stripe presented in Table 2, a direction of the stripe line was set to conform to a direction of the pulling. On the other hand, as to the lateral stripe presented in Table 3, the direction of the stripe line was set to become orthogonal to the direction of the pulling. A weight of the PET substrate 10A is small (about 0.45 g/cm²), and a weight of a pressure-sensitive adhesive is also small (about 0.40 g/cm²), so that these weights substantially never exert an influence on measurement results. The weight of the weight member was set to 50 g according to empirical values. As mentioned above, the frictional force is an index for evaluating the position adjustability of the adhesive sheet 1. During position adjustment of the adhesive sheet 1, a user moves the adhesive sheet 1 on a surface of an adherend 3 (adherend surface) while pressing the adhesive sheet 1 against the surface of the adherend 3. Thus, in the above method, supposing that a pressure to be applied from the adhesive sheet 1 to the adherend 3 when the user manipulates the other surface 10A" of the adhesive sheet 1 is about 12.5 g/cm², the above value 50 g was obtained from the supposed value by back calculation. It should be noted that the weight 50 g is based on the assumption that the weight of the sample 1A has substantially no influence on the stainless steel plate 3. Thus, in the case where a material other than the PET substrate is used as the support and a weight of the material substantially exerts an influence on the stainless steel plate 3, it is obviously necessary to subtract such a weight from 50 g.

For enabling a user to freely move the adhesive sheet 1 on the surface of the adherend 3, the frictional force is preferably less than 0.5 N/cm², more preferably 0.4 N/cm² or less. If the frictional force is equal to or greater than 0.5 N/cm², position adjustment by sliding movement becomes difficult. On the other hand, when the frictional force is less than 0.4 N/cm², position adjustment can be performed without stress.

<Measurement of Shear Adhesive Strength>

Figure 7:
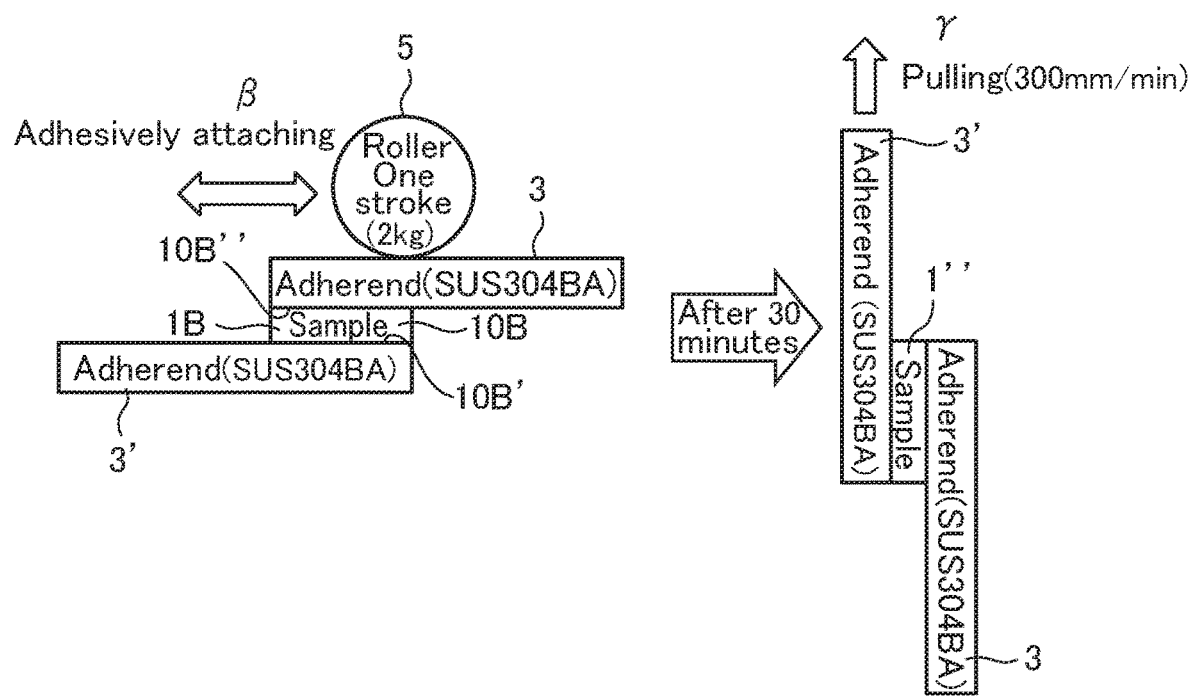
FIG. 7 is an explanatory diagram of a measurement method for a shear adhesive strength of the protrusion element.

The measurement of the shear adhesive strength is performed by a method based on JIS K6850. With reference to FIG. 7, a measurement method for the shear adhesive strength of the protrusion elements (12, 12') will be described.

A sample 1B as a measurement target was produced by arranging the dot-shaped protrusion elements (12) or the stripe-shaped protrusion elements (12') directly on one surface 10B' of a PET substrate 10B without providing any pressure-sensitive adhesive (11), as with the sample 1A. An arrangement method for the protrusion elements is in accordance with the aftermentioned method in Inventive Example 1 (see FIG. 9) for the dot-shaped protrusion elements (12), and in accordance with the aftermentioned method in Inventive Example 15 (see FIG. 10) for the stripe-shaped protrusion elements (12'). A curable adhesive, specifically "Aron Alph" (manufactured by Toagosei Company, Ltd.) was applied to the other surface 10B" of the sample 1B. The sample 1B was cut into 1 cm square and sandwiched between two horizontally-disposed adherends, specifically two stainless steel plates (SUS 304BA, thickness: 400 μm, length: 100 mm, width: 30 mm, mass: 9.5 g) 3, 3'. In this state, a 2 kg roller 5 was moved on the stainless steel plate 3 by one stroke to cause the one surface 10B' to be press-attached to the adherend 3' and cause the other surface 10B" to be permanently fixed to the adherend 3. After the press-attaching and permanently fixing, the resulting laminate was left in an environment having a temperature of 23° C. and a humidity of 50%, for 30 minutes. Then, the adherend 3 was permanently fixed to TENSILON (manufactured by Shimadzu Corporation) in such a manner as to allow the sample 1B to extend vertically. In this state, the adherend 3' was pulled vertically at a pulling speed of 300 mm/min, and a stress applied to the sample 1B during the pulling was measured. A weight of a PET substrate 10B of the sample 1B is small (about 0.45 g/cm$^2$), and a weight of a pressure-sensitive adhesive is also small (about 0.40 g/cm$^2$), so that these weights substantially never exert an influence on measurement results. It should be noted that the weight 2 kg of the roller is based on the assumption that the weight of the sample 1B has substantially no influence on the stainless steel plate 3'. Thus, in the case where a material other than the PET substrate is used as the support and a weight of the material substantially exerts an influence on the stainless steel plate 3', it is obviously necessary to subtract such a weight from 2 kg.

As described with reference to FIG. 2, the adhesive sheet 1 is configured such that the protrusion elements 12 are displaced inside the pressure-sensitive adhesive layer 11 to enable the pressure-sensitive adhesive layer 11 to come into contact with a surface of an adherend 3. However, even in such a situation, it is rare that each of the protrusion elements 12 is fully implanted into the pressure-sensitive adhesive layer 11. Thus, the protrusion elements 12 can be exposed to the surface of the adherend 3 to exert an influence on the adhesiveness of the adhesive sheet 1. Therefore, from a viewpoint of obtaining sufficient adhesiveness of the adhesive sheet 1, the shear adhesive strength of the protrusion elements 12 is preferably a relatively large value.

<Evaluation of Temporary Fixability>

In the case where the adhesive sheet 1 is, for example, adhesively fixed to a wall surface having a slope, e.g., a vertical wall surface, it is desirable that the adhesive sheet 1 can be temporally fixed to the wall surface before adhesively fixed. For example, if the adhesive sheet 1 can be held on a wall surface only by lightly pushing it against the wall surface, it is possible to facilitate subsequent position adjustment and adhesive fixing work to thereby significantly improve work efficiency. The protrusion elements 12 also make it possible to obtain such temporary fixability. Insofar as the present applicant can know, there has not been an adhesive sheet capable of bringing out such temporary fixability.

Figure 8:
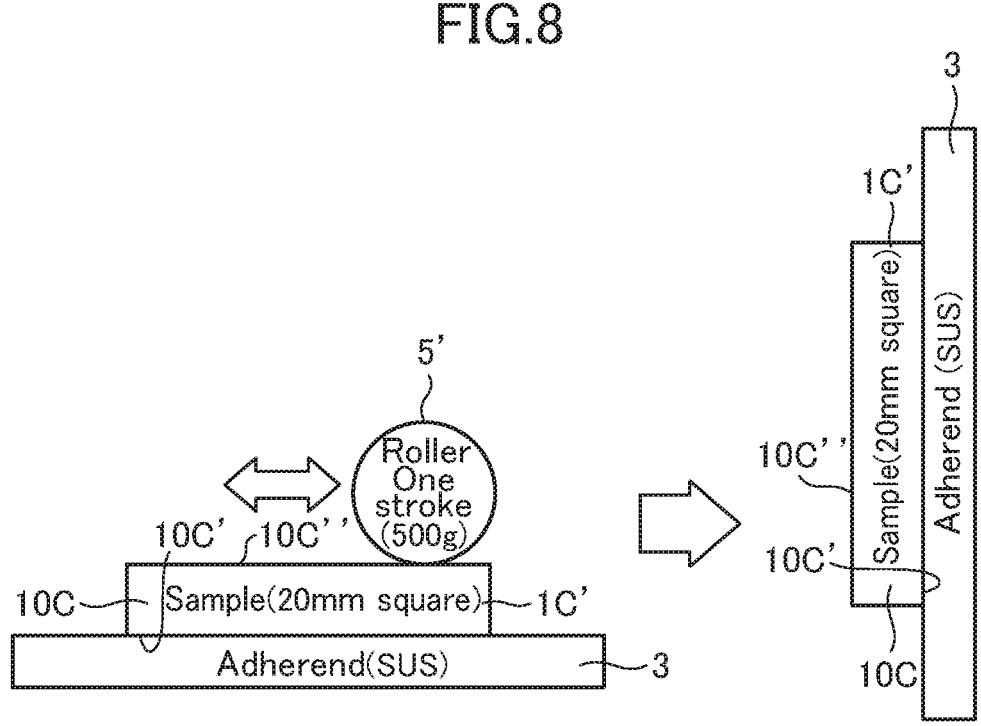
FIG. 8 is an explanatory diagram of an evaluation method for temporary fixability of the protrusion element.

With reference to FIG. 8, an evaluation method for the temporary fixability of the protrusion elements 12 will be described. In order to express the temporary fixability by a numerical value, the shear adhesive strength was measured in the same manner as that depicted in FIG. 7. However, differently from FIG. 7, in this method, a 500 g roll was used, instead of the 2 kg roller 5, and a sample having a size of 2 cm square was used, as described below.

A sample 1C as a measurement target was produced by arranging the dot-shaped protrusion elements (12) or the stripe-shaped protrusion elements (12') directly on one surface 10C' of a PET substrate 10C without providing any pressure-sensitive adhesive (11). An arrangement method for the protrusion elements is in accordance with the aftermentioned method in Inventive Example 1 (see FIG. 9) for the dot-shaped protrusion elements (12), and in accordance with the aftermentioned method in Inventive Example 15 (see FIG. 10) for the stripe-shaped protrusion elements (12'). The sample 1C was cut into 2 cm square, and stationarily placed on a stainless steel plate (SUS 304BA, thickness: 400 μm, length: 100 mm, width: 30 mm, mass: 9.5 g) 3 as a adherend, in such a manner as to allow the one surface 10A' of the PET substrate (10) provided with the protrusion elements (12) to come into contact with the stainless steel plate 3. Subsequently, a 500 g roller 5' was moved on the other surface 10B" by one stroke to cause the one surface 10B' to be press-attached to the adherend 3. The weight of the roller 5' was set to 500 g according to empirical values. As mentioned above, the temporary fixability is an index for evaluating whether or not, in a situation where the adhesive sheet 1 is, for example, adhesively fixed, to a wall surface having a slope, the adhesive sheet 1 can be temporarily fixed to the wall surface before the adhesive fixing. During the temporary fixation of the adhesive sheet 1, a user pushes the adhesive sheet 1 against a surface of an adherend 3 (adherend surface) by a given force. Thus, in the above method, supposing that a pressure to be applied to the adhesive sheet 1 by the user is about 0.04 MPa, the above value 500 g was obtained from the supposed value by back calculation. Immediately after the press-attaching, the stainless steel plate 3 was positioned vertically, and a period of time during which the adhesive sheet 1 was held on the adherend 3 without falling therefrom was measured. In this process, as to the longitudinal stripe presented in Table 2, a direction of the stripe line was set to become perpendicular to the ground. On the other hand, as to the lateral stripe presented in Table 3, the direction of the stripe line was set to become horizontal to the ground. A weight of the PET substrate is small (about 0.45 g/cm$^2$), and a weight of a pressure-sensitive adhesive is also small (about 0.40 g/cm$^2$), so that these weights substantially never exert an influence on measurement results. In Tables 1 to 3, any sample 1C held on the adherend 3 for 30 min or more was evaluated as ⊚, and any sample 1C held on the adherend 3 for 10 min to less than 30 min was evaluated as ○. Further, any sample 1C held on the adherend 3 for less than 10 min and for any length of time was evaluated as Δ, and any sample 1C fell off just after attachment was evaluated as x. This evaluation result shows that a shear adhesive strength required for the temporary fixation is preferably 2 N/cm$^2$ or more (evaluation result: Δ or better), more preferably 5 N/cm$^2$ or more, furthermore preferably 10 N/cm$^2$ or more.

As is evident from Tables 1 to 3, all of values of the elastic modulus, the frictional force and the shear adhesive strength of the protrusion elements 12 and the evaluation of the temporary fixability are influenced by the core-shell structure of the cohesive particle 20, more specifically by the MMA ratio and the core-shell ratio.

Generally, the elastic modulus tends to become larger as the MMA ratio becomes larger, and tends to become smaller as the core-shell ratio becomes larger. This is probably because methyl methacrylate (MMA) has a larger elastic modulus than that of butyl acrylate (BA), wherein the shell material (22) comprises butyl acrylate (BA) and methyl methacrylate (MMA) and the core material (21) primarily comprises butyl acrylate (BA), as mentioned above. In this case, it is natural that the shell material (22) has an elastic modulus greater than that of the core material (21).

With regard to the frictional force, a preferred value of 0.4 N/cm$^2$ or less was obtained when the MMA ratio is relatively large (e.g., the MMA ratio is 30% or more when the core-shell ratio is 0%), or when the core-shell ratio is relatively small (e.g., the core-shell ratio is 80% or less when the MMA ratio is 100%).

With regard to the shear adhesive strength, a good value of 45 N/cm² or more, capable of satisfying both of the position adjustability and the adhesiveness, which has not been achievable by conventional configurations, was obtained when the MMA ratio is relatively small (e.g., the MMA ratio is 55% or less when the core-shell ratio is 0%), or when the core-shell ratio is relatively large (e.g., the core-shell ratio is 50% or mores when the MMA ratio is 100%), contrary to the frictional force.

With regard to the temporary fixability, the evaluation becomes worse when the MMA ratio is relatively large (e.g., the MMA ratio is 40% or more when the core-shell ratio is 0%), or when the core-shell ratio is relatively small (e.g., the core-shell ratio is 40% or less when the MMA ratio is 100%).

4. Pressure-Sensitive Adhesive

A pressure-sensitive adhesive usable in the adhesive sheet 1 is not particularly limited. Examples of the pressure-sensitive adhesive include various heretofore-known pressure-sensitive adhesives such as urethane-based pressure-sensitive adhesive, acrylic-based pressure-sensitive adhesive, rubber-based pressure-sensitive adhesive, silicone-based pressure-sensitive adhesive, polyester-based pressure-sensitive adhesive, polyamide-based pressure-sensitive adhesive, epoxy-based pressure-sensitive adhesive, vinyl alkyl ether-based pressure-sensitive adhesive, and fluorine-based pressure-sensitive adhesive. Those pressure-sensitive adhesives may be used independently or in the form of a combination of two or more thereof. The pressure-sensitive adhesive may be in any form, and examples thereof include emulsion-type pressure-sensitive adhesive, solvent-type pressure-sensitive adhesive, and hot melt-type pressure-sensitive adhesive.

For example, in an acrylic-based pressure-sensitive adhesive, an acrylic polymer which comprises a primary component consisting of one or more of alkyl acrylate esters or alkyl methacrylate esters and has a weight-average molecular weight of 10,000 or more. Specific examples of the alkyl acrylate ester include ethyl acrylate, propyl acrylate, n-butyl acrylate, t-butyl acrylate, n-hexyl acrylate, cyclohexyl acrylate, 2-ethylhexyl acrylate, n-octyl acrylate, and lauryl acrylate. These may be use independently or in the form of a combination of two or more thereof. Among them, it is preferable to use an alkyl acrylate ester having an alkyl group containing 3 to 9 carbon atoms, such as propyl acrylate, n-butyl acrylate, 2-ethylhexyl acrylate, or n-octyl acrylate.

As other components, it is possible to appropriately use a component for improvement in cohesive force and heat resistance, such as sulfonic acid group-containing monomers, phosphoric acid group-containing monomers, cyano group-containing monomers, vinyl esters, or aromatic vinyl compounds, or use a component having a functional group acting to improve the adhesive strength or as a cross-linking base point, such as carboxyl group-containing monomers, acid anhydride group-containing monomers, hydroxyl group-containing monomers, amide group-containing monomers, amino group-containing monomers, epoxy group-containing monomers, N-acryloyl morpholine, or vinyl ethers, wherein they are used to obtain a glass-transition temperature Tg of 0° C. or less (typically, −100° C. or more) for the reason that it facilitates balancing adherence properties. These components may be used independently or in the form of a combination of two or more thereof.

Examples of the sulfonic acid group-containing monomers include styrenesulfonic acid, allylsulfonic acid, 2-(meth)acrylamido-2-methylpropanesulfonic acid, (meth) 2-(meth)acrylamidopropanesulfonic acid, sulfopropyl (meth)acrylate, and (meth)acryloyloxynaphthalenesulfonic acid. Examples of the phosphoric acid group-containing monomers include 2-hydroxyethyl acryloyl phosphate.

Examples of the cyano group-containing monomers include acrylonitrile. Examples of the vinyl esters include vinyl acetate.

Examples of the aromatic vinyl compounds include styrene. Examples of the carboxyl group-containing monomers include (meth)acrylic acid, carboxyethyl (meth)acrylate, carboxypentyl (meth)acrylate, itaconic acid, maleic acid, fumaric acid, and crotonic acid. Examples of the acid anhydride group-containing monomers include maleic anhydride and itaconic anhydride.

Examples of the hydroxyl group-containing monomers include 2-hydroxyethyl (meth)acrylate, 2-hydroxypropyl (meth)acrylate, 4-hydroxybutyl (meth) acrylate, 6-hydroxyhexyl (meth) acrylate, 8-hydroxyoctyl (meth)acrylate, 10-hydroxydecyl (meth)acrylate, 12-hydroxylauryl (meth) acrylate, (4-hydroxymethylcyclohexyl)-methylacrylate, N-methylol(meth)acrylamide, vinyl alcohol, allyl alcohol, 2-hydroxyethyl vinyl ether, 4-hydroxybutyl vinyl ether, and diethylene glycol monovinyl ether.

Examples of the amide group-containing monomers include acrylamide and dimethylacrylamide. Examples of the amino group-containing monomers include N,N-dimethylaminoethyl (meth)acrylate and N,N-dimethylaminopropyl (meth)acrylate. Examples of the epoxy group-containing monomers include glycidyl (meth)acrylate and allyl glycidyl ether.

In the pressure-sensitive adhesive for use in the adhesive sheet 1, an acrylic polymer may be cross-linked therewith to obtain more excellent heat resistance. Specific examples of a cross-linking method include a technique of adding a compound having a group capable of reacting with a carboxyl group, a hydroxyl group, an amino group, an amide group or the like appropriately contained, as a cross-linking base point, in an acrylic polymer such as a polyisocyanate compound, an epoxy compound or an aziridine compound to induce reaction, so-called "method using a cross-linking agent".

Examples of the polyisocyanate compound include: a lower aliphatic polyisocyanate such as buthylene diisocyanate and hexamethylene diisocyanate; alicyclic polyisocyanate such as cyclopenthylen diisocyanate, cyclohexylene diisocyanate, and isochrones diisocyanate; aromatic polyisocyanate such as 2,4-tolylene diisocyanate, 4,4'-diphenylmethane diisocyanate, and xylene diisocyanate; and an isocyanate adduct such as an adduct of trimethylolpropane and tolylene diisocyanate trimer (trade name: CORONATE L), an adduct of trimethylolpropane and hexamethylene diisocyanate (trade name: CORONATE HL), or isocyanurate of hexamethylene diisocyanate (trade name: CORONATE HX) [each manufactured by Nippon Polyurethane Industry Co., Ltd.]. Examples of the epoxy compound include N,N,N',N'-tetraglycidyl-m-xylenediamine (trade name: TETRAD-X) and 1,3-bis(N,N-diglycidylaminomethyl)cyclohexane (trade name: TETRAD-C) [each manufactured by Mitsubishi Gas Chemical Company, Inc.] These cross-linking agents may be used independently or in the form of a combination of two or more thereof. An amount of the cross-linking agent(s) to be used may be appropriately selected depending on balance with the acrylic polymer to be cross-linked and an intended use of the adhesive sheet.

Further, it is possible to appropriately add, to the pressure-sensitive adhesive for use in the adhesive sheet 1, any of various heretofore-known additives such as a tackifier, a surface lubricant, a leveling agent, an antioxidant, a corrosion inhibitor, a light stabilizer, an ultraviolet absorber, a polymerization inhibitor, a silane coupling agent, an inorganic or organic filler, a metal powder and a pigment, in the form of a powder, particle or foil, depending on intended uses.

5. Properties of Adhesive Sheet
5-1. Evaluation Results

With regard to adhesive sheets using various pressure-sensitive adhesives and various protrusion elements, shear adhesive strength and frictional force were evaluated. As with the evaluation of the properties of the protrusion elements, the shear adhesive strength is an index for evaluating the adhesiveness of the adhesive sheet 1, and expressed by stress, and the frictional force is an index for evaluating the position adjustability of the adhesive sheet 1, and expressed by stress. However, the frictional force of the adhesive sheet 1 is substantially provided by the protrusion elements. Thus, the frictional force indicates a common value for both of the adhesive sheet and the protrusion elements.

Evaluation results are presented in the following Table 4. The evaluation results about the shear adhesive strength and the frictional force in each adhesive sheet according to the present invention are described in two columns on the right end of Table 4.

TABLE 4

|  |  | Monomer | | Functional Group | | Polymerization Solvent | | weight-average molecular weight | Cross-linking Agent | | Gel Fraction % |
|  | Pattern Type | BA | 2EHA | HEA | AA | Ethyl acetate | Toluene |  | TETRAD-C | CORO-NATE-L |  |
| --- | --- | --- | --- | --- | --- | --- | --- | --- | --- | --- | --- |
| Inventive Example 1 | 1 mm dot | 95 |  |  | 5 | 80 | 20 | 5.4E+05 | 0.04 |  | 50 |
| Inventive Example 2 | 1 mm dot | 95 |  |  | 5 | 80 | 20 | 5.4E+05 | 0.5 |  | 90 |
| Inventive Example 3 | 1 mm dot | 95 |  |  | 5 | 100 | 0 | 1.1E+06 | 0.02 |  | 50 |
| Inventive Example 4 | 1 mm dot |  | 95 |  | 5 | 80 | 20 | 5.1E+05 | 0.04 |  | 50 |
| Inventive Example 5 | 1 mm dot | 98 |  |  | 2 | 80 | 20 | 4.9E+05 | 0.2 |  | 50 |
| Inventive Example 6 | 1 mm dot | 95 |  |  |  | 80 | 20 | 5.1E+05 |  | 0.5 | 50 |
| Inventive Example 7 | 1 mm dot | 95 |  |  | 5 | 0 | 100 | 2.3E+05 | 0.15 |  | 50 |
| Inventive Example 8 | 1 mm dot | 95 |  |  | 5 | 80 | 20 | 5.4E+05 | 0.02 |  | 20 |
| Inventive Example 9 | 1 mm dot | 95 |  |  | 5 | 80 | 20 | 5.4E+05 | 0.04 |  | 50 |
| Inventive Example 10 | 1 mm dot | 95 |  |  | 5 | 80 | 20 | 5.4E+05 | 0.04 |  | 50 |
| Inventive Example 11 | 1 mm dot | 95 |  |  | 5 | 80 | 20 | 5.4E+05 | 0.04 |  | 50 |
| Inventive Example 12 | 1 mm dot | 95 |  |  | 5 | 80 | 20 | 5.4E+05 | 0.06 |  | 71 |
| Inventive Example 13 | 1 mm dot | 95 |  |  | 5 | 80 | 20 | 5.4E+05 | 0.04 |  | 50 |
| Inventive Example 14 | 1 mm dot | 95 |  |  | 5 | 80 | 20 | 5.4E+05 | 0.04 |  | 50 |
| Inventive Example 15 | 810 µm longitudinal stripe | 95 |  |  | 5 | 80 | 20 | 5.4E+05 | 0.04 |  | 50 |
| Inventive Example 16 | 810 µm longitudinal stripe | 95 |  |  | 5 | 80 | 20 | 5.4E+05 | 0.04 |  | 50 |
| Inventive Example 17 | 370 µm longitudinal stripe | 95 |  |  | 5 | 80 | 20 | 5.4E+05 | 0.04 |  | 50 |
| Inventive Example 18 | 1000 µm longitudinal stripe | 95 |  |  | 5 | 80 | 20 | 5.4E+05 | 0.04 |  | 50 |
| Inventive Example 19 | 810 µm longitudinal stripe | 95 |  |  | 5 | 80 | 20 | 5.4E+05 | 0.04 |  | 50 |
| Inventive Example 20 | 810 µm longitudinal stripe | 95 |  |  | 5 | 80 | 20 | 5.4E+05 | 0.04 |  | 50 |
| Inventive Example 21 | 810 µm longitudinal stripe | 95 |  |  | 5 | 80 | 20 | 5.4E+05 | 0.04 |  | 50 |
| Comparative Example 1 | 1 mm dot | 95 |  |  | 5 | 80 | 20 | 5.4E+05 | 0.04 |  | 50 |
| Comparative Example 2 | 1 mm dot | 95 |  |  | 5 | 80 | 20 | 5.4E+05 | 0.04 |  | 50 |
| Comparative Example 3 | 1 mm dot | 95 |  |  | 5 | 80 | 20 | 5.4E+05 | 0.04 |  | 50 |
| Comparative Example 4 | 1 mm dot | 95 |  |  | 5 | 80 | 20 | 5.4E+05 | 0.04 |  | 50 |

TABLE 4-continued

| | | | | | | | | |
|---|---|---|---|---|---|---|---|---|
| Comparative Example 5 | 1 mm dot | 95 | 5 | 80 | 20 | 5.4E+05 | 0.04 | 50 |
| Comparative Example 6 | 1 mm dot | 95 | 5 | 80 | 20 | 5.4E+05 | 0.04 | 50 |
| Comparative Example 7 | 1 mm dot | 95 | 5 | 80 | 20 | 5.4E+05 | 0.04 | 50 |
| Comparative Example 8 | 1 mm dot | 95 | 5 | 80 | 20 | 5.4E+05 | 0.04 | 50 |
| Comparative Example 9 | 1 mm dot | 95 | 5 | 80 | 20 | 5.4E+05 | 0.04 | 50 |
| Comparative Example 10 | 1 mm dot | 95 | 5 | 80 | 20 | 5.4E+05 | 0.07 | 77 |
| Reference Example 1 | 1 mm dot | 95 | 5 | 100 | 0 | 1.1E+06 | 0.3 | 90 |

| | Plastic Strain | Particle Size mm | Protrusion Element Area Ratio % | Adhesive Thickness μm | Shear Adhesive Strength (Pressure-sensitive adhesive) N/cm² | Shear Adhesive Strength (Protrusion element) N/cm² | Shear Adhesive Strength (adhesive sheet) N/cm² | Frictional Force (adhesive sheet) N/cm² |
|---|---|---|---|---|---|---|---|---|
| Inventive Example 1 | 0.16 | 160 | 30 | 100 | 119.3 | 212.1 | 120.1 | 0.20 |
| Inventive Example 2 | 0.14 | 160 | 30 | 100 | 103.9 | 212.1 | 76.0 | 0.21 |
| Inventive Example 3 | 0.20 | 160 | 30 | 100 | 136.1 | 212.1 | 80.1 | 0.22 |
| Inventive Example 4 | 0.16 | 160 | 30 | 100 | 92.3 | 212.1 | 91.9 | 0.16 |
| Inventive Example 5 | 0.18 | 160 | 30 | 100 | 107.8 | 212.1 | 108.0 | 0.20 |
| Inventive Example 6 | 0.16 | 160 | 30 | 100 | 51.2 | 212.1 | 49.5 | 0.18 |
| Inventive Example 7 | 0.22 | 160 | 30 | 100 | 114.8 | 212.1 | 132.4 | 0.27 |
| Inventive Example 8 | 0.18 | 160 | 30 | 100 | 103.5 | 212.1 | 84.8 | 0.36 |
| Inventive Example 9 | 0.16 | 160 | 30 | 200 | 119.3 | 212.1 | 68.7 | 0.21 |
| Inventive Example 10 | 0.16 | 160 | 30 | 70 | 119.3 | 212.1 | 52.5 | 0.13 |
| Inventive Example 11 | 0.16 | 160 | 25 | 100 | 119.3 | 212.1 | 114.1 | 0.37 |
| Inventive Example 12 | 0.09 | 160 | 30 | 100 | 130.4 | 212.1 | 63.8 | 0.24 |
| Inventive Example 13 | 0.16 | 230 | 30 | 100 | 119.3 | — | 123.5 | 0.23 |
| Inventive Example 14 | 0.16 | 280 | 30 | 100 | 119.3 | — | 127.4 | 0.27 |
| Inventive Example 15 | 0.16 | 160 | 30 | 100 | 119.3 | 211.6 | 127.1 | 0.22 |
| Inventive Example 16 | 0.16 | 160 | 30 | 100 | 119.3 | 210 | 113.1 | 0.22 |
| Inventive Example 17 | 0.16 | 160 | 30 | 100 | 119.3 | 205.6 | 130.4 | 0.22 |
| Inventive Example 18 | 0.16 | 160 | 40 | 100 | 119.3 | 240.5 | 63.4 | 0.23 |
| Inventive Example 19 | 0.16 | 160 | 30 | 100 | 119.3 | 211.6 | 124.3 | 0.35 |
| Inventive Example 20 | 0.16 | 160 | 30 | 70 | 119.3 | 211.6 | 51.2 | 0.24 |
| Inventive Example 21 | 0.16 | 160 | 30 | 70 | 119.3 | 211.6 | 49.9 | 0.23 |
| Comparative Example 1 | 0.16 | 160 | 30 | 100 | 119.3 | — | 21.0 | 0.2 |
| Comparative Example 2 | 0.16 | 160 | 30 | 100 | 119.3 | — | 19.0 | 0.17 |
| Comparative Example 3 | 0.16 | 160 | 30 | 100 | 119.3 | — | 13.0 | 0.13 |
| Comparative Example 4 | 0.16 | 160 | 30 | 100 | 119.3 | — | 11.0 | 0.11 |
| Comparative Example 5 | 0.16 | 160 | 30 | 100 | 119.3 | — | 3.0 | 0.12 |
| Comparative Example 6 | 0.16 | 160 | 30 | 100 | 119.3 | — | 0.0 | 0.05 |
| Comparative Example 7 | 0.16 | 160 | 30 | 100 | 119.3 | — | 34.1 | 0.22 |
| Comparative Example 8 | 0.16 | 160 | 30 | 50 | 119.3 | 212.1 | 11.2 | 0.07 |
| Comparative Example 9 | 0.16 | 160 | 20 | 100 | 119.3 | 212.1 | 120.6 | 0.67 |
| Comparative Example 10 | 0.05 | 160 | 30 | 100 | 134.8 | 212.1 | 35.6 | 0.12 |
| Reference Example 1 | 0.01 | 160 | 30 | 100 | 77.6 | 212.1 | 7.5 | 0.21 |

The properties of each adhesive sheet were evaluated in relationship to the dot-shaped protrusion elements 12 depicted in FIG. 1(*a*) and the stripe-shaped protrusion elements 12' depicted in FIG. 1(*b*). As for the stripe-shaped protrusion elements 12', the evaluation was performed with respect to each of the longitudinal stripe and the lateral stripe. As is evident from Table 4, a factor capable of exerting an influence on the shear adhesive strength and the frictional force of the adhesive sheet was changed among Inventive Example, Comparative Example and Reference Example. As for the protrusion elements, the particle size of the protrusion element and the protrusion element area ratio were changed among the adhesive sheets. Although not specifically listed as an item in Table 4, the height dimension of the adhesive sheet is substantially included in the items as one factor to be changed. On the other hand, as for the pressure-sensitive adhesive, a polymerization ratio of a monomer (comprising butyl acrylate (BA) or 2-ethylhexyl acrylate (2EHA)) to a functional group (comprising hydroxyethyl acrylate (HEA) or acrylic acid (AA)), a polymerization ratio (weight-average molecular weight) of ethyl acetate to toluene as a polymerization solvent, a mixing rate of a cross-linking agent (TETRAD-C or CORONATE-L), a gel fraction (%), a plastic strain (can be regarded to be equivalent to the elastic modulus of the pressure sensitive adhesive (layer)), a thickness (adhesive thickness) (μm), and the shear adhesive strength (N/cm²), were changed among the adhesive sheets. As for the pressure-sensitive adhesive, the "plastic strain" was used as an equivalent parameter to the "elastic modulus" of the protrusion element), because the "plastic strain" is considered to be a parameter more closely determined based on an actual mechanism than the "elastic modulus". In Table 4, a value of the shear adhesive strength of the protrusion elements is added, because this value also exerts a large influence on the shear adhesive strength of the adhesive sheet. In Table 4, it should be noted that values of the shear adhesive strength of the protrusion elements in Inventive Examples 1 to 21 were obtained when the MMA ratio and the core-shell ratio were set, respectively to 10% and 80%. The MMA ratio and the core-shell ratio were set to the above values, for the following reason.

Although details of mechanism is not exactly clear, it is assumed that the shear adhesive strength as a property evaluation item pertaining to the adhesiveness of the adhesive sheet 1 is brought out by a phenomenon that the cohesive particles 20 are crushed. An optimal cohesive particle under this inference has a core-shell structure comprising a thin and hard outer shell, i.e., in which the MMA ratio is 100%, and the core-shell ratio is set to a large value to the extent possible (However, if the core-shell ratio is excessively increased, it becomes impossible to obtain sufficient elasticity, leading to a risk that the shell material 22 as the outer shell is broken). Among the cohesive particles 20 having such an ideal structure, a specific cohesive particle more reliably having sufficiently small frictional force, i.e., a desired value of about 0.4 N/cm$^2$ or less, and sufficiently large adhesive strength, i.e., a shear adhesive strength of about 45 N/cm$^2$ or more, capable of satisfying both of the position adjustability and the adhesiveness, which has not been achievable by conventional configurations, can be obtained when the MMA ratio is 100%, and the core-shell ratio is equal to or close to 80%. Therefore, comparison about each of the shear adhesive strength and the frictional force with regard to the sheets using various pressure-sensitive adhesives in Inventive Examples and Reference Example, will be performed using values measured when the MMA ratio is 100%, and the core-shell ratio is 80%.

5-2. Details of Inventive Examples, Comparative Examples and Reference Example

In Inventive Examples 1 to 14, Comparative Examples 1 to 10 and Reference Example 1, the adhesive sheets having the dot-shaped protrusion elements are evaluated, and, in Inventive Examples 15 to 18, the adhesive sheets having the stripe-shaped protrusion elements are evaluated. Details of each Example will be described below.

INVENTIVE EXAMPLE 1

<Support>

A polyethylene terephthalate (PET) film was used. A weight of the PET film is small (about 0.45 g/cm$^2$), and a weight of a pressure-sensitive adhesive is also small (about 0.40 g/cm$^2$), so that these weights substantially never exert an influence on measurement results of the frictional force, the shear adhesive strength and others of the protrusion elements 12.

<Protrusion Element (Cohesive Particles)>

Cohesive particles having a core-shell ratio of 80%, an MMA ratio of 100% and an average particle size of 160 nm were produced based on a polymerization method described in "3-2. Production of Protrusion Elements".

Specifically, first of all, in order to produce a core material for the cohesive particles, 3 weight parts of LATEMUL E-118B (manufactured by Kao Corporation) as a surfactant and 165 weight parts of ion-exchanged water were added to 100 weight parts of butyl acrylate (BA) to produce a mixture as a raw material in a container, and the mixture was steered using a homomixer (manufactured by PRIMIX Corporation) at 6000 rpm, in a nitrogen atmosphere for 5 minutes, to prepare a monomer emulsion (A).

Then, in order to produce a shell material for emulsion particles, 50 weight parts of methyl methacrylate (MMA), 1 weight parts of LATEMUL E-118B and 81.6 weight parts of ion-exchanged water were added to 100 weight parts of methyl methacrylate (MMA) to produce a mixture as a raw material in another container, and the mixture was stirred using the homomixer at 6000 rpm, in a nitrogen atmosphere for 5 minutes, to prepare a monomer emulsion (B).

Subsequently, all of the prepared monomer emulsion (A) was charged into a reaction vessel provided with a cooling tube, a nitrogen-introducing tube, a temperature gauge, a dropping device and a stirring blade. Then, after replacing an internal atmosphere of the vessel with nitrogen while stirring the monomer emulsion (A), the reaction solution was heated to a temperature of 60° C., and 0.1 weight parts of V-50 (manufactured by Wako Pure Chemical Industries, Ltd.) as a water-soluble azo polymerization initiator was added to 100 weight parts of butyl acrylate (BA) to induce polymerization for 2 hours while maintaining the reaction solution at 60° C. to obtain a copolymer serving as a core layer. Subsequently, 0.5 weight parts of V-50 was further added to 100 weight parts of methyl methacrylate (MMA), and the monomer emulsion (B) was dropped while the reaction solution was maintained at 60° C., by taking 2.5 hours, to form a shell layer and obtain a water dispersion containing core-shell structured polymer emulsion particles having a solid content concentration of 40%. An average particle size of the obtained polymer emulsion particles was 160 nm. The prepared water-dispersible pressure-sensitive adhesive composition was diluted by distilled water to allow the solid content concentration to become 0.5 weight % or less, and then a number average molecular weight of the polymer emulsion particles was measured using the following device:

Device: laser diffractive scattering particle size distribution analyzer (LS13 320, manufactured by Beckman Coulter, Inc.; PIDS mode);

Refractive index of dispersed material: 1.48 (Poly n-BA (poly-n-butyl acrylate was used); and Refractive index of dispersion medium: 1.333.

<Production of Pressure-Sensitive Adhesive>

First of all, in a reaction vessel provided with a cooling tube, a nitrogen-introducing tube, a temperature gauge, a dropping funnel and a stirring device, 5 weight parts of acrylic acid, 0.28 weight parts of BPO (benzoyl peroxide) as a polymerization initiator, and 158 weight parts of a mixed solvent of ethyl acetate and toluene (at a weight ratio of 80:20) was added to 100 weight parts of n-butyl acrylate. Subsequently, the resulting mixture was refluxed in a nitrogen atmosphere at room temperatures for 1 hour, and then a temperature of the mixture was raised to perform a polymerization reaction at 65° C. during a major reaction, for 6 hours, to obtain an acrylic-based pressure-sensitive adhesive. The resulting acrylic-based pressure-sensitive adhesive had a weight-average molecular weight of 500,000, and a ratio of a weight-average molecular weight to a number-average molecular weight of 5.0. The molecular weight was measured in terms of polystyrene by gel permeation chromatography (GPC). Specifically, HLC-8320 GPC (manufactured by Tosoh Corporation) was used. As a column, TSKgel super HM-H/H400/H3000/H200 having a column size of 6.0 mm I.D.×150 mm was used. Tetrahydrofuran (THF) was used as eluent, and measurement was performed at flow rate of 0.6 mL/min, a column temperature of 40° C., and an injected dose of 20 μL, using a refractive index (RI) meter as a detector. A concentration of the polymer injected in this process was 0.1 wt % (THF solution). Foreign particles on the sample were eliminated through a filter before injection. In the above manner, an acrylic-based pressure-sensitive adhesive comprising 5 weight parts of acrylic acid (AA) with respect to 95 weight parts of butyl acrylate (BA) was produced.

<Production of Adhesive Sheet (without Protrusion Elements)>

0.04 weight parts of an epoxy-based cross-linking agent (trade name: TETRAD-C, manufactured by Mitsubishi Gas Chemical Company, Inc.) containing 1,3-bis(N,N-diglycidylaminomethyl)cyclohexane was added to 100 weight parts of the produced acrylic-based pressure-sensitive adhesive (acrylic copolymer) to form an acrylic-based pressure-sensitive adhesive solution. This acrylic-based pressure-sensitive adhesive solution was applied to a silicone-based release agent-coated PET film (trade name: DIAFOIL MRF-38, manufactured by Mitsubishi Plastics, Inc.) in such a manner as to allow a thickness thereof after drying to become 100 μm, and then dried at 130° C. for 5 min. Subsequently, the dried coating was heated at 50° C. for 48 hours to obtain an adhesive sheet (without the protrusion elements).

<Formation of Protrusion Elements on Adhesive Sheet>

Figure 9:
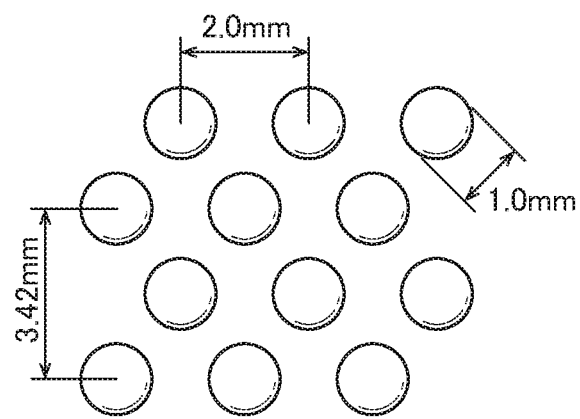
FIG. 9 is a diagram depicting details of an arrangement method for the protrusion elements.

The obtained emulsion was dropped on the PET substrate provided with the 100 μm-thick pressure-sensitive adhesive layer in the above manner, using a dispenser (manufactured by Musashi Engineering, Inc.), and the drops were arranged in the form of a dot having a size depicted in the tip plan view of FIG. 9. In FIG. 9, the protrusion element area ratio is 30%. A liquid volume per protrusion element was 0.3 μL, and the protrusion element 12 on the pressure-sensitive adhesive layer, after being dried at 100° C. together with the pressure-sensitive adhesive layer had a size in which a maximum diameter in top plan view (corresponding to A in FIG. 3(*a*)) was 100 mm, and a height (corresponding to B in FIG. 3(*a*)) was 60 μm. Further, one inter-center distance between two adjacent protrusion elements was 2.00 mm; and another inter-center distance between two adjacent protrusion elements was 3.42 mm. The pressure-sensitive adhesive had a weight-average molecular weight of 540,000, and a gel fraction of 50%.

The produced pressure-sensitive adhesive itself had a plastic strain of 0.16, and a shear adhesive strength of 119.3 N/cm$^2$. On the other hand, the pressure-sensitive adhesive comprising this pressure-sensitive adhesive and the protrusion elements provided thereon had a shear adhesive strength of 120.1 N/cm$^2$, and a frictional force of 0.20 N/cm$^2$.

INVENTIVE EXAMPLE 2

Differently from Inventive Example 1, in Inventive Example 2, the content of the cross-linking agent (TETRAD-C) was set to 0.5 weight parts. The remaining conditions were the same as those in Inventive Example 1. In this Example, the gel fraction was 90%. In this case, each of the plastic strain of the pressure-sensitive adhesive and the shear adhesive strength of the pressure-sensitive adhesive decreased.

As compared to Inventive Example 1, in an adhesive sheet using this pressure-sensitive adhesive, almost no change was observed in the frictional force, although the shear adhesive strength significantly decreased. The reason why the plastic strain of the pressure-sensitive adhesive decreased is assumed that a cross-linking density was increased due to an increase in gel fraction, and that a pressure-sensitive adhesive having a high gel fraction has a large cohesive force (a force resisting deformation), and therefore became more likely to undergo deformation even by a small stress.

INVENTIVE EXAMPLE 3

Differently from Inventive Example 1, in Inventive Example 3, the polymerization ratio of ethyl acetate and toluene was set to 100:0. That is, no toluene was used. Further, the content of the cross-linking agent (TETRAD-C) was set to 0.02 weight parts. The remaining conditions were the same as those in Inventive Example 1. In this case, each of the plastic strain of the pressure-sensitive adhesive and the shear adhesive strength of the pressure-sensitive adhesive increased.

As compared to Inventive Example 1, in an adhesive sheet using this pressure-sensitive adhesive, almost no change was observed in the frictional force, although the shear adhesive strength significantly decreased.

INVENTIVE EXAMPLE 4

Differently from Inventive Example 1, in Inventive Example 4, as a monomer, 2-ethylhexyl acrylate (2EHA) was used, instead of butyl acrylate (BA). The remaining conditions were the same as those in Inventive Example 1. In this case, the shear adhesive strength of the pressure-sensitive adhesive decreased (92.3 N/cm$^2$), although no change was observed in the plastic strain of the pressure-sensitive adhesive.

As compared to Inventive Example 1, in an adhesive sheet using this pressure-sensitive adhesive, the shear adhesive strength decreased. Although the frictional force slightly decreased, a good result was obtained.

INVENTIVE EXAMPLE 5

In Inventive Example 1, the functional group (acrylic acid (AA)) was contained in an amount of 5 weight parts with respect to 95 weight parts of the monomer (butyl acrylate (BA)), whereas in Inventive Example 5, the functional group (acrylic acid (AA)) was contained in an amount of 2 weight parts with respect to 98 weight parts of the monomer (butyl acrylate (BA)). Further, the content of the cross-linking agent (TETRAD-C) was set to 0.2 weight parts. The remaining conditions were the same as those in Inventive Example 1. In this case, the shear adhesive strength of the pressure-sensitive adhesive decreased, although the plastic strain of the pressure-sensitive adhesive increased.

As compared to Inventive Example 1, in an adhesive sheet using this pressure-sensitive adhesive, almost no change was observed in the frictional force, although the shear adhesive strength decreased. The reason why the shear adhesive strength of the adhesive sheet decreased is assumed that an amount of chemical bond to be formed in an interface between carboxylic acid contained in the functional group, i.e., acrylic acid (AA), in the pressure-sensitive adhesive, and the adherend (SUS 304) decreased.

INVENTIVE EXAMPLE 6

In Inventive Example 1, the functional group was acrylic acid (AA), whereas in Inventive Example 6, hydroxyethyl acrylate (HEA) was used as the functional group, and 0.5 weight parts of an isocyanate-based cross-linking agent (adduct of trimethylolpropane and tolylene diisocyanate trimer (trade name: CORONATE L manufactured by Nippon Polyurethane Industry Co., Ltd.) was used as the cross-linking agent. The remaining conditions were the same as those in Inventive Example 1. In this case, the shear adhesive strength of the pressure-sensitive adhesive significantly decreased, although no change was observed in the plastic strain of the pressure-sensitive adhesive. The reason when the shear adhesive strength significantly decreased is assumed that the pressure-sensitive adhesive 1 having carboxylic acid as the functional group is stronger in terms of chemical bonding with respect to SUS 304 as the adherend.

As compared to Inventive Example 1, in an adhesive sheet using this pressure-sensitive adhesive, the shear adhesive strength naturally significantly decreased. In this adhesive sheet, as for the frictional force, a good result could be obtained.

INVENTIVE EXAMPLE 7

Differently from Inventive Example 1, in Inventive Example 7, the polymerization ratio of ethyl acetate and toluene as a polymerization solvent was set to 0:100. That is, no ethyl acetate was used. Further, the content of the cross-linking agent (TETRAD-C) was set to 0.152 weight parts. The remaining conditions were the same as those in Inventive Example 1. In this case, as compared to Inventive Example 1, the plastic strain of the pressure-sensitive adhesive slightly increased, and, on the other hand, the shear adhesive strength of the pressure-sensitive adhesive slightly decreased.

As compared to Inventive Example 1, in an adhesive sheet using this pressure-sensitive adhesive, the shear adhesive strength increased, and the frictional force also increased.

INVENTIVE EXAMPLE 8

Differently from Inventive Example 1, in Inventive Example 8, the content of the cross-linking agent (TETRAD-C) was set to 0.02 weight parts. The remaining conditions were the same as those in Inventive Example 1. In this Example, the gel fraction was 20% which is less than that in Inventive Example 1. In this case, the plastic strain of the pressure-sensitive adhesive slightly increased, and the shear adhesive strength of the pressure-sensitive adhesive decreased.

As compared to Inventive Example 1, in an adhesive sheet using this pressure-sensitive adhesive, the shear adhesive strength significantly decreased. The reason why the shear adhesive strength of the adhesive sheet decreased is assumed that due to lowering of the gel fraction, the pressure-sensitive adhesive became more likely to undergo deformation even by a small stress. In this Example, a value of the frictional force also increased.

INVENTIVE EXAMPLE 9

Differently from Inventive Example 1, in Inventive Example 9, the adhesive thickness was set to 200 μm, instead of 100 μm. The remaining conditions were the same as those in Inventive Example 1. In this case, no change was observed in each of the plastic strain and the shear adhesive strength of the pressure-sensitive adhesive.

As compared to Inventive Example 1, in an adhesive sheet using this pressure-sensitive adhesive, almost no change was observed in the frictional force, although the shear adhesive strength significantly decreased. As mentioned above, in this experimental test, the height dimension of each of the protrusion elements 12 was set to 60 μm. The reason why the shear adhesive strength of the adhesive sheet significantly decreased is that due to an increase in thickness of the pressure-sensitive adhesive, the adhesive sheet became more likely to be deformed by shear.

INVENTIVE EXAMPLE 10

Differently from Inventive Example 1, in Inventive Example 10, the adhesive thickness was set to 70 μm. The remaining conditions were the same as those in Inventive Example 1. In this case, no change was observed in each of the plastic strain and the shear adhesive strength of the pressure-sensitive adhesive.

As compared to Inventive Example 1, in an adhesive sheet using this pressure-sensitive adhesive, the shear adhesive strength significantly decreased. This is because due to a decrease in thickness of the pressure-sensitive adhesive, it became impossible to obtain a sufficient shear adhesive strength. In this case, the frictional force also decreased.

INVENTIVE EXAMPLE 11

Differently from Inventive Example 1, in Inventive Example 2, the protrusion element area ratio was set to 25%. The remaining conditions were the same as those in Inventive Example 1.

As compared to Inventive Example 1, in an adhesive sheet using this pressure-sensitive adhesive, the frictional force increased, although the shear adhesive strength slightly decreased.

INVENTIVE EXAMPLE 12

Differently from Inventive Example 1, in Inventive Example 12, the content of the cross-linking agent (TETRAD-C) was set to 0.06 weight parts. The remaining conditions were the same as those in Inventive Example 1. In this Example, the gel fraction was 71%. In this case, the plastic strain of the pressure-sensitive adhesive decreased, and the shear adhesive strength of the pressure-sensitive adhesive slightly increased.

As compared to Inventive Example 1, in an adhesive sheet using this pressure-sensitive adhesive, almost no change was observed in the frictional force, although the shear adhesive strength significantly decreased.

INVENTIVE EXAMPLE 13

Differently from Inventive Example 13, in Inventive Example 13, the average particle size of the cohesive particle was set to 230 nm. The remaining conditions were the same as those in Inventive Example 1.

As compared to Inventive Example 1, in an adhesive sheet having protrusion elements formed using such cohesive particles, each of the shear adhesive strength and the frictional force slightly increased.

INVENTIVE EXAMPLE 14

Differently from Inventive Example 13, in Inventive Example 13, the average particle size of the cohesive particle was set to 280 nm. The remaining conditions were the same as those in Inventive Example 1.

As compared to Inventive Examples 1 and 13, in an adhesive sheet having protrusion elements formed using such cohesive particles, each of the shear adhesive strength and the frictional force slightly increased.

From the results in Inventive Examples 13 and 14, it is assumed that, when the average particle size of the cohesive particle is increased, each of the shear adhesive strength and the frictional forcer of the protrusion elements is increased along with the increase in the average particle size, and thus each of the shear adhesive strength and the frictional force of the adhesive sheet is increased.

INVENTIVE EXAMPLE 15

In Inventive Example 15, a longitudinal stripe having a line width (corresponding to the line width A' in FIG. 3(b)) of 810 µm was used.

Contents of the items <Support>, <Protrusion Element (Cohesive Particles)>, <Production of Pressure-Sensitive Adhesive> and <Production of Adhesive Sheet (without Protrusion Elements)> are the same as those in Inventive Example 1.

<Formation of Protrusion Elements on Adhesive Sheet>

Figure 10:
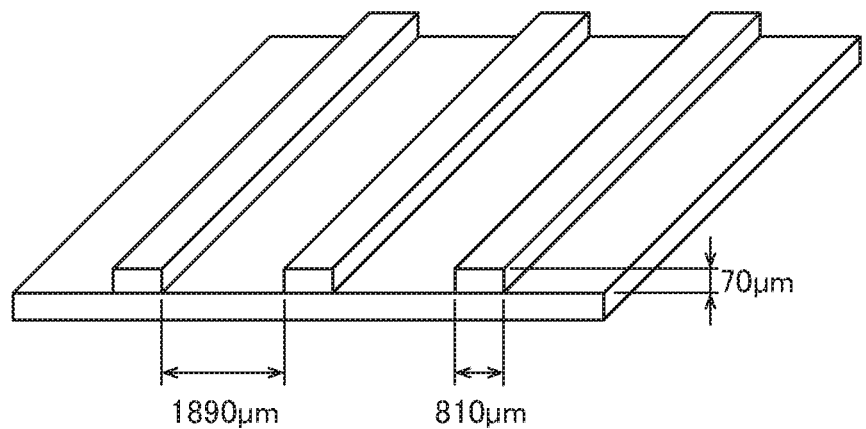
FIG. 10 is a diagram depicting a formation method for the protrusion elements by means of screen printing.

The emulsion prepared in accordance with <Protrusion Element (Cohesive Particles)> was applied onto a silicone-based release agent-coated PET film (trade name: DIAFOIL MRF-38, manufactured by Mitsubishi Plastics, Inc.) in the form of a stripe shape, using a screen printer (LS-34TVA manufactured by Newlong Seimitsu Kogyo Co., Ltd.). As depicted in FIG. 10, each protrusion element after drying at 100° C. had a size in which a line width (corresponding to the line width A' in FIG. 3(b)) was 810 µm, and a height (corresponding to the height (B'+B") in FIG. 3(b)) of the protrusion element was 70 µm. Further, a distance between two adjacent protrusion elements was set to 1890 µm. In this Example, the protrusion element area ratio was 30%.

The stripe-shaped protrusion elements obtained by drying were attached on a sheet provided with a pressure-sensitive adhesive, by a pressure of 0.1 MPa, and transferred to a surface of the pressure-sensitive adhesive. During the transfer, a portion (corresponding to the height B" in FIG. 3(b)) of each of the protrusion elements was implanted into the pressure-sensitive adhesive, specifically, by a height dimension of 10 µm. A height dimension (corresponding to the height B' in FIG. 3(b)) of each of the protrusion elements after being transferred to the surface of the adhesive sheet, i.e., a height dimension of a portion of the protrusion element finally exposed from the pressure-sensitive adhesive, was 60 µm. In this case, the pressure-sensitive adhesive had a weight-average molecular weight of 500,000, and a gel fraction of 50%, as with Inventive Example 1.

<Printer>
  Manufacturer: Newlong Seimitsu Kogyo Co., Ltd.
  Device name: LS-34TVA
  Printing speed: 250 mm/min
  Clearance: 1 mm
  Hardness of squeegee: 70°
  Pushing amount of squeegee: 1 mm
  Printing pressure of squeegee: 1 Mp
  Angle of squeegee: 75°
  Speed of scraper: 20 mm/min
  Pushing amount of scraper: −0.2 mm
  Drying conditions: 100° C.×5 min The produced adhesive sheet had a shear adhesive strength of 127. 1 N/cm$^2$, and a frictional force of 0.22 N/cm$^2$, each of which was slightly greater than those in Inventive Example 1. The reason is assumed that differently from the dot-shaped protrusion elements in Inventive Example 1 and others, each of the protrusion elements is disposed in a continuous state, so that it is more likely to bring out the shear adhesive strength or the like.

INVENTIVE EXAMPLE 16

Differently from Inventive Example 15, in Inventive Example 16, a lateral stripe was used. The remaining conditions were the same as those in Inventive Example 15. As compared to Inventive Example 15, in an adhesive sheet using this type of protrusion elements, the frictional force had a slightly low value. This is probably because a direction along which a force is applied and a direction of the stripe are orthogonal to each other, and thereby it is difficult to bring out yield strength.

INVENTIVE EXAMPLE 17

Differently from Inventive Example 15, in Inventive Example 17, a longitudinal stripe having a line width of 370 µm was used. In this Example, a distance between two adjacent protrusion elements was adjusted to enable the protrusion element area ratio to become 30%. In other words, the distance between two adjacent protrusion elements was determined by the protrusion element area ratio. The remaining conditions were the same as those in Inventive Example 15. As compared to Inventive Example 15, in an adhesive sheet using this type of protrusion elements, the shear adhesive strength slightly increased, and the frictional force also slightly increased.

INVENTIVE EXAMPLE 18

Differently from Inventive Example 15, in Inventive Example 18, a longitudinal stripe having a line width of 1000 µm was used. Further, in this Example the protrusion element area ratio was set to 40%. The distance between two adjacent protrusion elements was determined by the protrusion element area ratio. The remaining conditions were the same as those in Inventive Example 15. As compared to Inventive Example 15, in an adhesive sheet using this type of protrusion elements, the shear adhesive strength significantly decreased, and the frictional force slightly decreased.

INVENTIVE EXAMPLE 19

Differently from Inventive Example 15, in Inventive Example 19, longitudinal stripe protrusion elements were directly formed on a pressure-sensitive adhesive by slot die coating. Each of the protrusion elements in a finally obtained adhesive sheet had a size in which the line width was 810 µm, and the height of the protrusion element was 70 µm. Further, the distance between two adjacent protrusion elements was 1890 µm. The remaining conditions were the same as those in Inventive Example 15. However, in this type of protrusion elements, there is not a portion to be implanted into the pressure-sensitive adhesive. In the case where screen printing, i.e., a technique of transferring a plurality of protrusion elements to a sheet provided with a pressure-sensitive adhesive, is employed in order to form the protrusion elements on the pressure-sensitive adhesive, a portion (corresponding to B' in FIG. 3(b)) of each of the protrusion elements is implanted into the pressure-sensitive adhesive, so that a height dimension (corresponding to (B'+B") in FIG. 3(b)) of the protrusion element before transfer is set to be slightly greater than a height dimension (corresponding to B' in FIG. 3(b)) of the protrusion element after transfer, considering a length to be implanted. On the other hand, in the case where a technique of directly forming a plurality of protrusion elements on a sheet provided with a pressure-sensitive adhesive, such as slot die coating, is employed, a height dimension of each of the protrusion elements to be initially formed is equal to that of the protrusion element to be finally obtained. Thus, even when a height dimension of the protrusion element finally obtained, i.e., a height dimension of the protrusion element exposed from the pressure-sensitive adhesive, is the same, an initial height dimension of the protrusion element varies depending on whether the protrusion element is formed through transfer or formed directly. In Inventive Examples 19 and 21, an influence of such a difference in height dimension of the protrusion element on the shear adhesive strength and the frictional force of a finally obtained adhesive sheet was evaluated.

As a result, as compared to Inventive Example 15, each of the shear adhesive strength and the frictional force had a slightly low value. However, these result prove that substantially the same result can be obtained.

INVENTIVE EXAMPLE 20

Differently from Inventive Example 15, in Inventive Example 20, the adhesive thickness was set to 70 μm. The remaining conditions were the same as those in Inventive Example 15.

As compared to Inventive Example 15, in an adhesive sheet using this pressure-sensitive adhesive, the shear adhesive strength significantly decreased, as with Inventive Example 10. On the other hand, the frictional force slightly increased.

INVENTIVE EXAMPLE 21

As with Inventive Example 19, in Inventive Example 21, a plurality of longitudinal stripe protrusion element were directly formed on a pressure-sensitive adhesive by slot die coating. The remaining conditions were the same as those in Inventive Example 15.

As compared to Inventive Example 20, in an adhesive sheet using this type of protrusion elements, substantially the same result could be obtained, although each of the shear adhesive strength and the frictional force had a slightly low value.

The results in Inventive Examples 21 and 19 proves that as long as a ratio of adhesive thickness:height dimension of each protrusion element before transfer: height dimension of each protrusion element after transfer is at least about 100:70:10, no influence is exerted on the shear adhesive strength and the frictional force. In other words, as long as a height dimension of the protrusion element exposed from the pressure-sensitive adhesive is the same, even when a portion of the protrusion element is implanted into the pressure-sensitive adhesive, such a situation does not exert a major influence on the shear adhesive strength and the frictional force of a finally obtained adhesive sheet.

COMPARATIVE EXAMPLE 1

In Comparative Example 1, based on Inventive Example 1, the protrusion elements were made of acrylic silicone. Comparative Example 1 is different from Inventive Example 1 in terms of only the protrusion elements. The protrusion elements were arranged on the pressure-sensitive adhesive using the dispenser in Inventive Example 1. Each of the protrusion elements had a diameter of 1.04 mm, a height dimension of 64 μm, and a protrusion element area ratio of 30% which is equal to that in Inventive Example 1. In an adhesive sheet using this type of protrusion elements, it is entirely impossible to expect that the protrusion elements effectively bring out the shear adhesive strength. Thus, the shear adhesive strength of the adhesive sheet significantly decreased as compared to that in Inventive Example 1.

COMPARATIVE EXAMPLE 2

In Comparative Example 2, based on Inventive Example 1, the protrusion elements were made of self-cross-linking silicone. Comparative Example 2 is different from Inventive Example 1 in terms of only the protrusion elements. The protrusion elements were arranged on the pressure-sensitive adhesive using the dispenser in Inventive Example 1. Each of the protrusion elements had a diameter of 1.03 mm, a height dimension of 62 μm, and a protrusion element area ratio of 30% which is equal to that in Inventive Example 1. In an adhesive sheet using this type of protrusion elements, it is entirely impossible to expect that the protrusion elements effectively bring out the shear adhesive strength. Thus, the shear adhesive strength of the adhesive sheet significantly decreased as compared to that in Inventive Example 1.

COMPARATIVE EXAMPLE 3

In Comparative Example 3, based on Inventive Example 1, the protrusion elements were formed of glass beads. Comparative Example 3 is different from Inventive Example 1 in terms of only the protrusion elements. Differently from Inventive Example 1, the protrusion elements were directly attached to an adhesive layer using a perforated Teflon (trade mark) sheet. Each of the protrusion elements was formed in a spherical shape having a diameter of 1.00 mm and a height dimension of 60 μm. Further, it had a protrusion element area ratio of 30% which is equal to that in Inventive Example 1. In an adhesive sheet using this type of protrusion elements, it is entirely impossible to expect that the protrusion elements effectively bring out the shear adhesive strength. Thus, the shear adhesive strength of the adhesive sheet significantly decreased as compared to that in Inventive Example 1.

COMPARATIVE EXAMPLE 4

In Comparative Example 4, based on Inventive Example 1, the protrusion elements were formed of glass balloons. Comparative Example 4 is different from Inventive Example 1 in terms of only the protrusion elements. Differently from Inventive Example 1, the protrusion elements were directly attached to an adhesive layer. Each of the protrusion elements was formed in a spherical shape having a diameter of 1.00 μm and a height dimension of 60 μm. Further, it had a protrusion element area ratio of 30% which is equal to that in Inventive Example 1. In an adhesive sheet using this type of protrusion elements, it is entirely impossible to expect that the protrusion elements effectively bring out the shear adhesive strength. Thus, the shear adhesive strength of the adhesive sheet significantly decreased as compared to that in Inventive Example 1.

COMPARATIVE EXAMPLE 5

In Comparative Example 5, based on Inventive Example 1, the protrusion elements were formed of mesh knitting.

Comparative Example 5 is different from Inventive Example 1 in terms of only the protrusion elements. Differently from Inventive Example 1, the protrusion elements were directly attached to a pressure-sensitive adhesive layer using a laminator. Each of the protrusion elements was formed in a grid-like shape, wherein a width of knitting yarn forming grids was 0.06 mm, and a hole of each grip has an approximately square shape with a length of 0.5 mm and a width of 0.5 mm. Further, the protrusion element had a height dimension of 60 μm, and a protrusion element area ratio of 30% which is equal to that in Inventive Example 1. In an adhesive sheet using this type of protrusion elements, it is entirely impossible to expect that the protrusion elements effectively bring out the shear adhesive strength. Thus, the shear adhesive strength of the adhesive sheet significantly decreased as compared to that in Inventive Example 1.

COMPARATIVE EXAMPLE 6

In Comparative Example 6, based on Inventive Example 1, the protrusion elements were formed of mesh fabric. Comparative Example 6 is different from Inventive Example 1 in terms of only the protrusion elements. Differently from Inventive Example 1, the protrusion elements were directly attached to a pressure-sensitive adhesive layer using a laminator. Each of the protrusion elements was formed in a grid-like shape, wherein a width of fabric yarn forming grids was 0.06 mm, and a hole of each grip has an approximately square shape with a length of 0.5 mm and a width of 0.5 mm. Further, the protrusion element had a height dimension of 60 μm, and a protrusion element area ratio of 30% which is equal to that in Inventive Example 1. In an adhesive sheet using this type of protrusion elements, it is entirely impossible to expect that the protrusion elements effectively bring out the shear adhesive strength. Thus, the shear adhesive strength of the adhesive sheet significantly decreased as compared to that in Inventive Example 1.

COMPARATIVE EXAMPLE 7

In Comparative Example 7, based on Inventive Example 15, the protrusion elements were made of acrylic silicone. Comparative Example 7 is different from Inventive Example 15 in terms of only the protrusion elements. The protrusion elements were arranged on the pressure-sensitive adhesive using the dispenser in Inventive Example 1. Each of the protrusion elements had a diameter of 1.04 mm, a height dimension of 64 μm, and a protrusion element area ratio of 30% which is equal to that in Inventive Example 1. In an adhesive sheet using this type of protrusion elements, it is entirely impossible to expect that the protrusion elements effectively bring out the shear adhesive strength. Thus, the shear adhesive strength of the adhesive sheet significantly decreased as compared to that in Inventive Example 1.

COMPARATIVE EXAMPLE 8

Differently from Inventive Example 1, in Inventive Example 9, the adhesive thickness was set to 200 μm, instead of 100 μm. The remaining conditions were the same as those in Inventive Example 1. In this case, no change was observed in each of the plastic strain and the shear adhesive strength of the pressure-sensitive adhesive, as with Inventive Examples 10 and 20.

As compared to Inventive Example 1, in an adhesive sheet using this pressure-sensitive adhesive, the shear adhesive strength significantly decreased, and the frictional force also significantly decreased.

As mentioned above, in this experimental test, the height dimension of each of the protrusion elements 12 was set to 60 μm. Thus, when the adhesive thickness is 50 μm as in Comparative Example 8, i.e., the thickness of the pressure-sensitive adhesive is less than the height dimension of the protrusion element, the adhesive sheet cannot be sufficiently adhesively fixed even through press-attaching operation. This provably led to a significant decrease of the shear adhesive strength in an adhesive sheet using this pressure-sensitive adhesive. However, as for the frictional force of the adhesive sheet, a good result could be obtained.

It should be noted that Comparative Example 8 does not mean when the adhesive thickness is 50 μm or less, the requirement that the frictional force is about 0.4 N/cm$^2$ or less, and the shear adhesive strength is 45 N/cm$^2$ or more is always satisfied. Obviously, values of the frictional force and the shear adhesive strength can be determined various factors such as the gel fraction and the protrusion element area ratio, in addition to the adhesive thickness.

COMPARATIVE EXAMPLE 9

Differently from Inventive Example 1, in Comparative Example 9, the protrusion element area ratio was set to 20%. The remaining conditions were the same as those in Inventive Example 1. As compared to Inventive Example 1, in an adhesive sheet using this pressure-sensitive adhesive, the frictional force increased due to a decrease in area ratio of the protrusion elements, and, on the other hand, the shear adhesive strength increased due to an increase in area ratio of the pressure-sensitive adhesive.

COMPARATIVE EXAMPLE 10

Differently from Inventive Example 1, in Comparative Example 10, the content of the cross-linking agent was set to 0.07%. The remaining conditions were the same as those in Inventive Example 1. In this Example, the gel fraction was 77%. In this case, the plastic strain of the pressure-sensitive adhesive decreased, and the shear adhesive strength of the pressure-sensitive adhesive increased.

As compared to Inventive Example 1, in an adhesive sheet using this pressure-sensitive adhesive, the shear adhesive strength significantly decreased, and the frictional force also decreased.

REFERENCE EXAMPLE 1

In a relationship with Inventive Example 3, in Reference Example 1, the content of the cross-linking agent (TETRAD-C) was set to 0.3 weight parts. The remaining conditions were the same as those in Inventive Example 3. In this Example, the gel fraction was 90%. In this case, as compared to Inventive Example 3, the plastic strain of the pressure-sensitive adhesive significantly decreased, and the shear adhesive strength of the pressure-sensitive adhesive also significantly decreased (77.6 N/cm$^2$).

In an adhesive sheet using this pressure-sensitive adhesive, the shear adhesive strength significantly decreased, whereas no change was observed in the frictional force. The reason why the shear adhesive strength significantly decreased is assumed that the gel fraction was increased.

It should be noted that Reference Example 1 does not mean when the get fraction is 90 μm or less, the requirement that the frictional force is about 0.4 N/cm$^2$ or less, and the shear adhesive strength is 45 N/cm$^2$ or more is always satisfied. This is apparent from a relationship with Inventive Example 2. In Inventive Example, the above requirement is satisfied by changing the polymerization solvent, despite the gel fraction being 90%. Obviously, values of the frictional force and the shear adhesive strength can be determined various factors such as the adhesive thickness and the protrusion element area ratio, in addition to the gel fraction.

5-3. Measurement Method

<Measurement of Shear Adhesive Strength and Frictional Force of Adhesive Sheet>

A measurement method is based on the measurement method for the shear adhesive strength and the frictional force of the protrusion elements (12, 12') described in "3-3. Properties of Protrusion Elements". In this measurement, the adhesive sheet is a measurement target, so that the measurement was performed using a sample in which not only protrusion elements 12 but also a pressure-sensitive adhesive layer 11 are provided on one surface (10') of a PET substrate (10). The pressure-sensitive adhesive layer 11 was applied to the entire surface of the PET substrate (10).

<Measurement of Shear Adhesive Strength of Pressure-Sensitive Adhesive>

A measurement method is based on the measurement method for the shear adhesive strength of the protrusion elements (12, 12') described in "3-3. Properties of Protrusion Elements". In this measurement, the pressure-sensitive adhesive is a measurement target, so that the measurement was performed using a sample in which only a pressure-sensitive adhesive layer 11 are provided on one surface (10') of a PET substrate (10).

<Measurement of Gel Fraction>

The gel fraction was obtained by: sampling and accurately weighting 0.1 g (mass before immersion) of pressure-sensitive adhesive; immersing the weighted pressure-sensitive adhesive in about 50 mL of ethyl acetate at room temperatures (20 to 25° C.) for one week; extracting a solvent (ethyl acetate)-insoluble component; drying the solvent-insoluble component at 130° C. for 2 hours; then weighting the dried solvent-insoluble component (mass after immersion and drying); and performing calculation using the following gel fraction calculation formula:

Gel fraction(mass %)=[(mass after immersion and drying)/(mass before immersion)]×100

<Measurement of Adhesive Thickness>

A digital upright gauge R1-205 (manufactured by Ozaki Mfg. Co., Ltd.) was used.

<Measurement of Plastic Strain>

Figure 11:
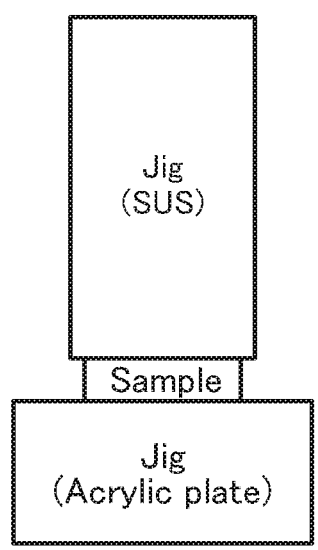
FIG. 11 is a schematic diagram depicting a device for use in measurement of plastic strain.

A tester (device name: EZ Test (Shimadzu Corporation) was used. FIG. 11 is a schematic diagram depicting this device. Compression conditions in this measurement are as follows:

Speed: 0.1 mm/min;
Thickness of sample: 2 mm;
Diameter of sample: φ 8 mm (punched by punch);
Temperature: 23° C.; and
Jig: upper SUS (φ 12 mm), lower acrylic plate (thickness: 10 mm).

Figure 12:
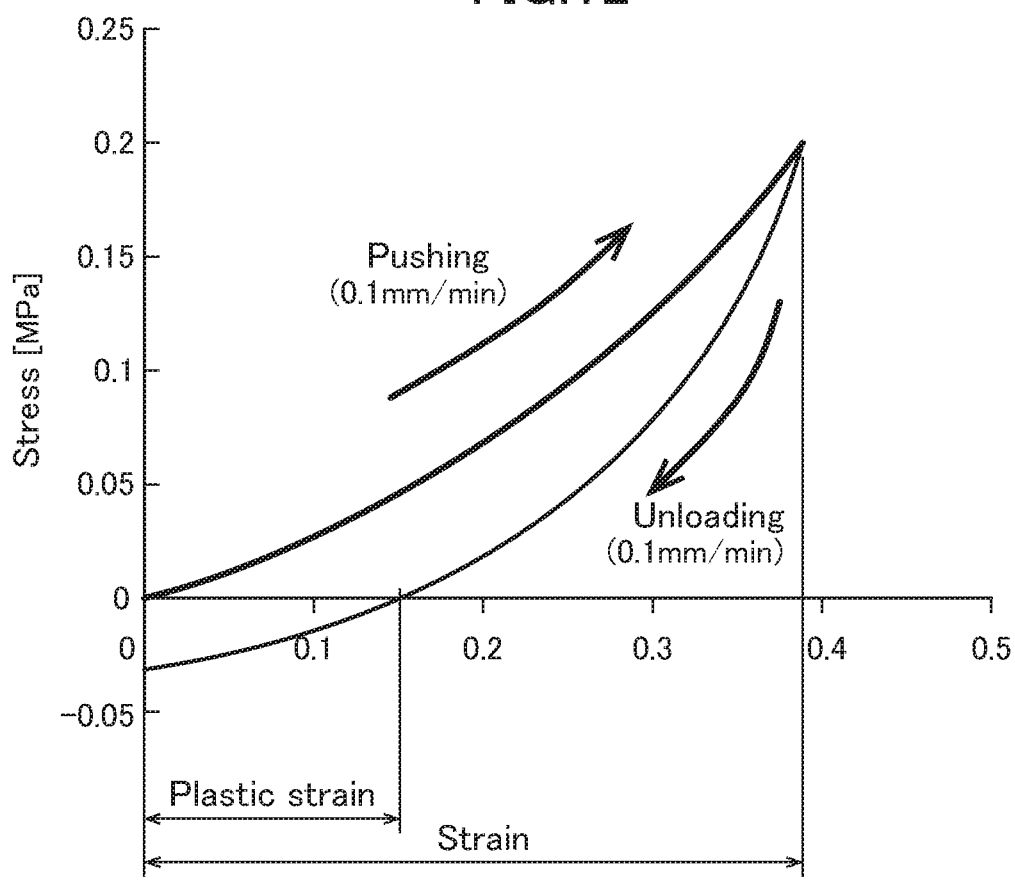
FIG. 12 is a diagram depicting a principle of measurement of plastic strain.

FIG. 12 depicts a measurement principle for plastic strain. During the measurement, a sample is clamped between an upper SUS (upper jig) and a lower acrylic plate (lower jig), and, in an environment having a temperature of 23° C. and a humidity of 50%, the upper jig is moved toward the lower jig at a speed of 0.1 mm/min to compress the clamped sample by a pressure of up to 0.2 MPa (10N); and then measuring a level of restoration of the sample when moving the upper jig at a speed of 0.1 mm/min to unload the pressure so as to be returned to 0 MPa (0N). Obviously, for example, when the plastic strain is relatively large, a restoring/residual stress during unloading becomes smaller, i.e., after compression, it becomes difficult to return to an original shape.

<Measurement of Protrusion Element Area Ratio>

A surface formed with the protrusion elements (protrusion element-formed surface) was observed by a digital microscope VW-9000 (manufactured by Keyence Corporation). The protrusion element area ratio was calculated using the following formula:

Protrusion element area ratio(%)=[(total area of protrusion elements)/(area within microscopic field)]×100

5-4. Evaluation

<Frictional Force and Shear Adhesive Strength of Adhesive Sheet>

As is clear from the description about Comparative Examples 1 to 10, as long as a given requirement such as keeping the protrusion element area ratio from extremely decreasing are satisfied, even when the protrusion elements are made of a conventional material such as silicone, it is possible to obtain a good value of 0.2 N/cm$^2$ or less for the friction force. On the other hand, as for the shear adhesive strength, an obtainable value is 21 N/cm$^2$ at best. Thus, among various conventional protrusion elements, there is not any protrusion element having both of the position adjustability and the adhesiveness and capable of bringing out the position adjustability and the adhesiveness in addition to the position adjustability. If it is attempted to obtain a good value for the frictional force using a conventional technique, it is necessary to increase an amount of silicone or the like for forming the protrusion elements. However, silicone or the like has almost no shear adhesive strength or, if there were, a value thereof is small. Thus, a finally obtained adhesive sheet inevitably has a insufficiently low shear adhesive strength. In this situation, it is conceivable to employ a technique of adjusting the pressure-sensitive adhesive so as to obtain a desired shear adhesive strength. However, if it is attempted to increase the shear adhesive strength of the pressure-sensitive adhesive, the increased shear adhesive strength leads to difficulty in enabling the protrusion elements to be displaced inside the pressure-sensitive adhesive, and thus difficulty in obtaining a desired adhesive strength. As above, it is difficult for the conventional materials for the protrusion elements to obtain good results with regard to both of the position adjustability of the adhesiveness.

In contrast, all of the adhesive sheets in Inventive Examples 1 to 21 could obtain a frictional force of about 0.4 N/cm$^2$ or less and a shear adhesive strength of about 45 N/cm$^2$ or more. Thus, the present invention can provide an adhesive member to be adhesively fixed through pressure having both of the position adjustability and the adhesiveness and capable of bringing out a sufficient adhesive strength in addition to the position adjustability. From a viewpoint of easiness in terms of position adjustment, the frictional force is preferably set to about 0.4 N/cm$^2$ or less. If the frictional force is 0.5 N/cm$^2$ or more, it becomes difficult to perform position adjustment based on sliding movement. Further, from a viewpoint of easiness in terms of operation of attaching the adhesive sheet to an adherend, the frictional force is preferably set to about 0.05 N/cm$^2$ or more, more preferably 0.1 N/cm$^2$ or more. On the other hand, from a viewpoint of fixing reliability or not peeled-off after attachment, shear adhesive strength of about 45 N/cm$^2$ or more, more preferably 50 N/cm$^2$ or more, further more preferably 55 N/cm$^2$ or more.

It should be noted that these values are set as values which are realizable by an embodiment of the present invention and appropriate from a viewpoint of actual use. Thus, they can be easily changed depending on an environment of use by or demands from a user. Further, as is clear from the above description, they are adjustable by changing the protrusion element area ratio, the shear adhesive strength of the protruding elements, the composition of the pressure-sensitive adhesive, the adhesive thickness, the plastic strain or the like. Therefore, it is to be understood that the requirement of the present invention is not limited to the combination of a frictional force of about 0.4 N/cm² or less and a shear adhesive strength of about 45 N/cm² or more, but may be any other suitable combination, such as any of various combinations of aforementioned values of the frictional force and the shear adhesive strength.

<Relationship with Protrusion Element Area Ratio (Continuous-State Protrusion Elements)>

Regarding the stripe-shaped protrusion elements (12') described as one example, a relationship between the protrusion element area ratio and performance of the adhesive sheet will be discussed below. The following Table 5 presents the relationship in various line widths.

TABLE 5

| | | Stripe Line Width | | | | | |
|---|---|---|---|---|---|---|---|
| | | 150 µm | 370 µm | 620 µm | 810 µm | 1000 µm | 1500 µm |
| Protrusion Element Area Ratio | 50% | 64.5 0.12 | 66.3 0.15 | 61.6 0.14 | 60.9 0.21 | 64.8 0.18 | 58.9 0.18 |
| | 40% | 67.3 0.14 | 64.5 0.21 | 67.4 0.23 | 58.9 0.19 | 63.4 0.23 | 72.3 0.22 |
| | 30% | 115.2 0.19 | 130.4 0.22 | 123.7 0.25 | 127.1 0.22 | 116.3 0.47 | 120.5 0.56 |
| | 20% | 124.2 0.47 | 120.6 0.49 | 118.9 0.45 | 122.6 0.53 | 127.3 0.48 | 120.6 0.67 |
| | 10% | 130.3 >1 | 123.7 >1 | 119.7 >1 | 120.8 >1 | 116.7 >1 | 130.6 >1 |

This table includes evaluation results of Inventive Examples 15 to 18. In Table 5, the upper sub-row presents the shear adhesive strength (N/cm²), and the lower sub-row presents the frictional force (N/cm²). As is evident from this table, in all of the line widths, when the protrusion element area ratio is at least 30% or more, the requirement that the frictional force is about 0.4 N/cm² or less and the shear adhesive strength is about 45 N/cm² or more is satisfied. Considering that the pressure-sensitive adhesive is relatively freely adjustable, etc., the protrusion element area ratio may be 15% or more, and is preferably 20% or more, more preferably 25% or more, further more preferably 30% or more. Further, considering that an excessively large protrusion element area ratio leads to an undesirably lowered shear adhesive strength, the protrusion element area ratio is preferably 70% or less, more preferably 50% or less, further more preferably 40% or less. The adhesive strength of the pressure-sensitive adhesive can be set to be greater than that of the protrusion elements. Thus, by setting the protrusion element area ratio in the above manner, it is possible to obtain a good result, particularly, with regard to the adhesiveness.

It should be noted that the above values are set as values which are realizable by an embodiment of the present invention and appropriate from a viewpoint of actual use. Thus, they can be easily changed depending on an environment of use by or demands from a user. Further, as is clear from the above description, they are adjustable by changing the shear adhesive strength of the protruding elements, the composition of the pressure-sensitive adhesive, the adhesive thickness, the plastic strain or the like. Thus, it is to be understood that the present invention can encompass various combinations of the aforementioned upper limits and lower limits.

Further, as is evident from Table 5, the line widths satisfying the requirement that the frictional force is about 0.4 N/cm² or less and the shear adhesive strength is about 45 N/cm² or more include at least the range of 150 µm to 1500 µm. From a viewpoint of easiness in terms of production of the protrusion elements, the line width is preferably 100 µm or more, more preferably 150 µm or more, further more preferably 200 µm or more, most preferably 250 µm or more. On the other hand, considering that an excessively large line width leads to difficulty in implanting the protrusion elements into the pressure-sensitive adhesive, the line width is preferably 1600 µm or less, more preferably 1800 µm or less, further more preferably 1400 µm or less, most preferably 1200 µm or less.

It should be noted that the above values are set as values which are realizable by an embodiment of the present invention and appropriate from a viewpoint of actual use. Thus, they can be easily changed depending on an environment of use by or demands from a user. Further, as is clear from the above description, they are freely adjustable. Thus, it is to be understood that the present invention can encompass various combinations of the aforementioned upper limits and lower limits.

In contrast to the above embodiment of the present invention, in case of using the protrusion elements in Comparative Example 1, it is impossible to obtain a desired result, even if the stripe line width and/or the protrusion element area ratio are adjusted in any manner. According to test results, for example, when the stripe line width is 150 µm, and the protrusion element area ratio is 50%, 30% and 20%, values of (shear adhesive strength, the frictional force) are, respectively, (13.2 N/cm², 0.08 N/cm²), (23.9 N/cm², 0.21 N/cm²) and (24.4 N/cm², 0.29 N/cm²). Further, when the stripe line width is 810 µm, and the protrusion element area ratio is 50%, 40%, 30%, 20% and 10%, values of (shear adhesive strength, the frictional force) are, respectively, (13.4 N/cm², 0.09 N/cm²), (21.5 N/cm², 0.13 N/cm²), (34.1 N/cm², 0.22 N/cm²), (35.2 N/cm², 0.42 N/cm²), and (57.8 N/cm², >1 N/cm²). Further, when the stripe line width is 1000 µm, and the protrusion element area ratio is 30%, values of (shear adhesive strength, the frictional force) are (30.8 N/cm², 0.38 N/cm²). As is evidenced from this data, in case of using the protrusion elements in Comparative Example 1, even if the stripe line width is adjusted in any manner and even if the protrusion element area ratio is adjusted in any manner, the requirement that the frictional force is about 0.4 N/cm² or less and the shear adhesive strength is about 45 N/cm² or more could not be satisfied.

<Relationship with Protrusion Element Area Ratio (Dispersed Protrusion Elements)>

Regarding the dot-shaped protrusion elements (12) described as one example, a relationship between the protrusion element area ratio and performance of the adhesive sheet will be discussed below. As is evident from Inventive Examples 1 to 14 and Comparative Example 9, when the protrusion element area ratio is at least 25% or more, the requirement that the frictional force is about 0.4 N/cm² or less and the shear adhesive strength is about 45 N/cm² or more is satisfied. Considering that the pressure-sensitive adhesive is relatively freely adjustable, etc., the protrusion element area ratio may be 15% or more, and is preferably 20% or more, more preferably 25% or more, further more preferably 30% or more. Further, considering that an excessively large protrusion element area ratio leads to an undesirably lowed shear adhesive strength, the protrusion element area ratio is preferably 70% or less, more preferably 50% or less, further more preferably 40% or less. The adhesive strength of the pressure-sensitive adhesive can be set to be greater than that of the protrusion elements. Thus, by setting the protrusion element area ratio in the above manner, it is possible to obtain a good result, particularly, with regard to the adhesiveness.

It should be noted that the above values are set as values which are realizable by an embodiment of the present invention and appropriate from a viewpoint of actual use. Thus, they can be easily changed depending on an environment of use by or demands from a user. Further, as is clear from the above description, they are adjustable by changing the shear adhesive strength of the protruding elements, the composition of the pressure-sensitive adhesive, the adhesive thickness, the plastic strain or the like. Thus, it is to be understood that the present invention can encompass various combinations of the aforementioned upper limits and lower limits.

<Plastic Strain of Pressure-Sensitive Adhesive>

For example, as is evident from Inventive Example 12, when the plastic strain of the pressure-sensitive adhesive is at least 0.09 or more, the requirement that the frictional force is about 0.4 N/cm$^2$ or less and the shear adhesive strength is about 45 N/cm$^2$ or more is satisfied. On the other hand, as is evident from Comparative Example 10, when the plastic strain of the pressure-sensitive adhesive is at least 0.05 or less, the requirement is not satisfied. Considering that the protrusion elements and/or the pressure-sensitive adhesive are relatively freely adjustable, etc., the plastic strain may be 0.07 or more, and is preferably 0.09 or more, more preferably 0.13 or more. As long as the plastic strain falls within this range, it is possible to obtain a good result with regard to both of the position adjustability and the adhesiveness, while keeping balance between the protrusion elements and the elastic modulus. Further, from a viewpoint of processing of the adhesive sheet, the plastic strain is preferably 0.5 or less, more preferably 0.3 or less.

It should be noted that the above values are set as values which are realizable by an embodiment of the present invention and appropriate from a viewpoint of actual use. Thus, they can be easily changed depending on an environment of use by or demands from a user. Further, as is clear from the above description, they are adjustable by changing the shear adhesive strength of the protruding elements, the composition of the pressure-sensitive adhesive, the adhesive thickness, the plastic strain or the like. Thus, it is to be understood that the present invention can encompass various combinations of the aforementioned upper limits and lower limits.

<Relationship Between Thickness of Pressure-Sensitive Adhesive and Height Dimension of Protrusion Element>

Regarding the dot-shaped protrusion elements (12) described as one example, a relationship between the thickness of the pressure-sensitive adhesive and performance of the adhesive sheet will be discussed below. The following Table 6 presents the relationship in various protrusion element area ratios.

TABLE 6

| | | Adhesive Thickness | | | | |
|---|---|---|---|---|---|---|
| | | 50 μm | 70 μm | 100 μm | 150 μm | 200 μm |
| Protrusion Element Area Ratio | 60% | 7.1 | 25.1 | 53.9 | 46.7 | 46.1 |
| | | 0.05 | 0.04 | 0.09 | 0.11 | 0.1 |
| | 50% | 7.8 | 34.1 | 57.5 | 60.4 | 56.3 |
| | | 0.04 | 0.09 | 0.07 | 0.11 | 0.11 |
| | 45% | 8.4 | 43.1 | 61.3 | 67.3 | 61.2 |
| | | 0.08 | 0.11 | 0.11 | 0.14 | 0.17 |
| | 40% | 10.5 | 54.3 | 93.3 | 101.3 | 98.5 |
| | | 0.1 | 0.12 | 0.15 | 0.22 | 0.21 |
| | 35% | 9.4 | 51.8 | 104.3 | 113.3 | 108.5 |
| | | 0.08 | 0.15 | 0.17 | 0.21 | 0.24 |
| | 30% | 11.2 | 52.5 | 120.1 | 105.6 | 68.7 |
| | | 0.07 | 0.13 | 0.20 | 0.18 | 0.21 |
| | 25% | 33.1 | 76.1 | 114.1 | 86.4 | 78.8 |
| | | 0.14 | 0.29 | 0.37 | 0.38 | 0.43 |
| | 20% | 59.1 | 96.3 | 120.6 | 125.4 | 113.4 |
| | | 0.47 | 0.59 | 0.67 | >1 | >1 |
| | 15% | 106.7 | 113.2 | 132.6 | 145.7 | 107.7 |
| | | 0.87 | >1 | >1 | >1 | >1 |
| | 10% | 120.4 | 107.4 | 113.2 | 119.7 | 107.3 |
| | | >1 | >1 | >1 | >1 | >1 |

This table includes evaluation results of Inventive Examples 12 and 13 and Comparative Examples 8 and 9. In Table 6, the upper sub-row presents the shear adhesive strength (N/cm$^2$), and the lower sub-row presents the frictional force (N/cm$^2$). Although not described in this table, the height dimension of each of the protrusion elements is set to 60 μm. As is evident from this table, when a ratio of the thickness of the pressure-sensitive adhesive to the height dimension of the protrusion element is 70 or more: 60, the requirement that the frictional force is about 0.4 N/cm$^2$ or less and the shear adhesive strength is about 45 N/cm$^2$ or more is satisfied. Further, in this case, when the protrusion element area ratio is at least 20% or more, the above requirement is satisfied. Considering that the pressure-sensitive adhesive is relatively freely adjustable, etc. the ratio of the thickness of the pressure-sensitive adhesive to the height dimension of the protrusion element may be (60 to 2000): 100, and is preferably (70 to 2000): 100, more preferably (70 to 1500): 100, best preferably (70 to 000): 100.

Further, in this case, the protrusion element area ratio may be 15% or more, and is preferably 20% or more, more preferably 25% or more, further more preferably 30% or more. Considering that an excessively large protrusion element area ratio leads to an undesirably lowered shear adhesive strength, the protrusion element area ratio is preferably 70% or less, more preferably 50% or less, further more preferably 40% or less.

It should be noted that the above values are set as values which are realizable by an embodiment of the present invention and appropriate from a viewpoint of actual use. Thus, they can be easily changed depending on an environment of use by or demands from a user. Further, as is clear from the above description, they are adjustable by changing the shear adhesive strength of the protruding elements, the composition of the pressure-sensitive adhesive, the adhesive thickness, the plastic strain or the like. Thus, it is to be understood that the present invention can encompass various combinations of the aforementioned upper limits and lower limits.

When evaluating the test results, Inventive Examples pertaining to the dot-shaped protrusion elements and Inventive Examples pertaining to the stripe-shaped protrusion elements should not be completely separated and evaluated as two groups. This is because performance of the dot-shaped protrusion elements and performance of the stripe-shaped protrusion elements are approximately equal to each other as is evident from the results in Tables 1 to 3, so that a group of Inventive Examples 1 to 14 and a group of Inventive Examples 15 to 21 should be considered to be closely related to each other. Thus, Inventive Examples 1 to 14, Comparative Examples and Reference Example can be considered to include evaluation results about not only the dot-shaped protrusion elements but also the stripe-shaped protrusion elements, and Inventive Examples 15 to 21 can be considered to include evaluation results about not only the stripe-shaped protrusion elements but also the dot-shaped protrusion elements.

<Measurement Results Other than MMA Ratio: 100% and Core-Shell Ratio: 80%>

Tables 7 to 19 represent details of the shear adhesive strength and the frictional force in each of the adhesive sheets of Inventive Examples 1 to 9, 15 and 16, Comparative Example 8 and Reference Example 1. As for the remaining Inventive and Comparative Examples, evaluation results were obtained in the same manner, although details thereof are not presented. In these tables, in each row representing the MMA ratio, the upper sub-row presents the shear adhesive strength (N/cm$^2$), and the lower sub-row presents the frictional force (N/cm$^2$).

Table 4 presents only the measurement result pertaining to the protrusion element 12 having an MMA ratio of 100% and a core-shell ratio of 80%. Tables 7 to 19 represent details of measurement results of the shear adhesive strength and the frictional force in each of the adhesive sheets of some of Inventive Examples and Comparative Examples, and Reference Example 1, wherein each of the adhesive sheets has an MMA ratio other than 100% and a core-shell ratio other than 80%.

TABLE 7

| Inventive Example 1 | | Core-Shell Ratio | | | | | | | | | |
|---|---|---|---|---|---|---|---|---|---|---|---|
| | | 0 | 10 | 20 | 30 | 40 | 50 | 60 | 70 | 80 | 90 | 100 |
| MMA Ratio | 100 | 18.9 | 21.7 | 26.8 | 33.2 | 41.1 | 50.8 | 62.9 | 52.3 | 120.1 | 119.2 | 163.7 |
| | | 0.10 | 0.08 | 0.12 | 0.15 | 0.16 | 0.17 | 0.18 | 0.19 | 0.20 | >1 | >1 |
| | 90 | 21.7 | 25.4 | 30.7 | 37.1 | 44.9 | 58.4 | 65.8 | 53.7 | 123.1 | 117.1 | |
| | | 0.10 | 0.09 | 0.11 | 0.11 | 0.12 | 0.15 | 0.13 | 0.11 | 0.16 | >1 | |
| | 80 | 24.5 | 29.1 | 34.5 | 41.0 | 51.0 | 66.0 | 68.7 | 55.1 | 126.1 | 115.0 | |
| | | 0.09 | 0.11 | 0.10 | 0.12 | 0.15 | 0.18 | 0.16 | 0.20 | 0.21 | >1 | |
| | 70 | 19.0 | 23.8 | 26.7 | 37.7 | 47.9 | 90.8 | 78.1 | 133.5 | 123.8 | 168.4 | |
| | | 0.08 | 0.08 | 0.09 | 0.11 | 0.13 | 0.17 | 0.19 | 0.22 | 0.24 | >1 | |
| | 80 | 13.6 | 18.6 | 18.9 | 54.3 | 65.1 | 115.7 | 87.5 | 119.3 | 121.4 | 221.7 | |
| | | 0.10 | 0.12 | 0.13 | 0.13 | 0.15 | 0.23 | 0.24 | 0.23 | >1 | >1 | |
| | 55 | 77.3 | 78.8 | 88.8 | 99.9 | 108.4 | 74.5 | 120.5 | 125.0 | 129.0 | 132.5 | |
| | | 0.12 | 0.13 | 0.15 | 0.15 | 0.18 | 0.23 | 0.32 | 0.32 | >1 | >1 | |
| | 50 | 122.6 | 137.1 | 151.6 | 166.0 | 180.5 | 195.0 | 209.5 | 224.0 | 238.5 | 253.0 | |
| | | 0.15 | 0.17 | 0.21 | 0.23 | 0.26 | >1 | >1 | >1 | >1 | >1 | |
| | 40 | 103.1 | 102.6 | 137.2 | 134.9 | 141.7 | 141.2 | 151.2 | 154.9 | 158.0 | 160.8 | |
| | | 0.16 | 0.20 | 0.23 | 0.25 | 0.27 | >1 | >1 | >1 | >1 | >1 | |
| | 30 | 120.3 | 118.4 | 129.4 | 140.3 | 146.2 | 153.9 | 154.6 | 157.8 | 160.5 | 162.9 | |
| | | 0.22 | 0.23 | 0.32 | 0.33 | 0.34 | >1 | >1 | >1 | >1 | >1 | |
| | 20 | 154.9 | 134.3 | 145.6 | 151.8 | 155.9 | 166.7 | 161.6 | 163.8 | 165.7 | 167.4 | |
| | | >1 | >1 | >1 | >1 | >1 | >1 | >1 | >1 | >1 | >1 | |
| | 10 | 154.7 | 150.1 | 161.8 | 163.4 | 165.6 | 179.4 | 168.7 | 169.9 | 170.9 | 171.8 | |
| | | >1 | >1 | >1 | >1 | >1 | >1 | >1 | >1 | >1 | >1 | |
| | 0 | | | | | | 163.7 | | | | | |
| | | | | | | | >1 | | | | | |

TABLE 8

| Inventive Example 2 | | Core-Shell Ratio | | | | | | | | | |
|---|---|---|---|---|---|---|---|---|---|---|---|
| | | 0 | 10 | 20 | 30 | 40 | 50 | 60 | 70 | 80 | 90 | 100 |
| MMA Ratio | 100 | 9.6 | 11.0 | 13.6 | 16.8 | 20.8 | 25.8 | 31.9 | 26.5 | 76.0 | 60.4 | 90.4 |
| | | 0.08 | 0.09 | 0.08 | 0.11 | 0.14 | 0.16 | 0.17 | 0.21 | >1 | >1 | |
| | 90 | 11.0 | 12.9 | 15.6 | 18.8 | 22.8 | 29.6 | 33.4 | 51.6 | 53.8 | 59.4 | |
| | | 0.12 | 0.10 | 0.13 | 0.13 | 0.14 | 0.15 | 0.15 | 0.18 | 0.22 | >1 | |
| | 80 | 12.4 | 14.7 | 17.5 | 20.8 | 24.7 | 33.5 | 34.8 | 76.6 | 31.5 | 58.4 | |
| | | 0.11 | 0.13 | 0.10 | 0.11 | 0.15 | 0.16 | 0.18 | 0.22 | 0.22 | >1 | |
| | 70 | 9.7 | 12.1 | 13.5 | 19.1 | 24.3 | 29.9 | 39.6 | 68.6 | 46.5 | 85.4 | |
| | | 0.08 | 0.09 | 0.12 | 0.14 | 0.16 | 0.19 | 0.21 | 0.23 | 0.25 | >1 | |
| | 60 | 6.9 | 9.4 | 9.6 | 17.5 | 23.9 | 26.4 | 44.4 | 60.5 | 61.6 | 112.5 | |
| | | 0.10 | 0.11 | 0.13 | 0.16 | 0.19 | 0.24 | 0.22 | 0.24 | >1 | >1 | |
| | 55 | 39.2 | 40.0 | 45.0 | 50.7 | 55.0 | 3.6 | 61.1 | 63.4 | 65.4 | 67.2 | |
| | | 0.13 | 0.15 | 0.18 | 0.19 | 0.21 | 0.22 | 0.21 | 0.23 | >1 | >1 | |
| | 50 | 62.2 | 69.5 | 14.5 | 84.2 | 91.6 | 98.9 | 106.3 | 113.6 | 121.0 | 128.3 | |
| | | 0.14 | 0.15 | 0.23 | 0.24 | 0.25 | >1 | >1 | >1 | >1 | >1 | |
| | 40 | 52.3 | 52.0 | 115.3 | 68.4 | 71.9 | 71.6 | 76.7 | 78.6 | 80.1 | 81.6 | |
| | | 0.14 | 0.17 | 0.22 | 0.14 | 0.24 | >1 | >1 | >1 | >1 | >1 | |
| | 30 | 61.0 | 60.1 | 65.6 | 71.2 | 74.2 | 78.1 | 78.4 | 80.0 | 81.4 | 82.7 | |
| | | 0.16 | 0.18 | 0.24 | 0.26 | 0.23 | >1 | >1 | >1 | >1 | >1 | |

TABLE 8-continued

| Inventive | Core-Shell Ratio | | | | | | | | | | |
|---|---|---|---|---|---|---|---|---|---|---|---|
| Example 2 | 0 | 10 | 20 | 30 | 40 | 50 | 60 | 70 | 80 | 90 | 100 |
| 20 | 78.6 | 68.1 | 73.9 | 77.0 | 79.1 | 84.6 | 82.0 | 83.1 | 84.1 | 84.9 | |
|  | >1 | >1 | >1 | >1 | >1 | >1 | >1 | >1 | >1 | >1 | |
| 10 | 78.5 | 76.2 | 82.1 | 82.9 | 84.0 | 91.0 | 85.6 | 86.2 | 86.7 | 87.2 | |
|  | >1 | >1 | >1 | >1 | >1 | >1 | >1 | >1 | >1 | >1 | |
| 0 |  |  |  |  |  | 90.4 |  |  |  |  | |
|  |  |  |  |  |  | >1 |  |  |  |  | |

TABLE 9

| Inventive | | Core-Shell Ratio | | | | | | | | | |
|---|---|---|---|---|---|---|---|---|---|---|---|
| Example 3 | 0 | 10 | 20 | 30 | 40 | 50 | 60 | 70 | 80 | 90 | 100 |
| MMA 100 | 21.4 | 24.6 | 30.4 | 37.7 | 46.6 | 57.7 | 71.4 | 62.1 | 80.1 | 135.2 | 189.4 |
| Ratio | 0.06 | 0.06 | 0.08 | 0.09 | 0.09 | 0.12 | 0.14 | 0.17 | 0.22 | >1 | >1 |
| 90 | 24.6 | 28.8 | 34.8 | 42.1 | 43.1 | 66.3 | 74.6 | 63.5 | 86.8 | 132.9 | |
|  | 0.07 | 0.09 | 0.08 | 0.10 | 0.11 | 0.13 | 0.14 | 0.17 | 0.20 | >1 | |
| 80 | 27.8 | 33.0 | 39.2 | 46.5 | 55.2 | 74.9 | 77.9 | 64.9 | 93.5 | 130.5 | |
|  | 0.09 | 0.09 | 0.11 | 0.13 | 0.15 | 0.14 | 0.18 | 0.25 | 0.25 | >1 | |
| 70 | 21.6 | 27.0 | 30.3 | 42.8 | 54.3 | 99.1 | 88.6 | 100.1 | 115.6 | 191.1 | |
|  | 0.07 | 0.11 | 0.12 | 0.14 | 0.16 | 0.22 | 0.19 | 0.22 | 0.24 | >1 | |
| 60 | 15.5 | 21.1 | 21.4 | 39.2 | 53.4 | 123.2 | 99.3 | 135.3 | 137.8 | 251.6 | |
|  | 0.08 | 0.11 | 0.11 | 0.14 | 0.15 | 0.20 | 0.22 | 0.23 | >1 | >1 | |
| 55 | 87.7 | 89.4 | 100.8 | 113.3 | 123.0 | 87.2 | 136.7 | 141.9 | 146.4 | 150.4 | |
|  | 0.09 | 0.13 | 0.19 | 0.21 | 0.19 | 0.24 | 0.21 | 0.22 | >1 | >1 | |
| 50 | 139.1 | 155.5 | 129.3 | 188.4 | 204.9 | 221.3 | 237.8 | 254.2 | 270.6 | 287.1 | |
|  | 0.12 | 0.15 | 0.25 | 0.21 | 0.23 | >1 | >1 | >1 | >1 | >1 | |
| 40 | 117.0 | 116.4 | 122.6 | 153.1 | 160.8 | 160.2 | 171.6 | 175.7 | 179.3 | 182.4 | |
|  | 0.14 | 0.17 | 0.20 | 0.21 | 0.24 | >1 | >1 | >1 | >1 | >1 | |
| 30 | 136.5 | 134.4 | 146.8 | 159.2 | 165.9 | 174.7 | 175.4 | 179.0 | 182.1 | 184.9 | |
|  | 0.13 | 0.14 | 0.22 | 0.26 | 0.22 | >1 | >1 | >1 | >1 | >1 | |
| 20 | 175.8 | 152.4 | 165.2 | 172.3 | 176.9 | 189.2 | 183.4 | 185.9 | 188.1 | 190.0 | |
|  | >1 | >1 | >1 | >1 | >1 | >1 | >1 | >1 | >1 | >1 | |
| 10 | 175.6 | 170.4 | 183.6 | 185.4 | 187.9 | 203.6 | 191.4 | 192.8 | 194.0 | 195.0 | |
|  | >1 | >1 | >1 | >1 | >1 | >1 | >1 | >1 | >1 | >1 | |
| 0 |  |  |  |  |  | 189.4 |  |  |  |  | |
|  |  |  |  |  |  | >1 |  |  |  |  | |

TABLE 10

| Inventive | | Core-Shell Ratio | | | | | | | | | |
|---|---|---|---|---|---|---|---|---|---|---|---|
| Example 4 | 0 | 10 | 20 | 30 | 40 | 50 | 60 | 70 | 80 | 90 | 100 |
| MMA 100 | 15.9 | 21.0 | 25.8 | 31.8 | 39.2 | 48.2 | 59.4 | 73.1 | 91.9 | 110.8 | 98.9 |
| Ratio | 0.06 | 0.08 | 0.08 | 0.12 | 0.11 | 0.15 | 0.18 | 0.15 | 0.16 | 0.6 | >1 |
| 90 | 20.9 | 21.3 | 32.3 | 29.8 | 43.8 | 53.6 | 54.9 | 67.8 | 75.6 | 97.4 | |
|  | 0.07 | 0.09 | 0.12 | 0.11 | 0.15 | 0.16 | 0.14 | 0.21 | 0.26 | >1 | |
| 80 | 24.5 | 29.8 | 31.2 | 34.2 | 35.6 | 41.2 | 53.3 | 64.5 | 75.2 | 87.3 | |
|  | 0.08 | 0.08 | 0.13 | 0.11 | 0.19 | 0.16 | 0.15 | 0.21 | 0.21 | >1 | |
| 70 | 31.2 | 37.0 | 33.9 | 36.8 | 39.9 | 51.2 | 60.7 | 78.2 | 87.2 | 98.4 | |
|  | 0.09 | 0.10 | 0.13 | 0.16 | 0.14 | 0.21 | 0.21 | 0.25 | 0.24 | >1 | |
| 60 | 39.2 | 32.2 | 41.3 | 43.5 | 51.7 | 62.8 | 67.8 | 78.3 | 95.2 | 112.3 | |
|  | 0.12 | 0.13 | 0.14 | 0.21 | 0.23 | 0.22 | 0.27 | 0.32 | >1 | >1 | |
| 55 | 46.2 | 59.7 | 64.2 | 59.9 | 72.1 | 69.3 | 85.1 | 90.1 | 107.7 | 114.4 | |
|  | 0.16 | 0.17 | 0.15 | 0.21 | 0.22 | 0.21 | 0.25 | 0.25 | >1 | >1 | |
| 50 | 58.1 | 67.8 | 64.5 | 71.2 | 74.3 | 81.5 | 89.9 | 93.4 | 110.1 | 112.1 | |
|  | 0.19 | 0.23 | 0.21 | 0.31 | 0.26 | >1 | >1 | >1 | >1 | >1 | |
| 40 | 73.2 | 78.1 | 86.9 | 81.2 | 85.5 | 91.2 | 89.4 | 89.9 | 93.2 | 92.2 | |
|  | 0.21 | 0.24 | 0.23 | 0.27 | 0.31 | >1 | >1 | >1 | >1 | >1 | |
| 30 | 78.9 | 89.9 | 92.3 | 100.4 | 110.4 | 110.3 | 114.6 | 119.0 | 123.5 | 128.4 | |
|  | 0.21 | 0.24 | 0.24 | 0.29 | 0.32 | >1 | >1 | >1 | >1 | >1 | |
| 20 | 116.1 | 118.2 | 120.4 | 122.5 | 124.8 | 127.0 | 129.3 | 131.7 | 134.1 | 136.5 | |
|  | >1 | >1 | >1 | >1 | >1 | >1 | >1 | >1 | >1 | >1 | |
| 10 | 136.1 | 138.0 | 140.0 | 141.9 | 143.9 | 146.0 | 148.0 | 150.1 | 152.3 | 154.4 | |
|  | >1 | >1 | >1 | >1 | >1 | >1 | >1 | >1 | >1 | >1 | |
| 0 |  |  |  |  |  | 98.9 |  |  |  |  | |
|  |  |  |  |  |  | >1 |  |  |  |  | |

TABLE 11

| Inventive Example 5 | Core-Shell Ratio | | | | | | | | | | |
|---|---|---|---|---|---|---|---|---|---|---|---|
| | 0 | 10 | 20 | 30 | 40 | 50 | 60 | 70 | 80 | 90 | 100 |
| MMA Ratio 100 | 21.8<br>0.10 | 20.5<br>0.09 | 25.6<br>0.13 | 31.3<br>0.12 | 43.3<br>0.15 | 48.9<br>0.22 | 67.5<br>0.17 | 78.5<br>0.21 | 108.0<br>0.20 | 113.2<br>>1 | 143.2<br>>1 |
| 90 | | 18.8<br>0.07 | 23.5<br>0.09 | 31.4<br>0.13 | 40.6<br>0.13 | 46.4<br>0.16 | 56.3<br>0.15 | 67.3<br>0.18 | 78.3<br>0.15 | 112.2<br>0.16 | 121.2<br>>1 |
| 80 | | 23.2<br>0.10 | 26.7<br>0.11 | 36.6<br>0.11 | 37.8<br>0.13 | 56.4<br>0.16 | 63.3<br>0.16 | 67.4<br>0.18 | 73.3<br>0.23 | 103.2<br>0.24 | 126.4<br>>1 |
| 70 | | 23.9<br>0.11 | 31.3<br>0.06 | 28.3<br>0.09 | 35.3<br>0.13 | 45.2<br>0.13 | 67.6<br>0.15 | 77.4<br>0.21 | 97.4<br>0.25 | 112.2<br>0.23 | 108.8<br>>1 |
| 60 | | 24.1<br>0.13 | 18.8<br>0.12 | 34.1<br>0.14 | 45.8<br>0.11 | 55.3<br>0.15 | 83.2<br>0.19 | 87.5<br>0.21 | 103.2<br>0.26 | 112.1<br>>1 | 106.5<br>>1 |
| 55 | | 43.7<br>0.14 | 56.1<br>0.16 | 78.6<br>0.15 | 85.4<br>0.16 | 95.3<br>0.17 | 99.8<br>0.24 | 105.3<br>0.33 | 112.3<br>0.29 | 121.8<br>>1 | 118.5<br>>1 |
| 50 | | 75.4<br>0.15 | 86.5<br>0.19 | 89.5<br>0.21 | 93.1<br>0.29 | 97.9<br>0.27 | 105.5<br>>1 | 109.9<br>>1 | 115.3<br>>1 | 112.4<br>>1 | 130.5<br>>1 |
| 40 | | 87.4<br>0.21 | 94.1<br>0.18 | 105.3<br>0.24 | 113.2<br>0.25 | 120.5<br>0.26 | 119.4<br>>1 | 125.4<br>>1 | 117.4<br>>1 | 120.6<br>>1 | 124.6<br>>1 |
| 30 | | 94.1<br>0.22 | 97.6<br>0.26 | 105.4<br>0.37 | 109.3<br>0.35 | 112.4<br>0.31 | 120.5<br>>1 | 123.5<br>>1 | 114.3<br>>1 | 120.3<br>>1 | 119.3<br>>1 |
| 20 | | 123.5<br>>1 | 134.2<br>>1 | 121.7<br>>1 | 124.6<br>>1 | 134.3<br>>1 | 130.7<br>>1 | 145.2<br>>1 | 136.9<br>>1 | 140.6<br>>1 | 143.9<br>>1 |
| 10 | | 132.3<br>>1 | 136.5<br>>1 | 137.8<br>>1 | 134.2<br>>1 | 138.9<br>>1 | 135.3<br>>1 | 140.7<br>>1 | 145.3<br>>1 | 143.2<br>>1 | 140.3<br>>1 |
| 0 | | | | | | 143.2<br>>1 | | | | | |

TABLE 12

| Inventive Example 6 | Core-Shell Ratio | | | | | | | | | | |
|---|---|---|---|---|---|---|---|---|---|---|---|
| | 10 | 10 | 20 | 30 | 40 | 50 | 60 | 70 | 80 | 90 | 100 |
| MMA Ratio 100 | 10.3<br>0.09 | 10.2<br>0.05 | 12.4<br>0.12 | 16.7<br>0.11 | 21.5<br>0.13 | 29.5<br>0.13 | 34.2<br>0.15 | 43.3<br>0.18 | 49.5<br>0.18 | 50.9<br>>1 | 54.2<br>>1 |
| 90 | | 12.3<br>0.05 | 11.3<br>0.11 | 15.4<br>0.08 | 20.5<br>0.13 | 22.4<br>0.15 | 23.4<br>0.15 | 31.2<br>0.17 | 37.8<br>0.19 | 49.4<br>0.22 | 47.8<br>>1 |
| 80 | | 14.5<br>0.11 | 15.4<br>0.11 | 18.8<br>0.12 | 23.2<br>0.09 | 28.8<br>0.14 | 31.2<br>0.16 | 37.3<br>0.21 | 40.9<br>0.25 | 50.6<br>0.22 | 52.1<br>>1 |
| 70 | | 13.1<br>0.08 | 17.4<br>0.09 | 20.3<br>0.08 | 22.4<br>0.12 | 32.6<br>0.14 | 40.4<br>0.21 | 42.2<br>0.18 | 45.5<br>0.23 | 46.1<br>0.24 | 48.7<br>>1 |
| 60 | | 15.4<br>0.11 | 19.3<br>0.12 | 23.2<br>0.13 | 28.8<br>0.12 | 32.6<br>0.18 | 37.9<br>0.16 | 45.2<br>0.22 | 43.7<br>0.27 | 47.8<br>>1 | 50.7<br>>1 |
| 55 | | 18.8<br>0.13 | 21.3<br>0.15 | 24.4<br>0.13 | 31.8<br>0.16 | 33.2<br>0.16 | 36.4<br>0.22 | 46.2<br>0.26 | 49.4<br>0.27 | 50.7<br>>1 | 46.8<br>>1 |
| 50 | | 21.9<br>0.17 | 23.3<br>0.19 | 34.2<br>0.20 | 35.6<br>0.20 | 0.3<br>0.28 | 45.3<br>>1 | 47.2<br>>1 | 43.8<br>>1 | 49.6<br>>1 | 53.3<br>>1 |
| 40 | | 27.7<br>0.21 | 30.6<br>0.22 | 32.5<br>0.24 | 34.5<br>0.21 | 40.4<br>0.29 | 43.3<br>>1 | 45.5<br>>1 | 50.5<br>>1 | 46.6<br>>1 | 48.9<br>>1 |
| 30 | | 30.3<br>0.24 | 34.4<br>0.29 | 34.1<br>0.33 | 38.8<br>0.32 | 40.8<br>0.36 | 45.1<br>>1 | 50.8<br>>1 | 114.3<br>>1 | 52.2<br>>1 | 51.3<br>>1 |
| 20 | | 36.6<br>>1 | 40.2<br>>1 | 43.8<br>>1 | 44.7<br>>1 | 43.1<br>>1 | 45.7<br>>1 | 50.2<br>>1 | 48.3<br>>1 | 49.4<br>>1 | 52.4<br>>1 |
| 10 | | 37.7<br>>1 | 40.5<br>>1 | 43.7<br>>1 | 48.3<br>>1 | 50.3<br>>1 | 51.2<br>>1 | 54.4<br>>1 | 49.7<br>>1 | 50.5<br>>1 | 55.3<br>>1 |
| 0 | | | | | | 54.2<br>>1 | | | | | |

TABLE 13

| Inventive Example 7 | Core-Shell Ratio | | | | | | | | | | |
|---|---|---|---|---|---|---|---|---|---|---|---|
| | 0 | 10 | 20 | 30 | 40 | 50 | 60 | 70 | 80 | 90 | 100 |
| MMA Ratio 100 | 25.5<br>0.05 | 31.3<br>0.05 | 38.5<br>0.07 | 41.2<br>0.09 | 58.1<br>0.13 | 71.3<br>0.15 | 87.7<br>0.21 | 107.7<br>0.26 | 132.4<br>0.27 | 162.6<br>>1 | 167.4<br>>1 |
| 90 | | 30.0<br>0.09 | 36.2<br>0.12 | 43.7<br>0.12 | 43.3<br>0.15 | 63.7<br>0.19 | 76.9<br>0.22 | 98.8<br>0.21 | 109.7<br>0.24 | 135.6<br>0.24 | 156.7<br>>1 |

TABLE 13-continued

| Inventive Example 7 | Core-Shell Ratio | | | | | | | | | | |
|---|---|---|---|---|---|---|---|---|---|---|---|
| | 0 | 10 | 20 | 30 | 40 | 50 | 60 | 70 | 80 | 90 | 100 |
| 80 | 34.9<br>0.08 | 41.5<br>0.13 | 42.3<br>0.12 | 43.2<br>0.15 | 65.4<br>0.19 | 78.8<br>0.23 | 96.5<br>0.24 | 115.4<br>0.21 | 154.3<br>0.26 | 168.4<br>>1 | |
| 70 | 34.1<br>0.08 | 35.2<br>0.09 | 40.3<br>0.09 | 42.3<br>0.13 | 51.1<br>0.12 | 63.4<br>0.18 | 85.1<br>0.23 | 94.3<br>0.22 | 114.4<br>0.25 | 134.5<br>>1 | |
| 60 | 43.3<br>0.09 | 41.2<br>0.13 | 48.9<br>0.15 | 56.5<br>0.21 | 56.7<br>0.17 | 60.2<br>0.23 | 70.0<br>0.25 | 89.3<br>0.33 | 102.5<br>>1 | 112.3<br>>1 | |
| 55 | 62.1<br>0.21 | 65.4<br>0.18 | 64.5<br>0.23 | 94.3<br>0.19 | 89.5<br>0.20 | 89.3<br>0.20 | 104.5<br>0.21 | 110.2<br>0.27 | 98.9<br>>1 | 104.5<br>>1 | |
| 50 | 79.4<br>0.17 | 82.1<br>0.21 | 78.9<br>0.23 | 85.6<br>0.22 | 92.1<br>0.24 | 98.4<br>>1 | 98.8<br>>1 | 102.3<br>>1 | 101.4<br>>1 | 113.2<br>>1 | |
| 40 | 91.2<br>0.18 | 102.1<br>0.22 | 112.7<br>0.21 | 123.2<br>0.25 | 119.7<br>0.29 | 121.5<br>>1 | 132.5<br>>1 | 145.3<br>>1 | 147.8<br>>1 | 154.6<br>>1 | |
| 30 | 121.0<br>0.23 | 124.5<br>0.24 | 143.2<br>0.22 | 122.3<br>0.25 | 143.2<br>0.32 | 135.6<br>>1 | 152.3<br>>1 | 156.7<br>>1 | 171.2<br>>1 | 167.7<br>>1 | |
| 20 | 151.1<br>>1 | 143.4<br>>1 | 166.5<br>>1 | 156.7<br>>1 | 167.3<br>>1 | 165.3<br>>1 | 168.5<br>>1 | 167.7<br>>1 | 170.9<br>>1 | 177.7<br>>1 | |
| 10 | 156.7<br>>1 | 164.5<br>>1 | 167.7<br>>1 | 174.3<br>>1 | 167.4<br>>1 | 177.6<br>>1 | 184.3<br>>1 | 179.9<br>>1 | 191.2<br>>1 | 195.4<br>>1 | |
| 0 | | | | | | 167.4<br>>1 | | | | | |

TABLE 14

| Inventive Example 8 | | Core-Shell Ratio | | | | | | | | | | |
|---|---|---|---|---|---|---|---|---|---|---|---|---|
| | | 0 | 10 | 20 | 30 | 40 | 50 | 60 | 70 | 80 | 90 | 100 |
| MMA Ratio | 100 | 21.3<br>0.24 | 22.3<br>0.23 | 31.5<br>0.28 | 35.6<br>0.23 | 43.4<br>0.25 | 51.2<br>0.23 | 63.4<br>0.32 | 73.3<br>0.31 | 84.8<br>0.36 | 95.3<br>>1 | 119.3<br>>1 |
| | 90 | 22.3<br>0.28 | 23.3<br>0.22 | 35.4<br>0.25 | 40.5<br>0.28 | 45.1<br>0.29 | 48.8<br>0.32 | 67.3<br>0.33 | 70.7<br>0.31 | 81.2<br>0.34 | 94.6<br>>1 | |
| | 80 | 27.5<br>0.26 | 29.4<br>0.25 | 37.7<br>0.31 | 43.3<br>0.29 | 48.8<br>0.33 | 51.8<br>0.28 | 57.5<br>0.31 | 68.7<br>0.35 | 85.6<br>0.39 | 103.3<br>>1 | |
| | 70 | 33.1<br>0.24 | 37.4<br>0.27 | 40.7<br>0.27 | 42.6<br>0.28 | 45.3<br>0.31 | 53.1<br>0.28 | 57.2<br>0.33 | 67.2<br>0.35 | 86.3<br>0.37 | 98.4<br>>1 | |
| | 60 | 35.3<br>0.26 | 39.2<br>0.22 | 43.4<br>0.33 | 47.5<br>0.32 | 52.3<br>0.34 | 56.3<br>0.36 | 59.4<br>0.37 | 63.7<br>0.37 | 87.4<br>>1 | 94.4<br>>1 | |
| | 55 | 37.3<br>0.31 | 40.2<br>0.28 | 44.2<br>0.26 | 43.8<br>0.31 | 53.4<br>0.29 | 56.9<br>0.32 | 60.4<br>0.36 | 66.4<br>0.37 | 86.3<br>>1 | 104.5<br>>1 | |
| | 50 | 41.9<br>0.27 | 43.3<br>0.29 | 44.5<br>0.30 | 45.6<br>0.28 | 60.4<br>0.35 | 65.5<br>>1 | 68.7<br>>1 | 70.4<br>>1 | 84.5<br>>1 | 98.4<br>>1 | |
| | 40 | 45.3<br>0.32 | 47.7<br>0.34 | 45.5<br>0.34 | 51.2<br>0.35 | 54.3<br>0.37 | 63.4<br>>1 | 67.4<br>>1 | 70.5<br>>1 | 85.3<br>>1 | 95.4<br>>1 | |
| | 0 | 52.3<br>0.31 | 55.6<br>0.29 | 50.2<br>0.34 | 54.4<br>0.33 | 59.7<br>0.35 | 67.3<br>>1 | 70.5<br>>1 | 76.1<br>>1 | 89.3<br>>1 | 98.9<br>>1 | |
| | 20 | 67.3<br>>1 | 63.3<br>>1 | 67.5<br>>1 | 78.4<br>>1 | 76.3<br>>1 | 78.5<br>>1 | 86.5<br>>1 | 89.4<br>>1 | 94.3<br>>1 | 105.4<br>>1 | |
| | 10 | 67.4<br>>1 | 69.4<br>>1 | 73.5<br>>1 | 78.9<br>>1 | 85.5<br>>1 | 89.4<br>>1 | 92.3<br>>1 | 96.7<br>>1 | 105.2<br>>1 | 101.3<br>>1 | |
| | 0 | | | | | | 119.3<br>>1 | | | | | |

TABLE 15

| Example 9 | | 0 | 10 | 20 | 30 | 40 | 50 | 60 | 70 | 80 | 90 | 100 |
|---|---|---|---|---|---|---|---|---|---|---|---|---|
| MMA Ratio | 100 | 18.7<br>0.12 | 16.3<br>0.11 | 21.7<br>0.14 | 25.6<br>0.13 | 33.8<br>0.15 | 40.1<br>0.16 | 45.6<br>0.19 | 57.4<br>0.18 | 68.7<br>0.21 | 78.3<br>>1 | 84.3<br>>1 |
| | 90 | 20.2<br>0.09 | 18.9<br>0.10 | 24.2<br>0.09 | 27.6<br>0.11 | 34.2<br>0.14 | 38.7<br>0.17 | 47.7<br>0.21 | 60.8<br>0.23 | 71.2<br>0.22 | 76.6<br>>1 | |
| | 80 | 22.1<br>0.10 | 24.4<br>0.12 | 27.3<br>0.11 | 30.2<br>0.13 | 34.7<br>0.13 | 40.5<br>0.15 | 48.6<br>0.19 | 62.1<br>0.21 | 75.3<br>0.22 | 80.4<br>>1 | |
| | 70 | 24.5<br>0.11 | 27.7<br>0.13 | 30.3<br>0.12 | 35.4<br>0.15 | 39.4<br>0.18 | 43.8<br>0.16 | 50.3<br>0.22 | 62.6<br>0.23 | 70.8<br>0.22 | 78.1<br>>1 | |
| | 60 | 31.4<br>0.12 | 34.4<br>0.13 | 38.5<br>0.15 | 42.6<br>0.15 | 47.7<br>0.14 | 51.2<br>0.19 | 56.6<br>0.21 | 65.4<br>0.22 | 69.6<br>>1 | 81.2<br>>1 | |

TABLE 15-continued

| Example 9 | 0 | 10 | 20 | 30 | 40 | 50 | 60 | 70 | 80 | 90 | 100 |
|---|---|---|---|---|---|---|---|---|---|---|---|
| 55 | 35.9 | 43.3 | 46.4 | 43.8 | 52.4 | 56.7 | 64.1 | 67.4 | 75.4 | 89.5 | |
|    | 0.13 | 0.09 | 0.12 | 0.13 | 0.17 | 0.18 | 0.21 | 0.24 | >1 | >1 | |
| 50 | 45.4 | 48.5 | 50.7 | 55.3 | 49.5 | 62.1 | 67.4 | 78.4 | 76.9 | 84.2 | |
|    | 0.12 | 0.14 | 0.15 | 0.21 | 0.28 | >1 | >1 | >1 | >1 | >1 | |
| 40 | 47.3 | 50.6 | 56.9 | 67.1 | 64.5 | 64.9 | 71.7 | 83.2 | 76.7 | 80.5 | |
|    | 0.17 | 0.21 | 0.23 | 0.22 | 0.26 | >1 | >1 | >1 | >1 | >1 | |
| 30 | 50.9 | 54.5 | 64.4 | 68.3 | 70.5 | 73.3 | 78.5 | 75.5 | 82.4 | 82.8 | |
|    | 0.21 | 0.23 | 0.26 | 0.24 | 0.28 | >1 | >1 | >1 | >1 | >1 | |
| 20 | 57.5 | 61.2 | 65.9 | 71.2 | 75.5 | 76.9 | 80.4 | 76.1 | 79.7 | 84.5 | |
|    | >1 | >1 | >1 | >1 | >1 | >1 | >1 | >1 | >1 | >1 | |
| 10 | 64.4 | 67.6 | 78.7 | 72.3 | 78.9 | 81.4 | 87.5 | 89.1 | 81.2 | 86.4 | |
|    | >1 | >1 | >1 | >1 | >1 | >1 | >1 | >1 | >1 | >1 | |
| 0 | | | | | | 84.3 | | | | | |
|   | | | | | | >1 | | | | | |

TABLE 16

| Inventive | Core-Shell Ratio | | | | | | | | | | |
|---|---|---|---|---|---|---|---|---|---|---|---|
| Example 15 | 0 | 10 | 20 | 30 | 40 | 50 | 60 | 70 | 80 | 90 | 100 |
| MMA 100 | 18.3 | 22.5 | 27.8 | 34.1 | 36.7 | 56.4 | 61.2 | 109.6 | 127.1 | 122.6 | 133.7 |
| Ratio | 0.08 | 0.08 | 0.12 | 0.15 | 0.16 | 0.17 | 0.18 | 0.20 | 0.22 | >1 | >1 |
| 90 | 19.7 | 26.7 | 34.5 | 43.5 | 44.6 | 67.5 | 78.6 | 113.2 | 122.6 | 124.2 | |
|    | 0.11 | 0.10 | 0.13 | 0.16 | 0.22 | 0.22 | 0.25 | 0.26 | 0.27 | >1 | |
| 80 | 21.2 | 27.6 | 33.5 | 42.7 | 46.8 | 68.4 | 80.4 | 114.2 | 115.9 | 127.5 | |
|    | 0.13 | 0.16 | 0.19 | 0.22 | 0.33 | 0.27 | 0.32 | 0.35 | 0.38 | >1 | |
| 70 | 21.3 | 27.8 | 34.1 | 43.4 | 56.7 | 78.4 | 84.5 | 121.3 | 122.8 | 154.5 | |
|    | 0.15 | 0.18 | 0.22 | 0.25 | 0.28 | 0.31 | 0.34 | 0.35 | 0.38 | >1 | |
| 60 | 22.6 | 29.3 | 36.7 | 51.3 | 66.3 | 87.3 | 88.9 | 119.7 | 132.1 | 145.3 | |
|    | 0.15 | 0.20 | 0.24 | 0.26 | 0.31 | 0.32 | 0.36 | 0.38 | >1 | >1 | |
| 55 | 45.7 | 47.8 | 78.9 | 89.5 | 102.3 | 112.1 | 120.4 | 119.8 | 128.9 | 147.8 | |
|    | 0.19 | 0.22 | 0.25 | 0.28 | 0.29 | 0.33 | 0.36 | 0.39 | >1 | >1 | |
| 50 | 89.2 | 85.6 | 97.6 | 104.5 | 114.5 | 125.1 | 123.4 | 119.8 | 134.2 | 156.3 | |
|    | 0.23 | 0.28 | 0.31 | 0.34 | 0.36 | >1 | >1 | >1 | >1 | >1 | |
| 40 | 94.5 | 113.1 | 109.5 | 113.4 | 112.8 | 128.1 | 134.1 | 137.9 | 145.1 | 152.5 | |
|    | 0.25 | 0.32 | 0.29 | 0.34 | 0.39 | >1 | >1 | >1 | >1 | >1 | |
| 30 | 104.5 | 113.4 | 132.1 | 134.2 | 134.9 | 139.4 | 145.1 | 149.6 | 154.2 | 155.9 | |
|    | 0.28 | 0.30 | 0.31 | 0.33 | 0.34 | >1 | >1 | >1 | >1 | >1 | |
| 20 | 114.5 | 126.7 | 134.2 | 143.2 | 145.9 | 145.1 | 156.4 | 161.4 | 156.4 | 158.9 | |
|    | >1 | >1 | >1 | >1 | >1 | >1 | >1 | >1 | 1 | >1 | |
| 10 | 132.8 | 144.8 | 167.2 | 151.2 | 143.7 | 156.3 | 147.4 | 138.9 | 156.3 | 158.8 | |
|    | >1 | >1 | >1 | >1 | >1 | >1 | >1 | >1 | >1 | >1 | |
| 0 | | | | | | 133.7 | | | | | |
|   | | | | | | >1 | | | | | |

TABLE 17

| Inventive | Core-Shell Ratio | | | | | | | | | | |
|---|---|---|---|---|---|---|---|---|---|---|---|
| Example 16 | 0 | 10 | 20 | 30 | 40 | 50 | 60 | 70 | 80 | 90 | 100 |
| MMA 100 | 16.9 | 20.1 | 24.9 | 30.6 | 35.4 | 48.8 | 56.5 | 73.7 | 113.1 | 110.0 | 123.1 |
| Ratio | 0.09 | 0.12 | 0.13 | 0.14 | 0.17 | 0.22 | 0.27 | 0.24 | 0.22 | >1 | >1 |
| 90 | 18.9 | 23.8 | 29.8 | 36.9 | 45.9 | 57.6 | 66.1 | 76.3 | 112.4 | 110.4 | |
|    | 0.12 | 0.14 | 0.16 | 0.17 | 0.21 | 0.24 | 0.28 | 0.29 | 0.29 | >1 | |
| 80 | 20.9 | 25.9 | 31.1 | 38.3 | 46.2 | 61.5 | 68.2 | 77.4 | 110.7 | 111.0 | |
|    | 0.14 | 0.15 | 0.16 | 0.23 | 0.26 | 0.30 | 0.31 | 0.34 | 0.37 | >1 | |
| 70 | 18.5 | 23.6 | 27.8 | 46.4 | 54.3 | 63.8 | 74.4 | 116.6 | 112.8 | 147.7 | |
|    | 0.13 | 0.22 | 0.24 | 0.25 | 0.26 | 0.29 | 0.31 | 0.35 | 0.38 | >1 | |
| 60 | 16.6 | 33.9 | 41.2 | 45.7 | 56.7 | 78.6 | 80.7 | 109.3 | 116.0 | 134.1 | |
|    | 0.14 | 0.19 | 0.25 | 0.25 | 0.32 | 0.34 | 0.35 | 0.37 | >1 | >1 | |
| 55 | 46.7 | 57.9 | 76.7 | 86.6 | 96.4 | 85.4 | 110.2 | 112.0 | 118.0 | 128.2 | |
|    | 0.15 | 0.19 | 0.23 | 0.29 | 0.35 | 0.38 | 0.37 | 0.38 | >1 | >1 | |
| 50 | 56.9 | 67.5 | 78.4 | 91.3 | 100.4 | 112.1 | 113.1 | 120.1 | 116.9 | 123.6 | |
|    | 0.23 | 0.28 | 0.31 | 0.34 | 0.36 | >1 | >1 | >1 | >1 | >1 | |
| 40 | 90.4 | 98.7 | 112.9 | 113.6 | 116.4 | 123.2 | 130.5 | 133.9 | 138.7 | 143.3 | |
|    | 0.23 | 0.29 | 0.33 | 0.35 | 0.38 | >1 | >1 | >1 | >1 | >1 | |

TABLE 17-continued

| Inventive Example 16 | Core-Shell Ratio | | | | | | | | | | |
|---|---|---|---|---|---|---|---|---|---|---|---|
| | 0 | 10 | 20 | 30 | 40 | 50 | 60 | 70 | 80 | 90 | 100 |
| 30 | 102.9 | 106.1 | 119.6 | 125.6 | 128.6 | 134.2 | 137.1 | 140.6 | 144.0 | 145.9 | |
| | 0.28 | 0.30 | 0.33 | 0.34 | 0.39 | >1 | >1 | >1 | >1 | >1 | |
| 20 | 123.3 | 119.4 | 128.0 | 135.0 | 138.1 | 142.6 | 145.5 | 148.8 | 147.4 | 149.3 | |
| | >1 | >1 | >1 | >1 | >1 | >1 | >1 | >1 | >1 | >1 | |
| 10 | 131.5 | 134.9 | 150.5 | 143.9 | 141.5 | 153.6 | 144.6 | 141.3 | 149.7 | 151.3 | |
| | >1 | >1 | >1 | >1 | >1 | >1 | >1 | >1 | >1 | >1 | |
| 0 | | | | | | 123.1 | | | | | |
| | | | | | | >1 | | | | | |

TABLE 18

| Comparative Example 2 | Core-Shell Ratio | | | | | | | | | | |
|---|---|---|---|---|---|---|---|---|---|---|---|
| | 0 | 10 | 20 | 30 | 40 | 50 | 60 | 70 | 80 | 90 | 100 |
| MMA 100 | 4.5 | 4.8 | 4.3 | 5.6 | 5.7 | 6.9 | 10.9 | 12.1 | 11.2 | 15.8 | 35.4 |
| Ratio | 0.07 | 0.06 | 0.08 | 0.08 | 0.09 | 0.09 | 0.08 | 0.08 | 0.07 | 0.12 | 0.76 |
| 90 | 4.7 | 5.1 | 5.6 | 6.3 | 6.6 | 7.1 | 10.5 | 11.2 | 13.6 | 18.4 | |
| | 0.10 | 0.09 | 0.08 | 0.15 | 0.12 | 0.09 | 0.13 | 0.12 | 0.15 | 0.16 | |
| 80 | 5.1 | 4.9 | 5.9 | 7.1 | 7.8 | 10.3 | 11.6 | 15.6 | 17.9 | 19.5 | |
| | 0.14 | 0.15 | 0.14 | 0.14 | 0.16 | 0.17 | 0.19 | 0.18 | 0.18 | 0.18 | |
| 70 | 5.4 | 6.4 | 6.7 | 8.7 | 9.9 | 11.9 | 14.7 | 17.6 | 19.8 | 20.4 | |
| | 0.15 | 0.18 | 0.19 | 0.19 | 0.22 | 0.23 | 0.23 | 0.22 | 0.24 | 0.22 | |
| 60 | 6.3 | 7.4 | 8.9 | 10.9 | 13.2 | 15.6 | 18.5 | 19.8 | 20.9 | 22.2 | |
| | 0.17 | 0.21 | 0.23 | 0.22 | 0.26 | 0.24 | 0.26 | 0.25 | 0.26 | 0.27 | |
| 55 | 5.7 | 8.6 | 9.8 | 12.1 | 14.7 | 16.6 | 19.9 | 20.2 | 19.7 | 23.1 | |
| | 0.17 | 0.21 | 0.23 | 0.26 | 0.27 | 0.27 | 0.29 | 0.31 | 0.34 | 0.35 | |
| 50 | 7.8 | 11.8 | 13.5 | 14.5 | 17.4 | 16.9 | 20.3 | 21.9 | 22.7 | 24.5 | |
| | 0.19 | 0.23 | 0.22 | 0.24 | 0.29 | 0.29 | 0.31 | 0.32 | 0.35 | 0.38 | |
| 40 | 8.5 | 13.4 | 16.3 | 17.4 | 18.1 | 18.9 | 22.1 | 20.8 | 23.3 | 23.1 | |
| | 0.19 | 0.22 | 0.23 | 0.26 | 0.28 | 0.31 | 0.36 | 0.34 | 0.38 | 0.43 | |
| 30 | 15.1 | 15.5 | 19.6 | 21.7 | 24.1 | 25.1 | 27.7 | 25.6 | 27.7 | 30.6 | |
| | 0.21 | 0.23 | 0.26 | 0.24 | 0.28 | 0.32 | 0.35 | 0.36 | 0.43 | 0.48 | |
| 20 | 18.4 | 17.9 | 20.8 | 23.6 | 24.5 | 25.2 | 28.1 | 27.8 | 29.7 | 32.8 | |
| | 0.24 | 0.25 | 0.28 | 0.31 | 0.34 | 0.39 | 0.43 | 0.48 | 0.52 | 0.56 | |
| 10 | 19.6 | 23.1 | 24.5 | 26.7 | 27.1 | 28.4 | 29.4 | 29.9 | 32.6 | 34.1 | |
| | 0.28 | 0.30 | 0.34 | 0.36 | 0.39 | 0.43 | 0.48 | 0.56 | 0.67 | 0.78 | |
| 0 | | | | | | 35.4 | | | | | |
| | | | | | | 0.76 | | | | | |

TABLE 19

| Reference Example 1 | Core-Shell Ratio | | | | | | | | | | |
|---|---|---|---|---|---|---|---|---|---|---|---|
| | 0 | 10 | 20 | 30 | 40 | 50 | 60 | 70 | 80 | 90 | 100 |
| MMA 100 | 4.1 | 4.7 | 5.8 | 7.1 | 8.8 | 10.9 | 13.5 | 6.6 | 7.5 | 25.6 | |
| Ratio | 0.07 | 0.09 | 0.09 | 0.10 | 0.12 | 0.14 | 0.15 | 0.19 | 0.21 | >1 | >1 |
| 90 | 3.7 | 5.0 | 6.9 | 15.2 | 18.9 | 16.6 | 24.1 | 26.0 | 27.8 | 29.3 | |
| | 0.10 | 0.09 | 0.11 | 0.12 | 0.14 | 0.14 | 0.15 | 0.20 | 0.22 | >1 | >1 |
| 80 | 5.3 | 6.2 | 7.4 | 8.8 | 10.4 | 14.2 | 14.7 | 8.7 | 24.1 | 24.7 | |
| | 0.10 | 0.10 | 0.11 | 0.13 | 0.15 | 0.16 | 0.18 | 0.23 | 0.25 | >1 | >1 |
| 70 | 11.1 | 11.8 | 13.8 | 20.2 | 23.1 | 22.1 | 27.1 | 28.7 | 30.0 | 31.2 | |
| | 0.10 | 0.11 | 0.11 | 0.14 | 0.17 | 0.19 | 0.22 | 0.24 | 0.26 | >1 | >1 |
| 60 | 2.9 | 4.0 | 4.1 | 7.4 | 10.1 | 26.7 | 18.8 | 25.6 | 26.1 | 47.6 | |
| | 0.11 | 0.12 | 0.13 | 0.15 | 0.20 | 0.25 | 0.24 | 0.26 | >1 | >1 | >1 |
| 55 | 16.6 | 16.9 | 19.1 | 21.4 | 23.3 | 6.5 | 25.9 | 26.8 | 27.7 | 28.4 | |
| | 0.13 | 0.16 | 0.19 | 0.21 | 0.22 | 0.26 | 0.22 | 0.24 | >1 | >1 | >1 |
| 50 | 26.3 | 29.4 | 13.4 | 35.6 | 38.8 | 41.9 | 45.0 | 48.1 | 51.2 | 54.3 | |
| | 0.15 | 0.21 | 0.23 | 0.23 | 0.24 | >1 | >1 | >1 | >1 | >1 | >1 |
| 40 | 22.1 | 22.0 | 55.1 | 29.0 | 30.4 | 30.3 | 32.5 | 33.2 | 33.9 | 34.5 | |
| | 0.13 | 0.16 | 0.25 | 0.21 | 0.24 | >1 | >1 | >1 | >1 | >1 | >1 |
| 30 | 25.8 | 25.4 | 27.8 | 30.1 | 31.4 | 33.0 | 33.2 | 33.9 | 34.5 | 35.0 | |
| | 0.16 | 0.21 | 0.28 | 0.28 | 0.30 | >1 | >1 | >1 | >1 | >1 | >1 |
| 20 | 33.3 | 28.8 | 31.3 | 32.6 | 33.5 | 35.8 | 34.7 | 35.2 | 35.6 | 35.9 | |
| | >1 | >1 | >1 | >1 | >1 | >1 | >1 | >1 | >1 | >1 | >1 |

TABLE 19-continued

| Reference | Core-Shell Ratio | | | | | | | | | | |
|---|---|---|---|---|---|---|---|---|---|---|---|
| Example 1 | 0 | 10 | 20 | 30 | 40 | 50 | 60 | 70 | 80 | 90 | 100 |
| 10 | 33.2 | 32.2 | 34.7 | 35.1 | 35.5 | 38.5 | 36.2 | 36.5 | 36.7 | 36.9 | |
|  | >1 | >1 | >1 | >1 | >1 | >1 | >1 | >1 | >1 | >1 | >1 |
| 0 | >1 | >1 | >1 | >1 | >1 | >1 | >1 | >1 | >1 | >1 | >1 |

As can be understood by cross-checking Tables 7 to 19 and Tables 1 to 3, in the adhesive sheets of Inventive Examples 1 to 9, 15 and 16, the elastic modulus of the protrusion element satisfying the requirement that the frictional force is about 0.4 N/cm² or less and the shear adhesive strength is about 45 N/cm² or more falls at least within the range of 7.3 (core-shell ratio: 20%, and MMA ratio: 40%) to 377.0 (core-shell ratio: 20%, and MMA ratio: 55%) MPa. Further, from a viewpoint of easiness in terms of position adjustment, the elastic modulus of the protrusion element is preferably 15 MPa or more, more preferably 25 MPa or more. For the same reason, the elastic modulus of the protrusion element is preferably 380 MPa or less, more preferably 350 MPa or less. If the elastic modulus of the protrusion element is less than 5 MPa, position adjustment becomes difficult. On the other hand, if the elastic modulus of the protrusion element is 1 MPa or less, the protrusion elements fixedly adhere to an adherend to preclude position adjustment.

Further, regarding the cohesive particle itself, Tables 1 to 3 show that when the core-shell ratio is 80% or less, the requirement that the frictional force is about 0.4 N/cm² or less and the shear adhesive strength is about 45 N/cm² or more is satisfied. Thus, it is apparent that the above desired results are more likely to be obtained by using the cohesive particles taught by the present invention.

The present invention is not limited to the above embodiment, but various modifications and changes may be made therein. For example, a rigid board may be used as the support of the adhesive member, instead of a soft sheet, and the pressure-sensitive adhesive may be directly provided onto the board. In this case, a weight of a weight member for use in measuring the frictional force is properly determined while taking into account a weight of the board.

INDUSTRIAL APPLICABILITY

The present invention is applicable to an adhesive member for use in various fields requiring position adjustment.

LIST OF REFERENCE SIGNS

1: adhesive member (adhesive sheet, etc.)
3: adherend
10: support
11: pressure-sensitive adhesive layer
12: protrusion element
20: cohesive particle
21: core material
22: shell material

The invention claimed is:
1. An adhesive member to be adhesively fixed through pressure comprising:
a support;
a pressure-sensitive adhesive layer provided on one surface of the support; and
a plurality of protrusion elements arranged, in spaced-apart relation to each other, on a principal surface of the pressure-sensitive adhesive layer on a side opposite to the support,
wherein each of the protrusion elements is composed of an aggregation of a plurality of cohesive particles,
wherein each of the protrusion elements composed of the aggregation of the plurality of cohesive particles has an elastic modulus of 5 MPa or more, and
wherein the cohesive particles have an average particle size of 100 nm to 300 nm.

2. The adhesive member as recited in claim 1, wherein each of the protrusion elements has a shear adhesive strength of 2 N/cm² or more, as measured under a load of 500 g.

3. The adhesive member as recited in claim 1, wherein each of the plurality of cohesive particles comprises, as its component, alkyl acrylate ester or alkyl methacrylate ester.

4. The adhesive member as recited in claim 1, wherein each of the plurality of cohesive particles has a core-shell structure made of a resin-based core material, and a resin-based shell material having an elastic modulus greater than that of the core material and wrapping around the core material.

5. The adhesive member as recited in claim 4, wherein a ratio of a weight of the resin-based core material to a weight of the resin-based shell material is 80% or less.

6. The adhesive member as recited in claim 4, wherein at least one of the core material and the shell material of the core-shell structure comprises, as its component, alkyl acrylate ester or alkyl methacrylate ester.

7. The adhesive member as recited in claim 6, wherein:
the alkyl acrylate ester comprises at least one selected from the group consisting of ethyl acrylate, propyl acrylate, n-butyl acrylate, t-butyl acrylate, n-hexyl acrylate, cyclohexyl acrylate, 2-ethylhexyl acrylate, n-octyl acrylate, and lauryl acrylate; and
the alkyl methacrylate ester comprises at least one selected from the group consisting of methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, and isobornyl methacrylate.

8. The adhesive member as recited in claim 1, wherein the protrusion elements are arranged on the principal surface in a dispersed manner.

9. The adhesive member as recited in claim 8, wherein at least part of the protrusion elements are arranged on the principal surface in the form of dots.

10. The adhesive member as recited in claim 9, wherein a maximum diameter of the at least part of the protrusion elements is in the range of 100 μm to 3 mm.

11. The adhesive member as recited in claim 8, wherein an area ratio of the protrusion elements to the principal surface is 15% or more.

12. The adhesive member as recited in claim 1, wherein the protrusion elements are arranged on the principal surface in a continuous state.

13. The adhesive member as recited in claim 12, wherein at least part of the protrusion elements are arranged on the principal surface in the form of a stripe.

14. The adhesive member as recited in claim 13, wherein each of the at least part of the protrusion elements has a line width of 100 μm or more.

15. The adhesive member as recited in claim 1, which has a frictional force of about 0.4 N/cm$^2$ or less, with respect to a stainless steel plate serving as an adherend, as measured when the protrusion elements are in contact with a surface of the adherend.

16. The adhesive member as recited in claim 1, which has a shear adhesive strength of about 45 N/cm$^2$ or more, with respect to a stainless steel plate serving as an adherend, as measured under a load of 2 kg.

17. The adhesive member as recited in claim 1, wherein the pressure-sensitive adhesive layer has a plastic strain of 0.07 or more.

18. The adhesive member as recited in claim 1, wherein a ratio of a thickness of the pressure-sensitive adhesive layer to a height dimension of each of the protrusion elements is 60 or more : 100.

19. The adhesive member as recited in claim 1, wherein a height dimension of each of the protrusion elements on the principal surface is in the range of 1 μm to 100 μm.

20. The adhesive member as recited in claim 1, wherein the support is one selected from the group consisting of a plasterboard, a lumber, a plywood, a steel plate, a tape, a sheet and a film.

21. The adhesive member as recited in claim 1, wherein the other surface of the support is provided with a second pressure-sensitive adhesive or a curable adhesive.

22. The adhesive member as recited in claim 21, wherein further comprises a plurality of protrusion elements on a principal surface of a layer of the second pressure-sensitive adhesive which is provided on the other surface of the support.

23. An adhesive member to be adhesively fixed through pressure comprising:
a support;
a pressure-sensitive adhesive layer provided on one surface of the support; and
a plurality of protrusion elements arranged, in spaced-apart relation to each other, on a principal surface of the pressure-sensitive adhesive layer on a side opposite to the support,
wherein the adhesive member to be adhesively fixed through pressure has:
a frictional force of about 0.4 N/cm$^2$ or less, with respect to a stainless steel plate serving as an adherend, as measured when the protrusion elements are in contact with a surface of the adherend; and
a shear adhesive strength of about 45 N/cm$^2$ or more, with respect to the stainless steel plate, as measured under a load of 2 kg,
wherein each of the protrusion elements is composed of an aggregation of a plurality of cohesive particles, and
wherein the cohesive particles have an average particle size of 100 nm to 300 nm.

24. The adhesive member as recited in claim 23, wherein each of protrusion elements has a shear adhesive strength of about 2 N/cm$^2$ or more, as measured under a load of 500 g.

25. The adhesive member as recited in claim 23, wherein each of the protrusion elements has an elastic modulus of 5 MPa or more.

26. The adhesive member as recited in claim 23, wherein each of the plurality of cohesive particles comprises, as its component, alkyl acrylate ester or alkyl methacrylate ester.

27. The adhesive member as recited in claim 23, wherein each of the plurality of cohesive particles has a core-shell structure made of a resin-based core material, and a resin-based shell material having an elastic modulus greater than that of the core material and wrapping around the core material.

28. The adhesive member as recited in claim 27, wherein a ratio of a weight of the resin-based core material to a weight of the resin-based shell material is 80% or less.

29. The adhesive member as recited in claim 27, wherein at least one of the core material and the shell material of the core-shell structure comprises, as its component, alkyl acrylate ester or alkyl methacrylate ester.

30. The adhesive member as recited in claim 29, wherein:
the alkyl acrylate ester comprises at least one selected from the group consisting of ethyl acrylate, propyl acrylate, n-butyl acrylate, t-butyl acrylate, n-hexyl acrylate, cyclohexyl acrylate, 2-ethylhexyl acrylate, n-octyl acrylate, and lauryl acrylate; and
the alkyl methacrylate ester comprises at least one selected from the group consisting of methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, and isobornyl methacrylate.

31. The adhesive member as recited in claim 23, wherein the protrusion elements are arranged on the principal surface in a dispersed manner.

32. The adhesive member as recited in claim 31, wherein at least part of the protrusion elements are arranged on the principal surface in the form of dots.

33. The adhesive member as recited in claim 32, wherein a maximum diameter of the at least part of the protrusion elements is in the range of 100 μm to 3 μm.

34. The adhesive member as recited in claim 31, wherein an area ratio of the protrusion elements to the principal surface is 15% or more.

35. The adhesive member as recited in claim 23, wherein the protrusion elements are arranged on the principal surface in a continuous state.

36. The adhesive member as recited in claim 35, wherein at least part of the protrusion elements are arranged on the principal surface in the form of a stripe.

37. The adhesive member as recited in claim 36, wherein each of the at least part of the protrusion elements has a line width of 100 μm or more.

38. The adhesive member as recited in claim 23, wherein the pressure-sensitive adhesive layer has a plastic strain of 0.07 or more.

39. The adhesive member as recited in claim 23, wherein a ratio of a thickness of the pressure-sensitive adhesive layer to a height dimension of each of the protrusion elements is 60 or more : 100.

40. The adhesive member as recited in claim 23, wherein a height dimension of each of the protrusion elements on the principal surface is in the range of 1 μm to 100 μm.

41. The adhesive member as recited in claim 23, wherein the support is one selected from the group consisting of a plasterboard, a lumber, a plywood, a steel plate, a tape, a sheet and a film.

42. The adhesive member as recited in claim 23, wherein the other surface of the support is provided with a second pressure-sensitive adhesive or a curable adhesive.

43. The adhesive member as recited in claim 42, wherein further comprises a plurality of protrusion elements on a principal surface of a layer of the second pressure-sensitive adhesive which is provided on the other surface of the support.

* * * * *